United States Patent
Watanabe et al.

(10) Patent No.: US 6,628,576 B1
(45) Date of Patent: Sep. 30, 2003

(54) STORAGE APPARATUS HAVING DEVICE FOR CONTROLLING TRACK JUMP OF A POSITIONER

(75) Inventors: Ichiro Watanabe, Kawasaki (JP); Takayuki Kawabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/541,573

(22) Filed: Apr. 3, 2000

(30) Foreign Application Priority Data

Apr. 8, 1999 (JP) .......................................... 11-101444

(51) Int. Cl.[7] .............................................. G11B 19/26
(52) U.S. Cl. ................................ 369/30.17; 369/30.15; 369/53.37
(58) Field of Search .................... 369/44.28, 44.32, 369/53.35, 53.37, 53.39, 30.17; 318/561; 700/45; 702/191

(56) References Cited

U.S. PATENT DOCUMENTS

| 4,907,214 A | | 3/1990 | Nagano et al. ................. 369/49 |
| 4,956,831 A | * | 9/1990 | Sarraf et al. ................. 360/78.04 |
| 5,050,146 A | * | 9/1991 | Richgels et al. ............ 369/30.17 |
| 5,161,140 A | * | 11/1992 | Terada ........................ 369/44.28 |
| 5,402,400 A | * | 3/1995 | Hamada et al. ............ 360/78.02 |
| 5,408,454 A | * | 4/1995 | Hasegawa ........... 369/44.28 X |
| 5,444,612 A | * | 8/1995 | Torii et al. .................... 364/161 |
| 5,708,581 A | * | 1/1998 | Martinez ...................... 364/164 |
| 5,909,661 A | * | 6/1999 | Agramovitch et al. ...... 702/191 |
| 6,005,742 A | * | 12/1999 | Cunningham et al. ... 360/78.05 |
| 6,013,995 A | * | 1/2000 | Kim ............................ 318/561 |

FOREIGN PATENT DOCUMENTS

| EP | 392 777 | 10/1990 |
| EP | 464 986 | 1/1992 |
| JP | 59060740 | 4/1984 |
| JP | 62183040 | 8/1987 |
| JP | 02108286 | 4/1990 |
| JP | 6-243483 | 11/1994 |
| JP | 08077589 | 3/1996 |
| JP | 9-35282 | 2/1997 |
| WO | 98-47137 | 10/1998 |

OTHER PUBLICATIONS

English translatin of JP 2–108286.*
English Translation of JP 62–183040.*
Machine translation of JP 08–077589.*
Principles of Optical Disc Systems © 1985, pp. 174–176, Bouwhuis.*

* cited by examiner

*Primary Examiner*—Aristotelis M. Psitos
(74) *Attorney, Agent, or Firm*—Greer, Burns & Crain, Ltd.

(57) ABSTRACT

A track jump control unit adds an FF signal for repetitive disturbance compensation obtained by a learning control which is used in a track-following control and a final value of an FB control low band component just before a track jump to a track jump signal to move a light spot to an adjacent track, thereby driving a carriage. As a track jump signal, a first kick pulse of a predetermined acceleration and a predetermined time, a second kick pulse which continues at a predetermined acceleration until a detection of a track zero-cross point, and a brake pulse of a predetermined acceleration (deceleration) and a predetermined time are used.

20 Claims, 56 Drawing Sheets

POSITIONER DISPLACEMENT

POSITIONER SPEED

POSITIONER ACCELERATION
310 FRICTIONAL DISTURBANCE

VCM DRIVING CURRENT

F I G. 3
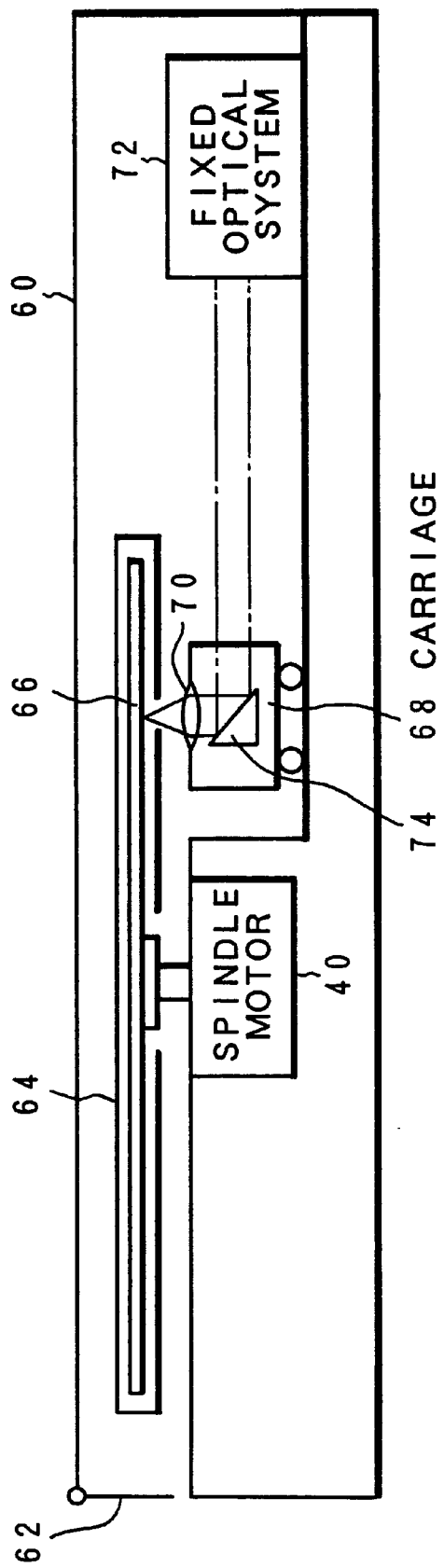

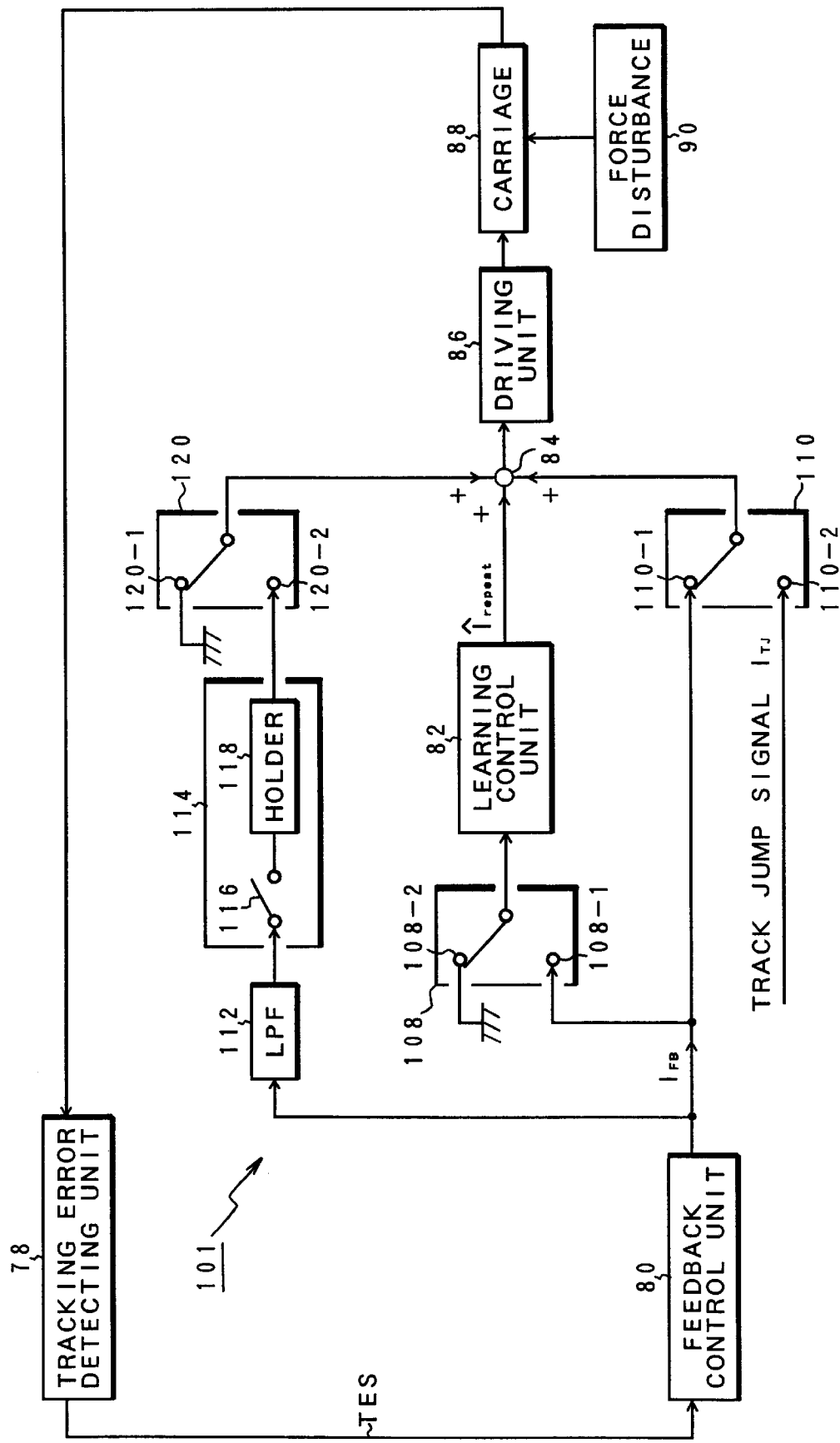

POSITIONER DISPLACEMENT

POSITIONER SPEED

TRACK JUMP SIGNAL

DISTURBANCE COMPENSATION SIGNAL

[msec]

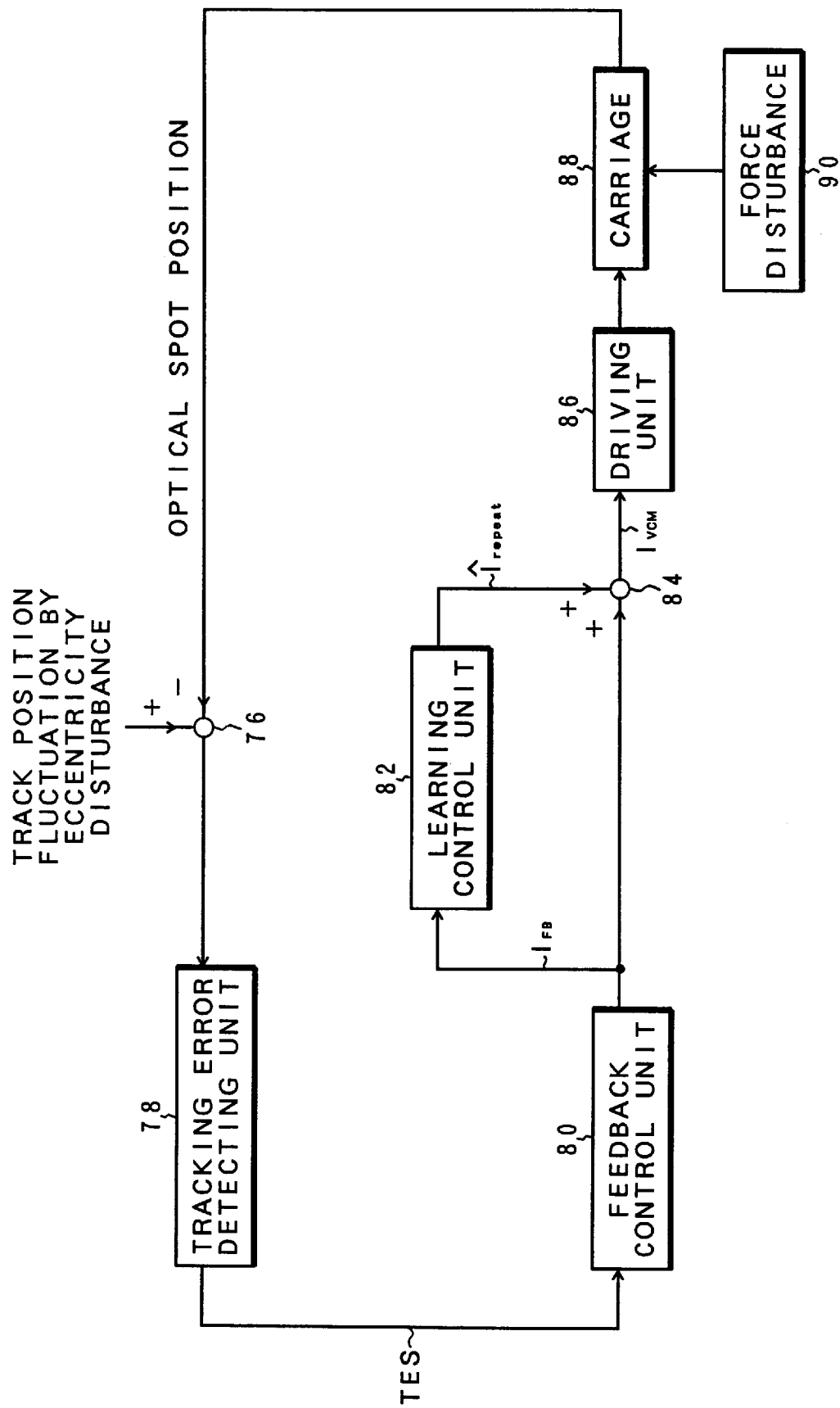

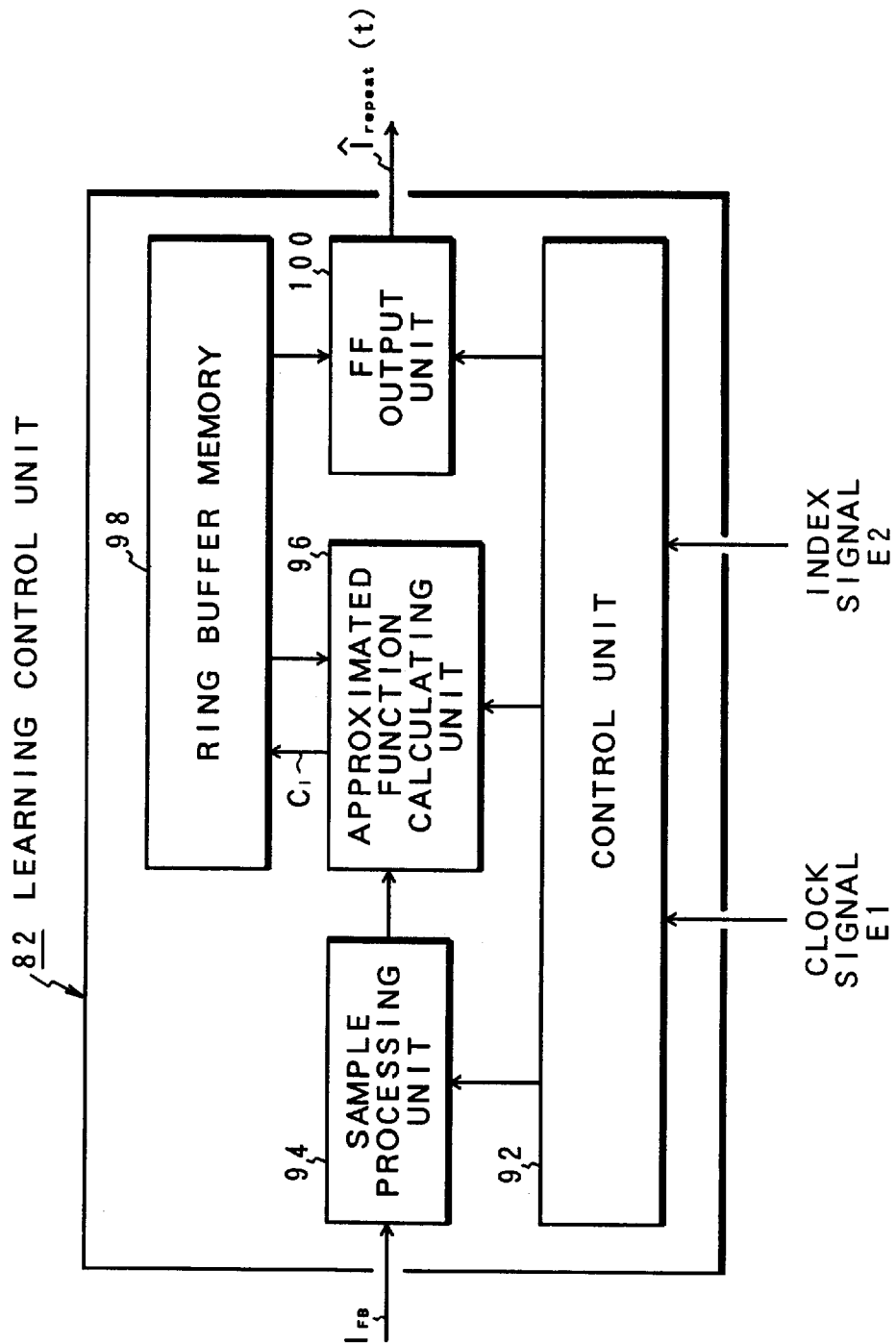

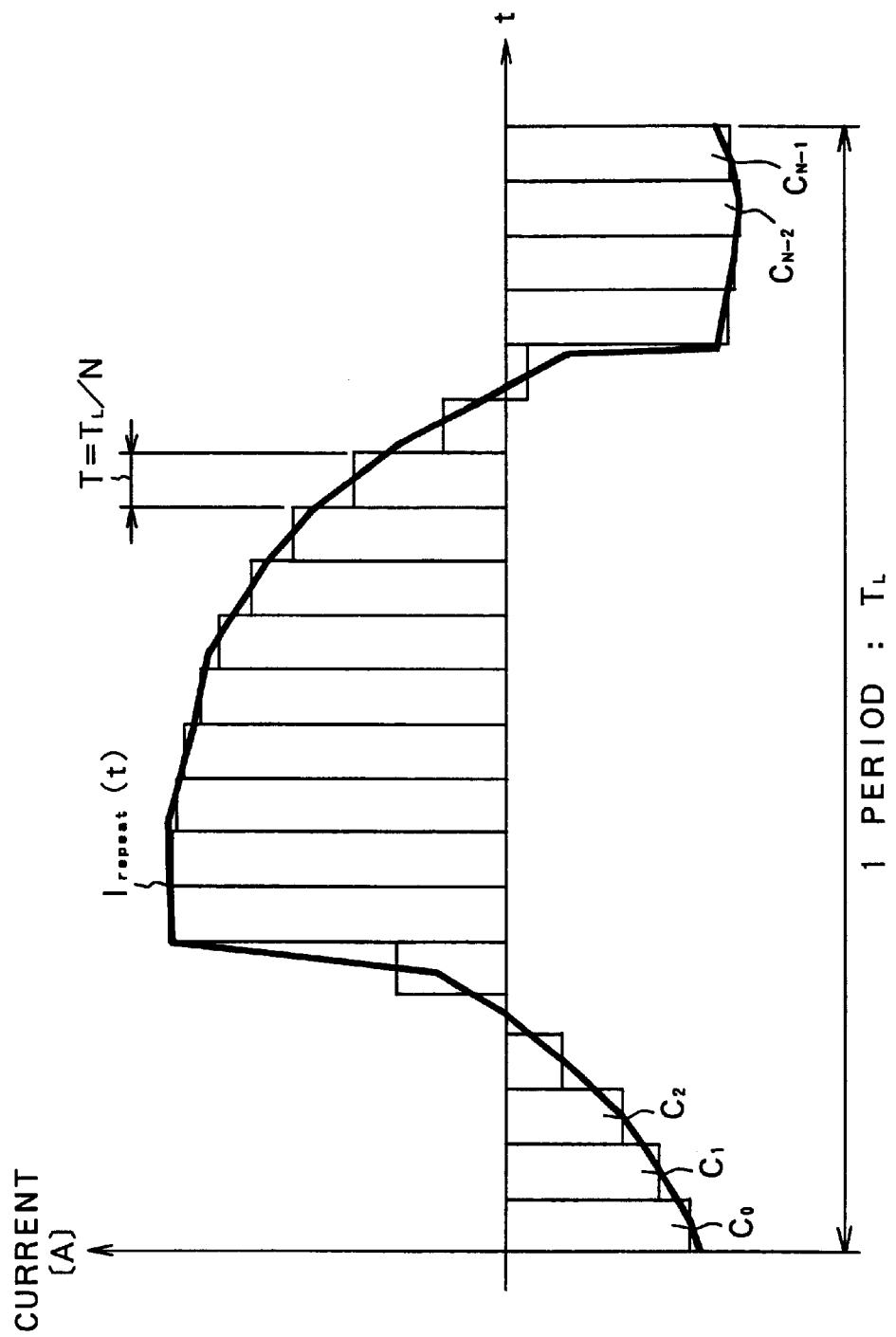

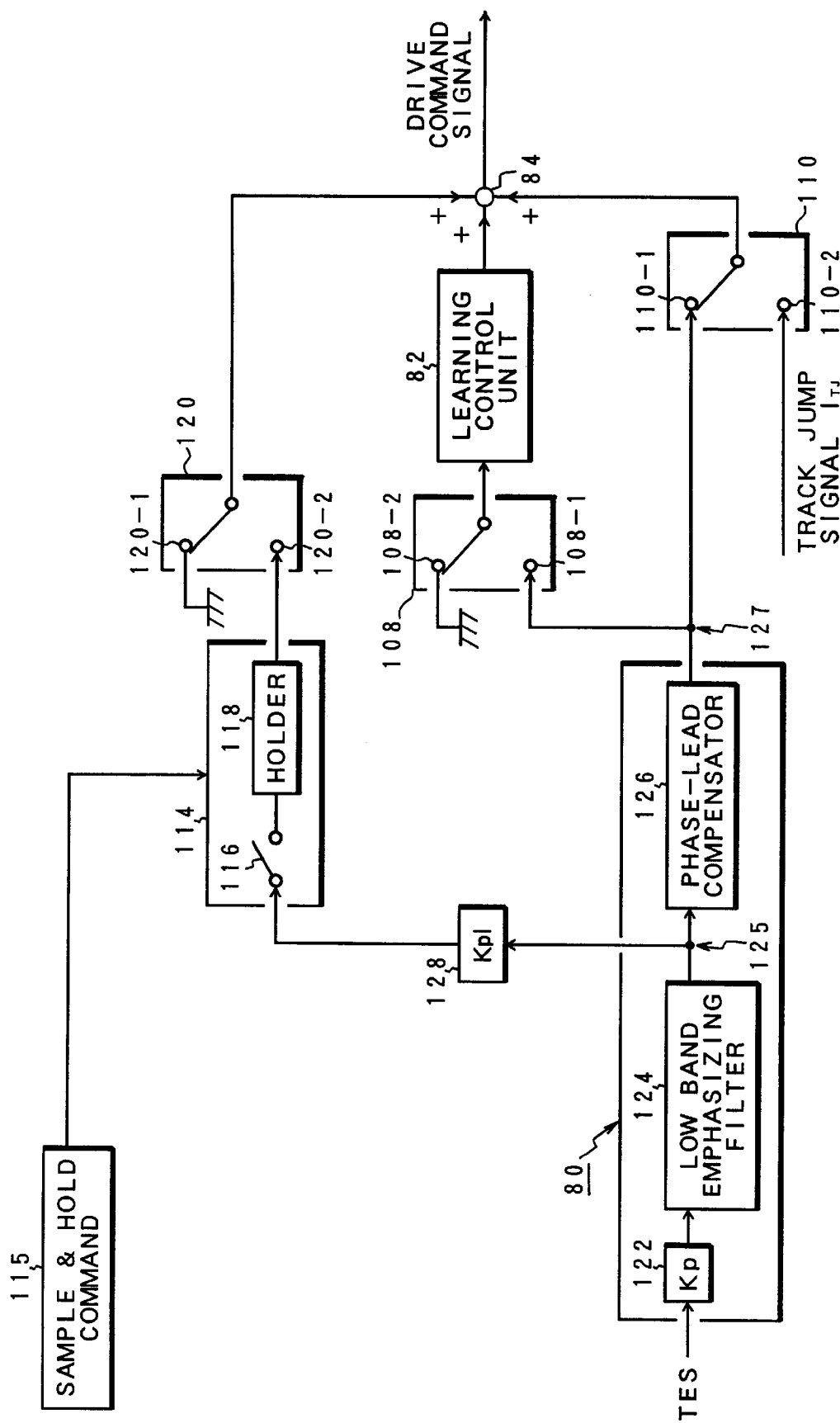
F I G. 15

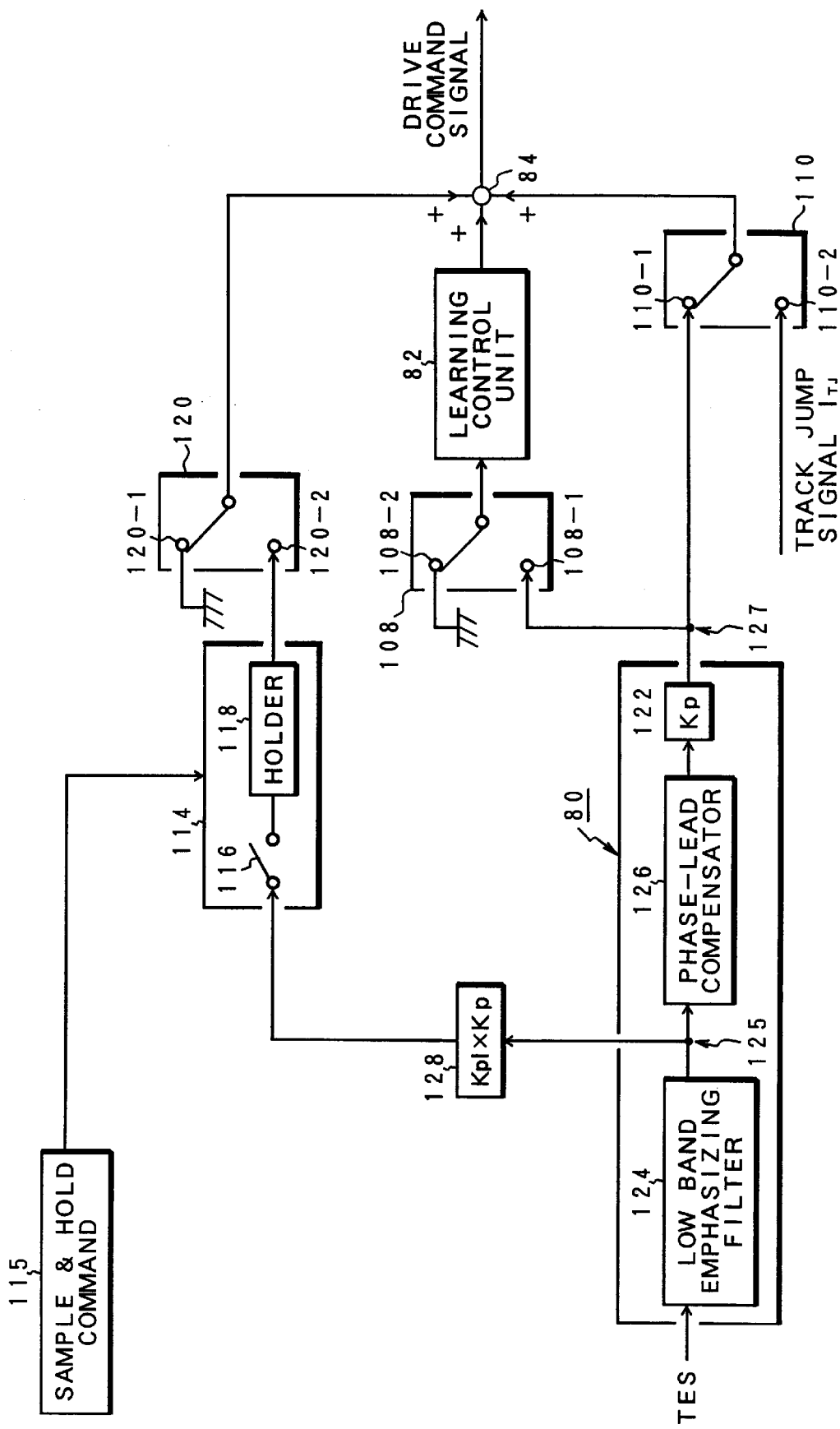

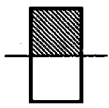
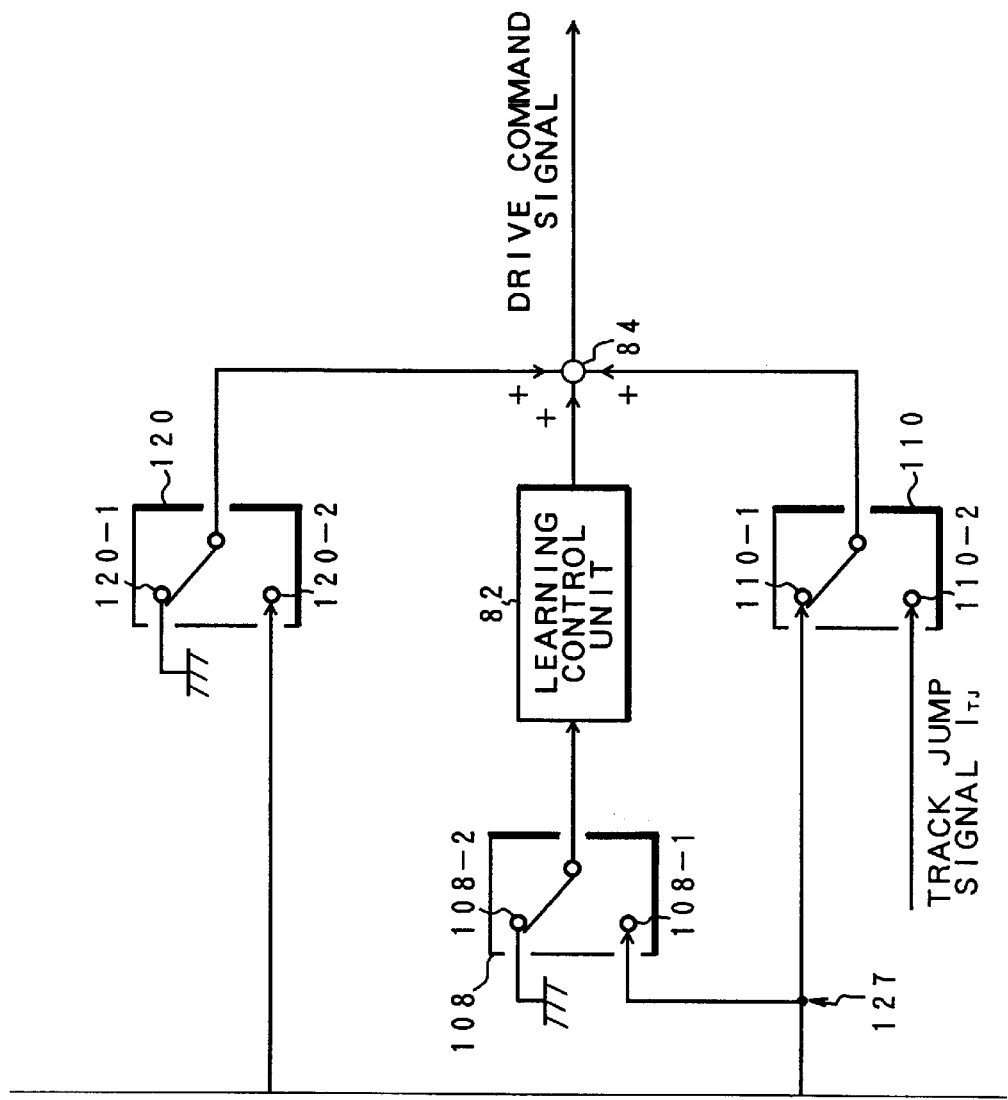
FIG. 17B

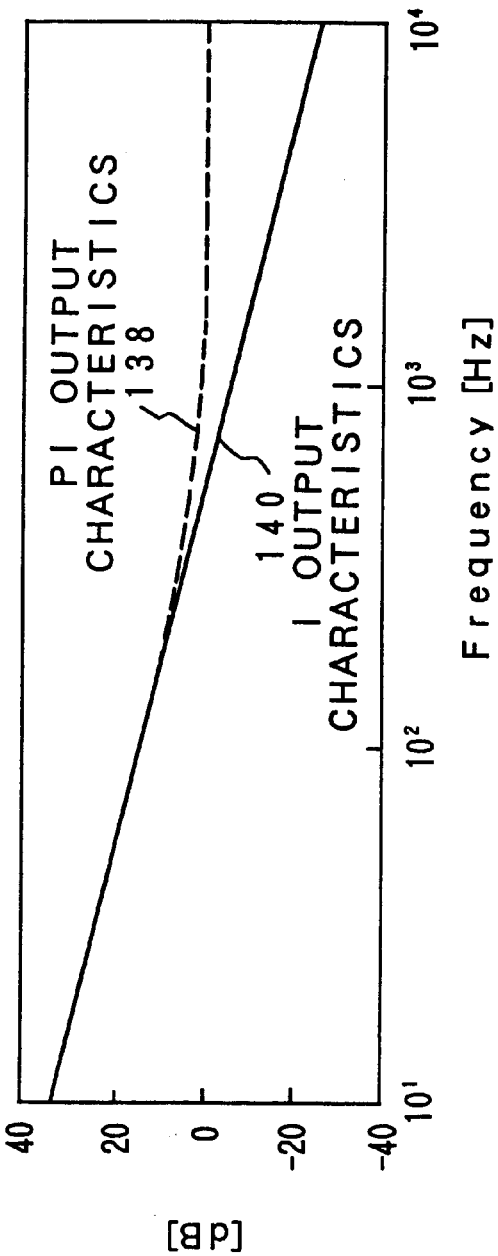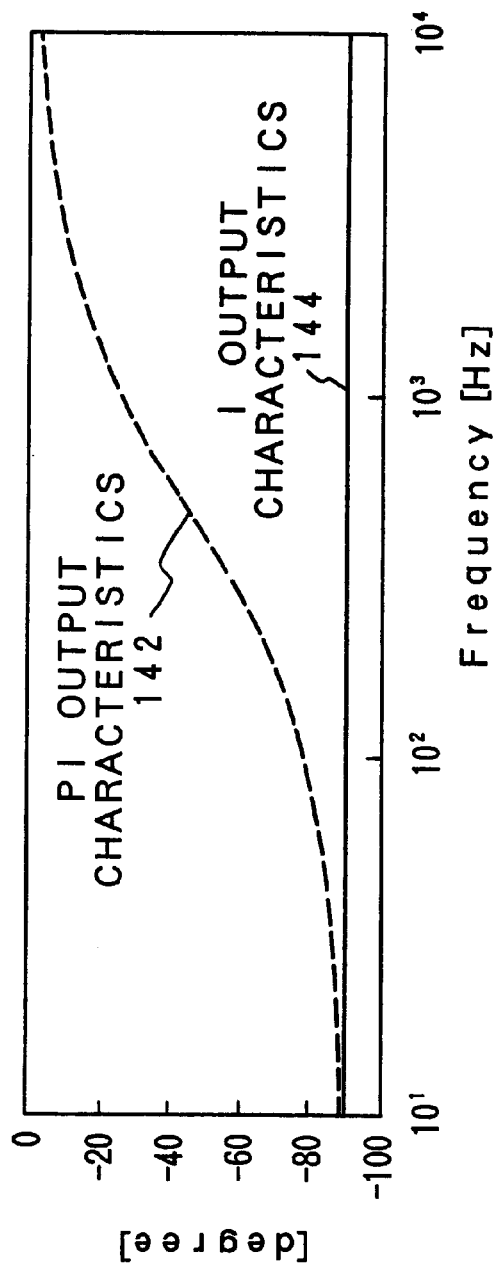
FIG.19A GAIN
FIG.19B PHASE ANGLE

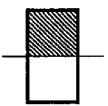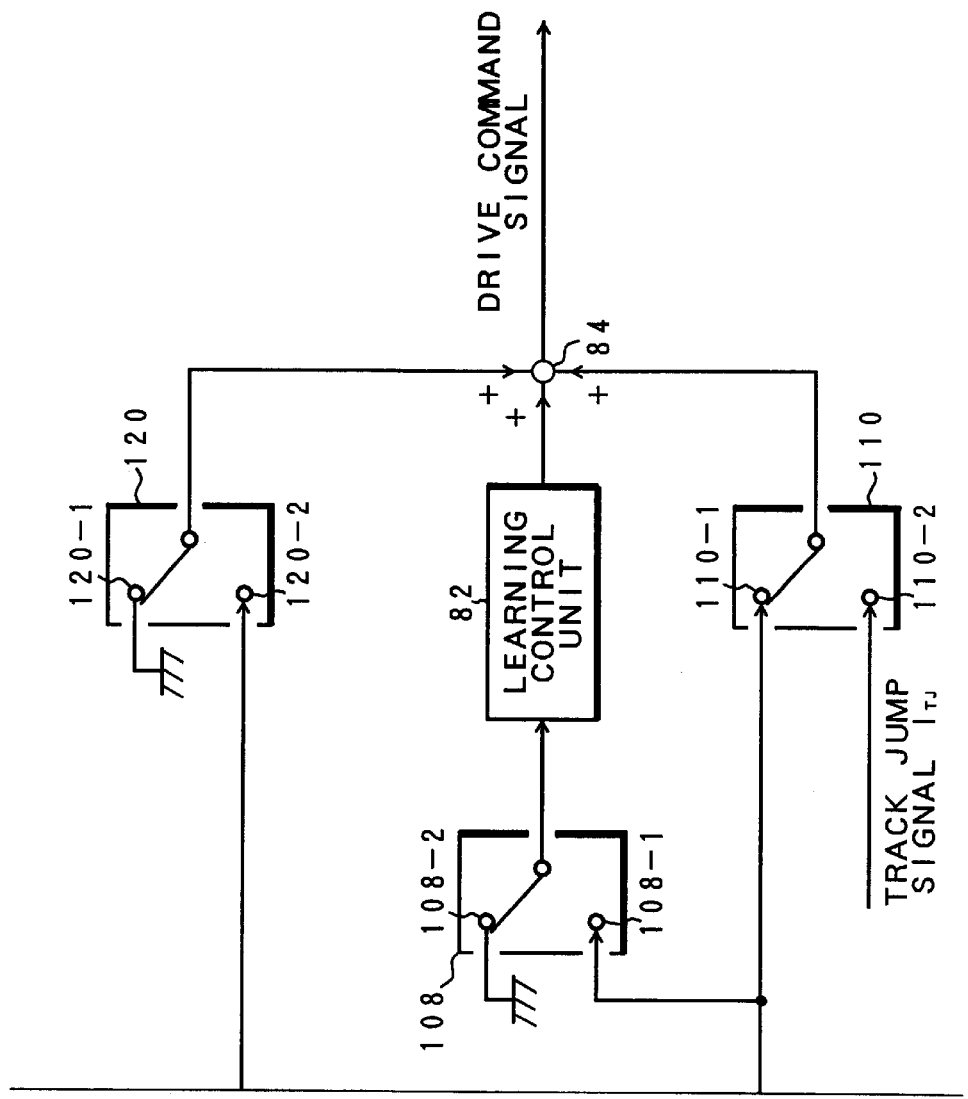
FIG. 21B

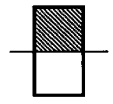
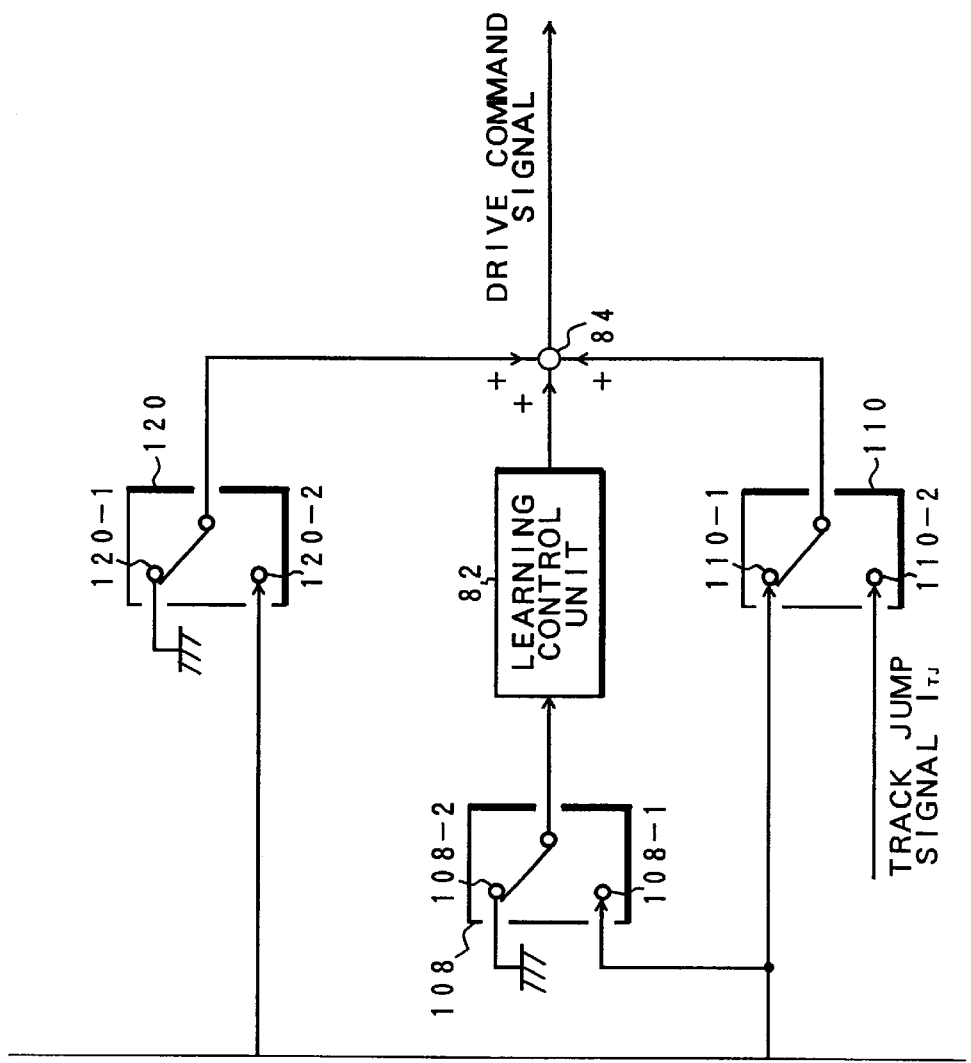
FIG. 23B

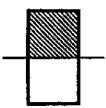
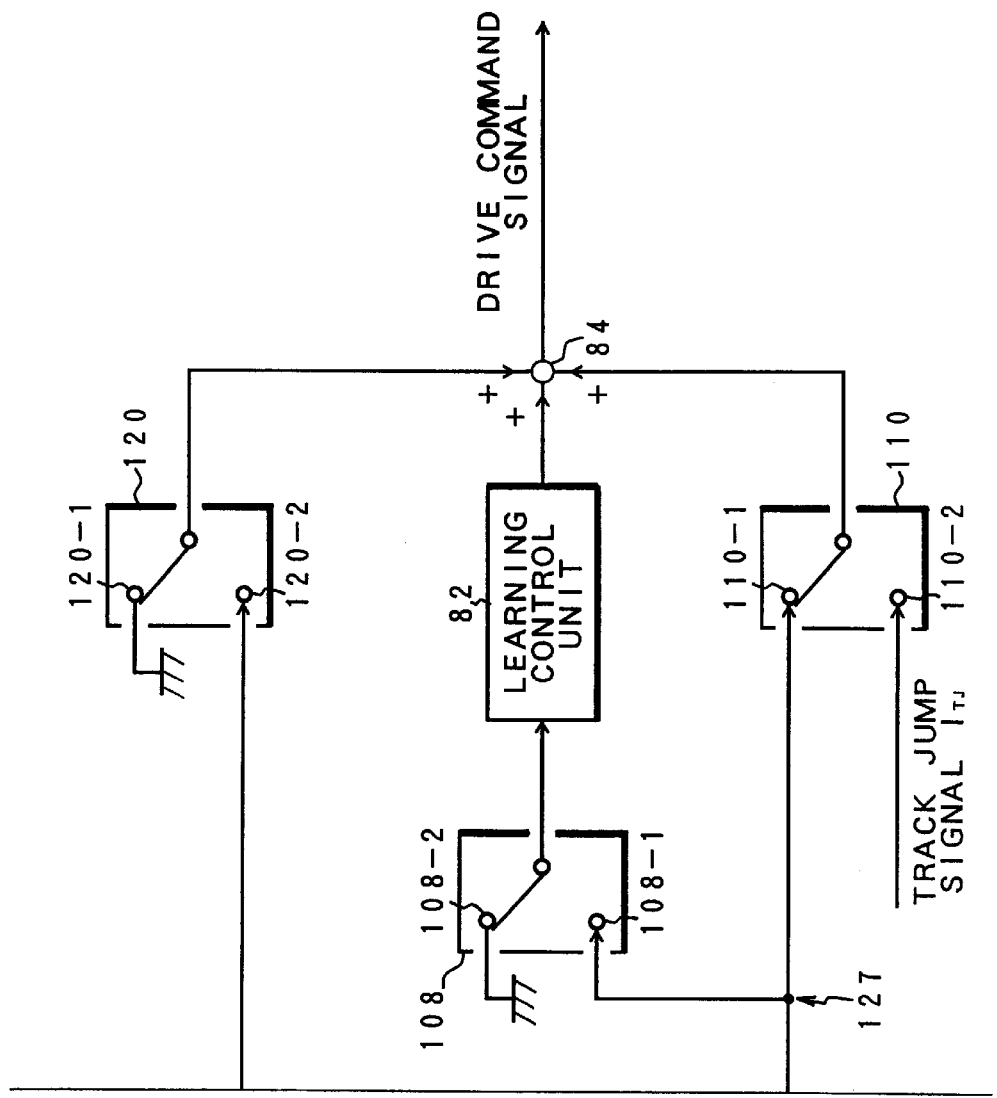
FIG. 24B

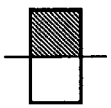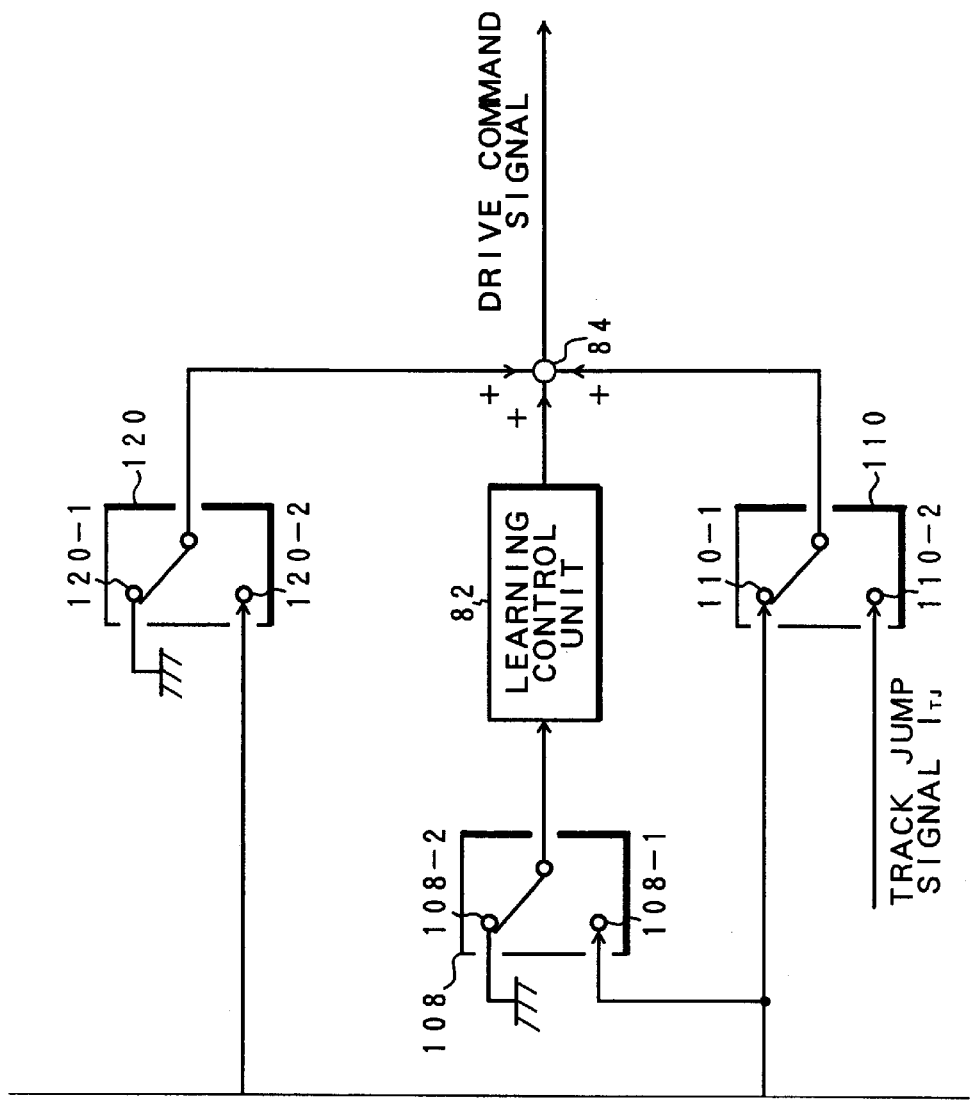
FIG. 25B

POSITIONER DISPLACEMENT

POSITIONER SPEED

TRACK JUMP SIGNAL

DISTURBANCE COMPENSATION SIGNAL

POSITIONER DISPLACEMENT

POSITIONER SPEED

TRACK JUMP SIGNAL

DISTURBANCE COMPENSATION SIGNAL

POSITIONER DISPLACEMENT

POSITIONER SPEED

TRACK JUMP SIGNAL

DISTURBANCE COMPENSATION SIGNAL

POSITIONER DISPLACEMENT

POSITIONER SPEED

TRACK JUMP SIGNAL

DISTURBANCE COMPENSATION SIGNAL

POSITIONER DISPLACEMENT

POSITIONER SPEED

TRACK JUMP SIGNAL

DISTURBANCE COMPENSATION SIGNAL

POSITIONER DISPLACEMENT

POSITIONER SPEED

TRACK JUMP SIGNAL

DISTURBANCE COMPENSATION SIGNAL

POSITIONER DISPLACEMENT

POSITIONER SPEED

TRACK JUMP SIGNAL

DISTURBANCE COMPENSATION SIGNAL

POSITIONER DISPLACEMENT

POSITIONER SPEED

TRACK JUMP SIGNAL

DISTURBANCE COMPENSATION SIGNAL

| | TJ START PHASE | ECCENTRICITY FOLLOWING SPEED | TJ DIRECTION |
|---|---|---|---|
| FIG. 26 | 0 | POSITIVE | POSITIVE |
| FIG. 27 | 2ms | POSITIVE | |
| FIG. 28 | 3.3ms | POSITIVE → NEGATIVE (NEAR 0) | |
| FIG. 29 | 4ms | NEGATIVE (LOW) | |
| FIG. 30 | 6.3ms | NEGATIVE (HIGH) | |
| FIG. 31 | 9ms | NEGATIVE (LOW) | |
| FIG. 32 | 9.8ms | NEGATIVE → POSITIVE (NEAR 0) | |
| FIG. 33 | 11ms | POSITIVE | |

| DISTURBANCE COMPENSATION PRECISION | DIRECTION OF COMPENSATION ERROR | REMARKS |
|---|---|---|
| ◎ | — | |
| ◎ | — | |
| △ | ACCELERATION IS INSUFFICIENT | ECCENTRICITY SPEED IS NEAR 0 |
| △ | ACCELERATION IS INSUFFICIENT | |
| ◎ | — | |
| △ | ACCELERATION IS INSUFFICIENT | |
| △ | ACCELERATION IS INSUFFICIENT | ECCENTRICITY SPEED IS NEAR 0 |
| ◎ | — | |

◎ : VERY GOOD    △ : A LITTLE BAD

TES

KICK PULSE

TRACK JUMP SPEED

TES

POSITIONER DISPLACEMENT

POSITIONER SPEED

TRACK JUMP SIGNAL

[μsec]

F I G. 37A
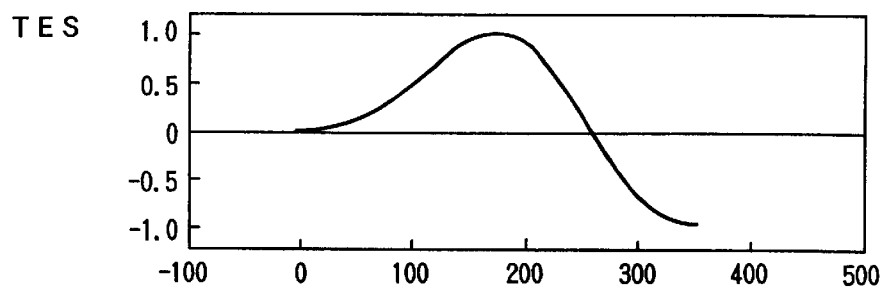
F I G. 37B
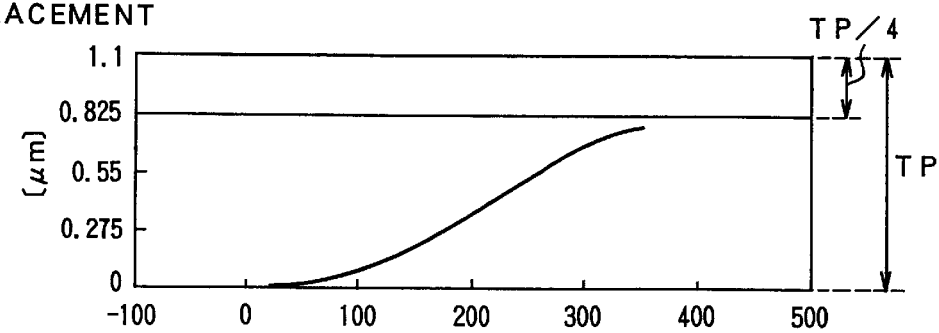
F I G. 37C
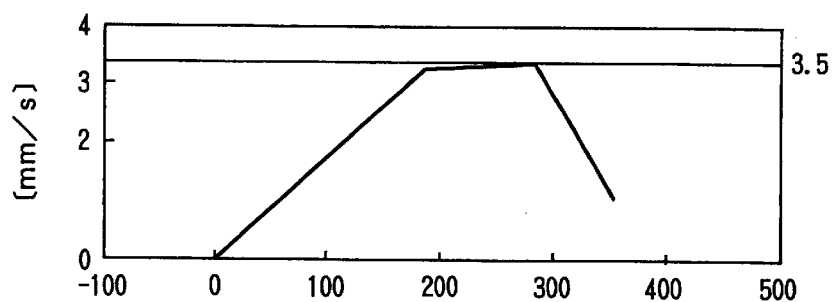
F I G. 37D
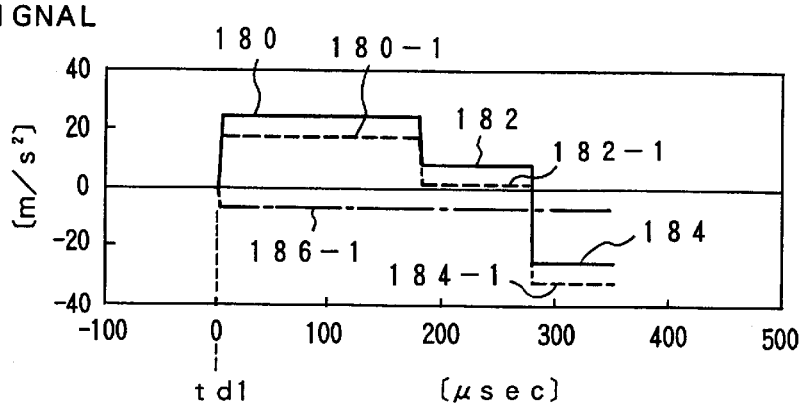

TES

POSITIONER DISPLACEMENT

POSITIONER SPEED

TRACK JUMP SIGNAL

TRACKING ERROR SIGNAL TES

TRACK JUMP SIGNAL

FF SIGNAL FOR PRO COMPENSATION AT THE TIME OF TRACK FOLLOWING

OUTPUT OF INTEGRATOR (OUTPUT OF LOW BAND EMPHASIS CALCULATING UNIT)

TRACKING ACTUATOR DRIVING SIGNAL

TES

KICK PULSE

ΔT DETECTION ERROR AT TZC TIME POINT (1 SAMPLING PERIOD)

TRACK JUMP SPEED

FIG. 42

| HEIGHT OF KICK PULSE (m/s²) | SPEED ERROR AFTER END OF ACCELERATION (mm/s) |
|---|---|
| 30 | 0.54 |
| 40 | 0.72 |
| 50 | 0.9 |
| 60 | 1.08 |
| 70 | 1.26 |

TES

KICK PULSE

TRACK JUMP SPEED

TES

KICK PULSE

TRACK JUMP SPEED

STORAGE APPARATUS HAVING DEVICE FOR CONTROLLING TRACK JUMP OF A POSITIONER

BACKGROUND OF THE INVENTION

1. Field of the Invention

The invention relates to a storage apparatus such as an optical disk drive or the like for recording and reproducing information to/from a medium such as an optical disk or the like and, more particularly, to a storage apparatus which can stably move a light spot to an adjacent track by a track jump even under a circumstance of an eccentricity of a disk, a frictional disturbance occurring by a positioner mechanism, or a disturbance from the outside of the apparatus.

2. Description of the Related Arts

In a conventional optical disk drive, to raise track-following performance of a light spot to a medium track, there is used a double stage (fine/coarse separation driving type) positioner comprising: a carriage actuator (VCM) for a seek control (also referred to as a coarse control) for moving a carriage supported by a ball bearing for a guide rail which is fixedly arranged; and a tracking actuator for a track-following control (also referred to as a precision control or tracking control) for moving a laser beam in the direction which transverses the tracks by the driving of an objective lens mounted on the carriage. In recent years, however, an apparatus using a single stage (fine/coarse integrated driving type) positioner in which a tracking actuator is omitted and only a carriage actuator is used is also widespread for the purpose of the reduction of costs of the apparatus. In the single stage positioner, a simple slide bearing is formed by removing a ball bearing from a bearing portion, thereby reducing the number of parts and costs.

Since the optical disk has a spiral track, a track jump for moving a light spot to an adjacent track is performed at a predetermined position for every rotation of the optical disk during a track-following control. As a conventional track jumping method, generally, a low band component of a control output of a feedback control system is held during the track jump, thereby stabilizing the track jump (JP-A-2-152020, JP-A-7-110950). In an apparatus such as a single stage apparatus in which the frictional disturbance of the positioner cannot be ignored, however, there is a case where a sufficient compensation is not performed.

FIG. 1A shows a positioner displacement 300 in the seeking direction of a carriage for a guide rail during a track-following control with respect to an apparatus of a conventional single stage positioner. FIG. 1B shows a positioner speed 302 in the seeking direction. FIG. 1C shows a positioner acceleration 304 in the seeking direction. Further, FIG. 1D shows a relation of a driving current 306 which is supplied to a VCM. For simplicity of explanation, it is assumed that an eccentricity of the disk comprises only a primary eccentricity, a rotational speed is set to 4500 rpm (75 Hz), and an eccentricity displacement amplitude is set to ±35 μm. In the eccentricity tracking state, as shown in FIG. 1A, the positioner reciprocates on the rail synchronously with the eccentricity of the disk and causes the positioner speed 302 in FIG. 1B and the positioner acceleration 304 in FIG. 1C. If there is no friction or the like between the rail and the slide bearing portion of the carriage, the ideal track-following performance is realized by applying the VCM driving current 306 shown by a broken line in FIG. 1D. However, in the single stage positioner, a disturbance due to a Coulomb friction in the bearing portion between the rail and the carriage cannot be ignored. The disturbance due to the Coulomb friction usually becomes a disturbance which acts in the direction opposite to the moving direction, namely, in the direction so as to obstruct the movement. Due to the eccentricity tracking, the moving direction of the carriage which reciprocates on the rail is reversed twice a disk rotation. Actually, if the secondary eccentricity or the like cannot be ignored, there is also a case where the moving direction is reversed two or more times. A situation that the moving direction of the carriage is reversed twice a disk rotation and the Coulomb frictional disturbance occurs corresponds to a timing when the positioner speed 302 in FIG. 1B crosses the zero point and the sign is inverted as shown by circles 308-1 to 308-4. When such a Coulomb frictional disturbance is simply modeled, it can be regarded as a step-like disturbance in which the direction of the disturbance force is abruptly inverted in dependence on the sign of the positioner speed and becomes a frictional disturbance 310 as shown by a broken line in FIG. 1C. A case where a coefficient of friction ($\mu$) is equal to $\mu$=0.4 is presumed here. In such a storage apparatus, to realize an ideal track-following control, the drive current is not limited to the VCM driving current to generate the positioner acceleration but it is necessary to use a VCM driving current 312 as shown by a solid line in FIG. 1D by further multiplexing the driving current to cancel the frictional disturbance to the VCM driving current. When considering a case of the 1-track jump for moving the light spot to the adjacent track, it is considered that time that is required to move the light spot to the adjacent track is generally equal to about 500 μsec or less. On the other hand, a disk rotating frequency is a relatively low frequency of, for example, 75 Hz (13.3 msec per period). In such an apparatus that the Coulomb frictional disturbance can be ignored, it is considered that a change in disturbance force that is presumed for a short time during the track jump is very small. A valid effect can be expected even if a low frequency component of an output of a feedback control system is multiplexed during the track jump as in the conventional method. In the apparatus of the single stage positioner in which the Coulomb frictional disturbance cannot be ignored, however, there exists a rotational phase area of the disk in which the VCM driving current needs to be steeply changed like a VCM driving current 312 shown by a solid line in FIG. 1D to compensate the abrupt change of the frictional disturbance 310 in FIG. 1C. Such an area exists at a position near a point shown by each of the circles 308-1 to 308-4 where the positioner speed 302 in FIG. 1B becomes zero. When considering a case where a 1-track jump command is received just before the positioner speed becomes zero, there is a large change between a disturbance amount at a start point of the track jump and that at an end point of the track jump. When the track jump command is received just before the positioner speed becomes zero, it is considered that the value of the low frequency component of the feedback control system is almost converged to the disturbance amount just before the track jump. In the conventional track jump, however, with respect to the low band component of the feedback control system, the value just before the track jump is held and a feed-forward outputted during the track jump. Therefore, at the end point of the track jump, a large error occurs between the actual disturbance amount and the value of the low band component which is feed-forward outputted, so that there is a case where the track jump becomes unstable or the track jump fails. Since the track jump command is instructed from an upper controller irrespective of the rotational phase of the disk, if the track jump command is instructed in such an area where the frictional disturbance changes, according to the conventional method of feed-forward outputting the low band component of the feedback control system during the track jump, there is a case where the output is incomplete. To solve such a problem, there is a method whereby the eccentricity speed is detected and the track jump command is outputted excluding an area where it is influenced by a static friction and the eccentricity speed becomes a value near zero (JP-A-9-35282). However, when the track jump command is issued in an area where the track jump is inhibited, a time lag occurs before the track jump command is executed and there is a fear of deterioration of random access performance.

SUMMARY OF THE INVENTION

According to the invention, a storage apparatus which can perform a stable track jump for an eccentricity of a disk, a frictional disturbance occurring by a positioner mechanism, or a disturbance from the outside of the apparatus is provided. According to the invention, there is also provided a storage apparatus for realizing a stable track jump even in an apparatus which uses a single stage positioner and in which a frictional disturbance cannot be ignored.

According to the invention, there is provided a storage apparatus comprising: a recording/reproducing unit for recording or reproducing information onto/from a track by a light spot; and a track-following control unit for driving a positioner to move a position of the light spot by a feedback control signal from a feedback control unit based on a tracking error signal TES showing a positional deviation of the light spot and the track and allowing the light spot to follow the track.

Track Jump Control

According to the invention, the storage apparatus is characterized by having a track jump control unit for adding a feed-forward signal for repetitive disturbance compensation which is used for the track-following control to a track jump signal for moving the light spot to the adjacent track, thereby driving the positioner. As mentioned above, by feed-forwarding the repetitive disturbance compensation signal of high precision captured by the learning control for the track-following control during the track jump, adding the feed-forward signal to the track jump signal, and driving the positioner, a repetitive disturbance such as eccentricity disturbance, Coulomb frictional disturbance, or the like can be accurately compensated.

The track jump control unit has a learning control unit for obtaining a function for one medium rotational period to set a positional deviation amount for the repetitive disturbance to zero by a learning algorithm as an approximated function which was approximated and presumed and storing such a function as a feed-forward signal for repetitive disturbance compensation. As for the learning by the learning control unit, even if it takes long time to settle the learning result due to a low learning gain, a compensation signal of a steep frictional disturbance of a high band in association with the inversion of the carriage moving direction can be also included in the learning result that is obtained finally. By adding the learning control signal to the track jump control system by the feed-forward control, the steep frictional disturbance can be removed from the track jump control system. By using the single stage positioner, a tracking error for the eccentricity of the medium can be fairly reduced and the precision of the track jump control can be improved even if there is a limitation due to the existence of a high-order resonance and a control band is low.

The track jump control unit has a function to hold a final value of a low band component just before the track jump in the feedback control signal for track-following control and has a sample holder for adding the held final value to the track jump signal and the feed-forward signal for repetitive disturbance compensation, thereby driving the positioner during the track jump. By feed-forwarding the value just before the track jump of the low band compensation component of the feedback control system for the track-following control during the track jump together with the repetitive disturbance compensation signal as mentioned above, in addition to the repetitive disturbance such as eccentricity disturbance, Coulomb frictional disturbance, or the like, a non-repetitive disturbance such as an oscillatory disturbance from the outside of the apparatus can be compensated with high precision.

During the track jump, the track jump control unit stops a low band compensating calculation in the feedback control unit for a time interval from a timing during the track jump to the elapse of a predetermined time during a lead-in control after the end of the track jump by holding internal variables just before the track jump and, thereafter, restarts the low band compensating calculation by using the held internal variables as initial values. As mentioned above, a stop of the calculation of a low band compensating filter performed during the track jump is continued during a transient response of the lead-in control after the end of the track jump. The calculation of the low band compensating filter is restarted at a timing near a timing when the transient response is settled and a tracking error signal TES is converged to a target track. Thus, a situation that the low band compensation component is vainly fluctuated due to the lead-in transient response is prevented and a deterioration of the low band compensation precision by the low band compensating filter after the lead-in is prevented as much as possible.

A low band emphasizing filter (low band compensating filter) is constructed by a PI compensating filter. In the feedback control unit, as a final value of the low band compensation component just before the track jump that is fed-forward during the track jump, a value obtained by multiplying the final value just before the track jump of the signal of either a "PI type low band compensation component" or an "I type low band compensation component" by a correction coefficient (corresponding to Kp1 or $K_{comp}$ in FIGS. 16, 17A, and 17B) is used. Any of those values is held by the sample holder and feed-forward added during the track jump. In case of using the feedback control unit, a calculation of an integration compensation calculating unit (low band emphasis calculating unit in the embodiment) is stopped simultaneously with the start of the track jump while holding and outputting an integration value just before the track jump. During the track jump and until the elapse of a predetermined time after the end of the track jump (end of the track jump signal), the integration compensation calculating unit continuously holds and outputs the integration value just before the track jump and, after that, restarts the integration compensating calculation by using the held integration value as an initial value. Since a selector is switched to the track jump signal side simultaneously with the start of the track jump, an output of a phase-lead calculation is not reflected to a drive command signal. However, a phase-lead compensating unit continues the calculation even during the track jump. That is, during the track-following control until a timing just before the track jump, a phase-lead calculation is performed by using a PI compensation output (PI type low band compensation component) as an input. After the start of the track jump, an addition value of the integration compensation output which was held to a constant value and outputted and a signal (this signal fluctuates in response to a TES change) obtained by multiplying the TES signal by Kp is used as an input, and the phase-lead calculation is continued. The selector is again switched to the phase-lead compensation output side simultaneously with the end of the track jump signal and the lead-in control is started. Since the phase-lead compensating calculation is continued as mentioned above, the valid driving signal for the lead-in operation is outputted from the phase-lead compensating unit instantaneously with the switching of the selector. Since the low band compensation signal held by the integration calculating unit is also included in such an output, the low band compensation signal which has been feed-forward outputted during the track jump by the selector is invalidated because the selector is switched to the 0 output side instantaneously with the start of the lead-in. After the elapse of a predetermined time from the start of the lead-in, the integration compensation calculating unit restarts the integrating calculation by using the held output as an initial value. From this time point, the feedback control unit is recovered to a feedback control system of a perfect form for track-following control also including the low band compensating calculation.

The low band emphasizing filter can be also implemented with phase-lag compensation. The phase-lag compensation can be equivalently realized by an additional synthesis of a direct transfer component (DC transfer component) of a proportional component and a result of a low pass filter calculation (the low band emphasis calculating unit in the embodiment).

In the feedback control unit, as a value that is fed-forward during the track jump, there is used a value obtained by multiplying the final value just before the track jump of a signal of either the "I type low band compensation component" (actually, although it is an output of a low pass filter, it is called an I type low band compensation component for convenience in the invention) or the "PI type low band compensation component" (also referred to a PI type for convenience because of the same reason as that mentioned above) by the correction coefficient (corresponding to Kp1 or $K_{comp}$ in FIGS. 16, 17A, and 17B). Any of those values is held by the sample holder and feed-forward added during the track jump. In case of using the feedback control unit, calculation of the low band emphasis calculating unit is stopped while holding internal variables in the filter just before the track jump and holding the output just before the track jump simultaneously with the start of the track jump. During the track jump and until a predetermined time elapses after the end of the track jump (end of the track jump signal), the low band emphasis calculating unit continuously holds and outputs the output value just before the track jump and, after that, restarts the low band emphasizing calculation by using the held filter internal variables and output value as initial values. Since the selector is switched to the track jump signal side simultaneously with the start of the track jump, the output of the phase-lead calculation is not reflected to a drive command signal. However, the phase-lead compensating unit continues the calculation even during the track jump. That is, during the track-following control until a timing just before the track jump, a phase-lead calculation is performed by using a phase-lag compensation calculation output (PI type low band compensation component) as an input. After the start of the track jump, an addition value of the output of the low band emphasis calculating unit which was held to a constant value and outputted and a signal (this signal fluctuates in response to the TES change) obtained by multiplying the TES signal by Kp is used as an input, and the phase-lead calculation is continued. The selector is again switched to the phase-lead compensation output side simultaneously with the end of the track jump signal and the lead-in control is started. Since the phase-lead compensating calculation is continued as mentioned above, the valid driving signal for the lead-in operation is outputted from the phase-lead compensating unit instantaneously with the switching of the selector. Since the low band compensation signal held by the low band emphasis calculating unit is also included in such an output, the low band compensation signal which has been feed-forward outputted during the track jump by the selector is invalidated because the selector is switched to the 0 output side instantaneously with the start of the lead-in. After the elapse of a predetermined time from the start of the lead-in, the low band emphasis calculating unit restarts the low band emphasizing calculation by using the held filter internal variables and output value as initial values. From this time point, the feedback control unit is recovered to the feedback control system of a perfect form for track-following control also including the low band compensating calculation. More generally, the phase-lag compensation is constructed by a filter to emphasize a low band to improve a low band gain for low band compensation. However, in case of a compensation in which filters are serially connected like (phase-lag compensation)+(phase-lead compensation)

the low band emphasis filter unit usually includes the DC transfer component of the proportional component. That is, now assuming that a transfer function of the low band emphasizing filter is labelled as $G_L(s)$, it is expressed by $$G_L(s) = \frac{b_m s^m + \ldots + b_1 s + b_0}{a_n s^n + \ldots + a_1 s + a_0} \quad (1)$$

Generally, $m \leq n$. If the low band emphasizing filter includes the DC transfer component of the proportional component, the degrees of a numerator and a denominator are equal and m=n. When m=n, the transfer function of the equation (1) can be generally dissolved as shown by the following equation.

$$G_L(s) = G_L'(s) + K_{G_L} \quad (2)$$

$G_L'(s)$ is the transfer function that is strictly proper (namely, the degree of the numerator is smaller than the degree of the denominator). That is, when the numerator and the denominator of the transfer function $G_L(s)$ of the low band emphasizing filter are equal, as shown by the equation (2), it can be expressed by the sum of a direct transfer term (DC transfer term) ($K_{GL}$) of the proportional component and the transfer function $G_L'(s)$ that is strictly proper. In the invention, $G_L'(s)$ is called a low band emphasis calculating unit.

In the feedback control unit which generally expresses the low band emphasizing filter, as a final value of the low band compensation component just before the track jump which is fed-forward during the track jump, a value obtained by multiplying the final value just before the track jump of the signal of either an "I type low band compensation component" (although it is actually an output of a low pass filter, it is called an I type low band compensation component for convenience in the invention) or a "PI type low band compensation component" (also called a PI type for convenience in the invention) by the correction coefficient (corresponding to Kp1 or $K_{comp}$ in FIGS. 16, 17A, and 17B) is used. Any of those values is held by the sample holder and feed-forward added during the track jump. In case of using the feedback control unit, a calculation of the low band emphasis calculating unit is stopped simultaneously with the start of the track jump while holding the filter internal variables just before the track jump and holding the output just before the track jump. During the track jump and until a predetermined time elapses after the end of the track jump (end of the track jump signal), the low band emphasis calculating unit continuously holds and outputs the output value just before the track jump and, after that, restarts the low band emphasizing calculation by using the held filter internal variables and output value as initial values. Since the selector is switched to the track jump signal side simultaneously with the start of the track jump, an output of a high band compensating calculation is not reflected to the drive command signal. However, a high band compensating unit continues the calculation even during the track jump. That is, during the track-following control until a timing just before the track jump, the high band compensating calculation is performed by using an output of the low band compensating calculation (PI type low band compensation component) as an input. After the start of the track jump, an addition value of the output of the low band emphasis calculating unit which was held to a constant value and outputted and a signal (this signal fluctuates in response to the TES change) obtained by multiplying the TES signal by ($Kp \times K_{GL}$) is used as an input, and the high band compensating calculation is continued. The selector is again switched to the high band compensation output side simultaneously with the end of the track jump signal and the lead-in control is started. Since the high band compensating calculation is continued as mentioned above, the valid driving signal for the lead-in operation is outputted instantaneously with the switching of the selector. Since the low band compensation signal held by the low band emphasis calculating unit is also included in such an output, the low band compensation signal which has been feed-forward outputted during the track jump by the selector is invalidated because the selector is switched to the 0 output side instantaneously with the start of the lead-in. After the elapse of a predetermined time from the start of the lead-in, the low band emphasis calculating unit restarts the low band emphasizing calculation by using the held filter internal variables and output value as initial values. From this time point, the feedback control unit is recovered to the feedback control system of a perfect form for track-following control also including the low band compensating calculation.

As a command value of the track jump signal to move the light spot to the adjacent target track by one track, the track jump control unit generates a command of a first kick pulse to output a predetermined first acceleration A1 for a predetermined time T1, subsequently generates a command of a second kick pulse to output a second acceleration A2 smaller than the first acceleration A1 until a passage of ½ track of the light spot is detected (zero-cross point of TES is detected), and then generates a command of a brake pulse to output a predetermined third acceleration (deceleration) A3 for a predetermined time T3 in such a manner that the track jump is finished at a position near a point that is ¼ track before the target track or at a position near the peak of the tracking error signal TES near a position which is ¼ track before the target track, and after that, shifts the control to the track-following control by the feedback control unit, and leads in the light spot to the adjacent target track. By the generation of such a track jump signal, for a case where the direction of the Coulomb frictional disturbance which causes a compensation error during the track jump is reversed from the direction during the track-following control and the acceleration becomes insufficient, the second kick pulse to compensate the insufficient acceleration is generated subsequently to the first kick pulse mainly for accelerating the positioner to thereby cope with such a case, thereby preventing the positioner from being moved backward for a period of time until the end of the track jump. The brake pulse of the track jump signal subsequent to the kick pulse is set to the deceleration A3 and continuation time T3 so that the track jump is finished at a position near a position that is ¼ track before the target track, accurately, a position near a position where the tracking error signal TES becomes the peak, thereby setting a timing to shift the control to the lead-in control system (track-following control system) to an early timing. By this method, a compensation possibility due to the feedback control is raised. Thus, a stable track jump can be performed even in such an apparatus that the Coulomb frictional disturbance cannot be ignored like an apparatus using the single stage positioner.

Learning Control

A learning control unit obtains an unknown function (drive command signal function) for one medium rotational period to set a positional deviation amount for a repetitive disturbance such as a medium eccentricity or the like synchronized with the medium rotation to zero by a learning algorithm as an approximated function which was approximately by using a set of heights of rectangular functions for intervals obtained by dividing the time for one medium rotational period into N time segments and stores it. According to the learning control unit, even if it takes a slightly long time for settlement of the learning result due to a low learning gain, a compensation signal of a steep frictional disturbance of a high band in association with the reversal of the carriage moving direction can be also included in the learning result that is obtained finally. By adding the learning control signal to the feedback control system as a feed-forward compensation signal, the steep frictional disturbance can be removed from the feedback control system. By using the single stage carriage, even if there is a limitation due to the existence of the high-order resonance and the control band is low, the tracking error for the eccentricity of the medium is remarkably reduced and precision of the on-track control can be improved by the learning control.

The learning control unit of the invention is provided between the feedback control unit and the addition point. Assuming that the time for one medium rotational period is set to $T_L$, an unknown driving current function Irepeat(t) (where, $0 \leq t < T_L$; $T_L$ denotes one medium rotational period) which is repeated for a period of time from a start time t=0 for one medium rotational period to an end time t=$T_L$ is obtained by a learning algorithm as an approximated function Γrepeat(t) (where, $0 \leq t < T_L$; $T_L$ denotes the one medium rotational period) which is approximately estimated by using a set of heights $C_i$ of N rectangular functions indexed from i=0 to (N−1), obtained by dividing the time $T_L$ for one medium rotational period into N intervals and stored. Although the approximated function is expressed by $$\hat{I}_{repeat}$$

it is expressed as "Γrepeat" in the specification.

The learning control unit comprises a memory, a sampling unit, an approximated function calculating unit, and a feed-forward output unit. The memory has a plurality of memory cells to store the height $C_i$ of each rectangular function of the approximated function $\hat{I}repeat(t)$. The sampling unit samples the control signal $I_{FB}$ which is outputted from the feedback control unit. The approximated function calculating unit obtains the height $C_i$ of each rectangular function of the approximated function $\hat{I}repeat(t)$ stored in each memory cell of the memory by the following learning law $$\ddot{c}_i = K_{learn} \times I_{FB}$$

where, i denotes the index number of the rectangular function which is decided by time t and $0 \leq i \leq (N-1)$;

for example, $i = \text{floor}(t/T)$,

T denotes a time width per rectangular function, where $T = T_L/N$ on the basis of the control signal $I_{FG}$ sampled by a sampling unit and a predetermined learning gain $K_{learn}$ and updates the height $C_i$.

A feed-forward output unit (FF output unit) reads out the height $C_i$ as a learning control signal, of each rectangular function of the approximated function $\hat{I}repeat(t)$ stored in the memory cells of the memory synchronously with the divisional period T (time width per rectangular function) of the medium rotation, adds it to the control signal $I_{FB}$ from the feedback control unit, and supplies a driving signal $I_{VCM}$ to the driving unit. Further, the feed-forward output unit reads out the height $C_i$ of each rectangular function of the approximated function $\hat{I}repeat(t)$ stored in the memory cells of the memory synchronously with the medium rotation, adds it to the control signal $I_{FB}$ from the feedback control unit, and supplies the driving signal $I_{VCM}$ to the driving unit.

The feed-forward output unit reads out the value of the approximated function $\hat{I}repeat(t)$ stored in each memory cell of the memory corresponding to the time that is advanced by a predetermined time $\Delta t lead$ and outputs it. The learning control unit repeats the learning while feed-forward outputting the learning result at this time point. In this case, there is a time delay such as a phase delay or the like in the feedback control system. Unless it is compensated, the control becomes unstable. Therefore, with respect to the latest learning control result $\hat{I}repeat$ at that time point, the value corresponding to the time that is advanced from the present time by the predetermined time $\Delta t lead$ is read out and outputted, so that the learning can be performed in a state where the control system is stable. The learning control unit outputs the approximated function $\hat{I}repeat(t)$ obtained by the learning algorithm after the learning synchronously with the medium rotation, thereby performing a feed-forward control. The learning control unit feed-forward controls in such a manner that an operation to obtain an approximated function by the learning algorithm is performed for a specific time at a timing just after the medium was inserted into the apparatus and, at the time of a track-following control after the learning, the obtained approximated function is outputted synchronously with the medium rotation and the repetitive disturbance is removed. In the storage apparatus, when the approximated function is obtained by learning at a specific position in the disk radial direction, for example, at a position near the center region on the disk, in the case where a pickup is sought and moved to another radial direction position and the track-following control is performed, there is such a situation that an error occurs so long as the obtained approximated function is used, so that the approximation is inadequate. For example, when circularity at the inner region of the track on the disk and that at the outer region on the disk are different, when a difference between the phases or amplitudes of the repetitive disturbance in association with the spindle rotation in the inner region and the outer region cannot be ignored, or when a pickup having a single stage structure is used, there is such a situation that magnitudes of friction in the inner region and the outer region differ. Therefore, at the learning control unit of the invention, the getting operation of the approximated function is performed at a plurality of positions in correspondence to the radial direction position of the disk. In the feed-forward mode, the approximated function is selected in accordance with the track address where the pickup is in the on-track state at that time (for example, the approximated function obtained by the learning in the nearest track address is selected) and the feed-forward is performed, so that the high precise track-following control can be realized irrespective of the track address to be in the on-track state. In the case where the getting operation of the approximated function is performed at a plurality of positions as mentioned above, there is hardly difference among the basic waveforms of the approximated functions and differences among the approximated functions are very small. Therefore, when there is approximated function data at another position, an initial value (initial value of the cell corresponding to the height of each rectangular function) of the approximated function data in the approximated function getting operation at the present position is not started from zero but is started by using the approximated function data at another position as an initial value, thereby enabling the learning time to be reduced. Further, the positioner of the storage apparatus has such a single stage structure that an objective lens is focus-controllably mounted on a carriage which is movable in the direction that transverses the tracks on the medium, and both a tracking control for allowing the light beam to trace the track and a seek control for allowing the light beam to be moved to an arbitrary track position are performed only by the movement of the carriage.

The above and other objects, features, and advantages of the present invention will become more apparent from the following detailed description with reference to the drawings.

BRIEF DESCRIPTION OF THE DRAWINGS

FIG. 3 is an explanatory diagram of an internal structure of the optical disk drive in FIGS. 2A and 2B;

FIG. 4 is a block diagram of a fundamental embodiment for performing a track jump according to the invention;

FIG. 6 is an equivalent block diagram when a learning control is performed in FIG. 4;

FIG. 7 is a functional block diagram of a learning control unit in FIG. 6;

FIG. 8 is an explanatory diagram of a successive learning for a repetitive control input by the learning control unit in FIG. 6;

FIG. 15 is a block diagram of a fundamental embodiment of a track jump control system in FIG. 4;

FIG. 16 is a block diagram of a modified embodiment of a construction of a feedback control unit in FIG. 15;

FIGS. 17A and 17B are block diagrams of an embodiment in which a filter of a PI compensating type is used as a low band emphasizing filter;

FIGS. 19A and 19B are frequency characteristics diagrams of a gain and a phase angle showing a difference between FIGS. 17A and 17B and FIGS. 18A and 18B;

FIGS. 21A and 21B are block diagrams showing FIGS. 18A and 18B by generalizing them;

FIGS. 23A and 23B are block diagrams of the embodiment in which the transfer function of the phase-lag compensating type is used as a transfer function $G_L(s)$ of the low band emphasizing filter with respect to FIGS. 21A and 21B;

FIGS. 24A and 24B are block diagrams of an embodiment having functions to stop a calculation and restart the calculation of the low band emphasizing filter with respect to FIGS. 20A and 20B;

FIGS. 25A and 25B are block diagrams of the embodiment having functions to stop the calculation and restart the calculation of the low band emphasizing filter with respect to FIGS. 21A and 21B;

FIGS. 37A to 37D are explanatory diagrams of a track jump control in the worst case where a deceleration disturbance is applied to an interval from the beginning to the end;

FIG. 42 is an explanatory diagram of a correspondence table of a speed error after the end of acceleration for a height of kick pulse in FIGS. 41A to 41C;

DETAILED DESCRIPTION OF THE PREFERRED EMBODIMENTS

Construction and Functions of Apparatus

Figure 1A:
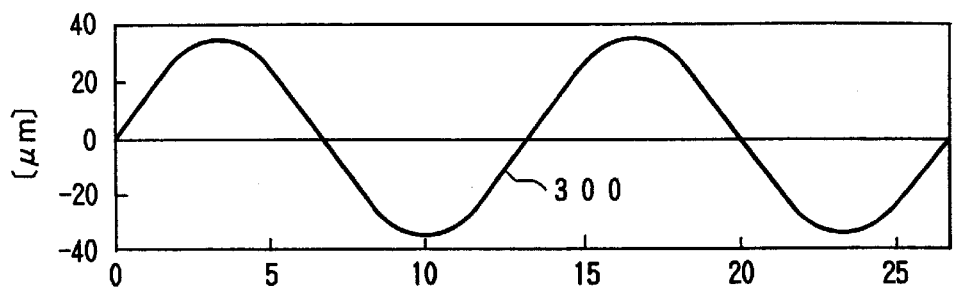
FIGS. 1A to 1D are time charts for a positioner displacement, a speed, an acceleration, and a driving current in a single stage positioner carriage.
Figure 1B:
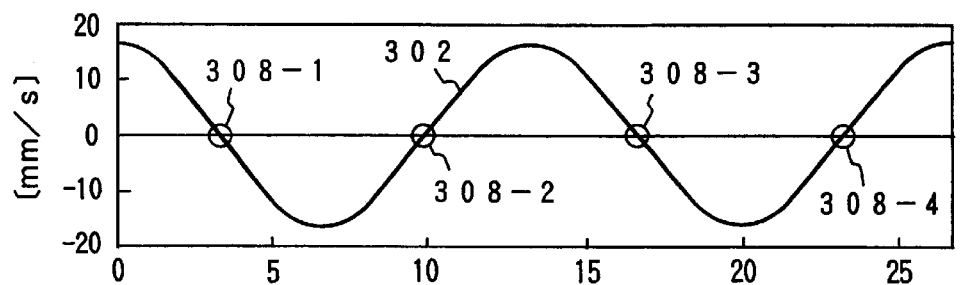
Figure 1C:
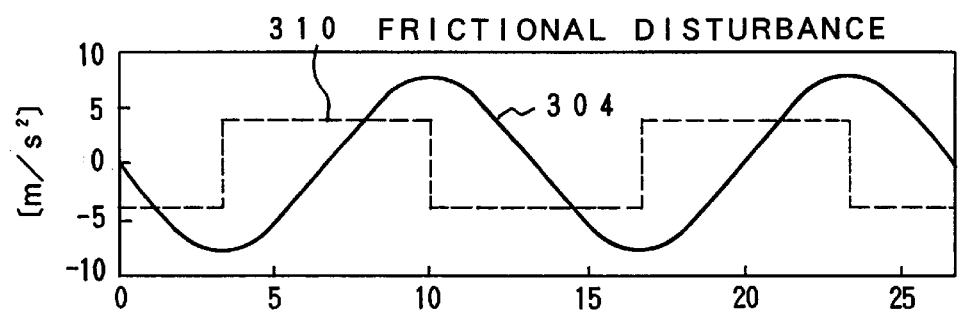
Figure 1D:
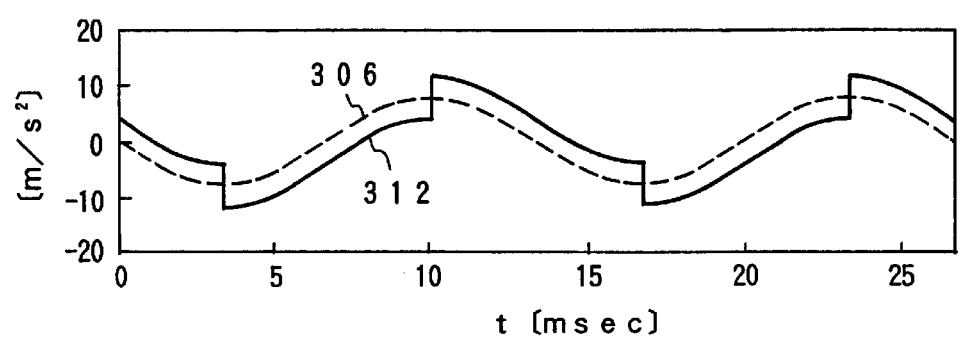
Figure 2A:
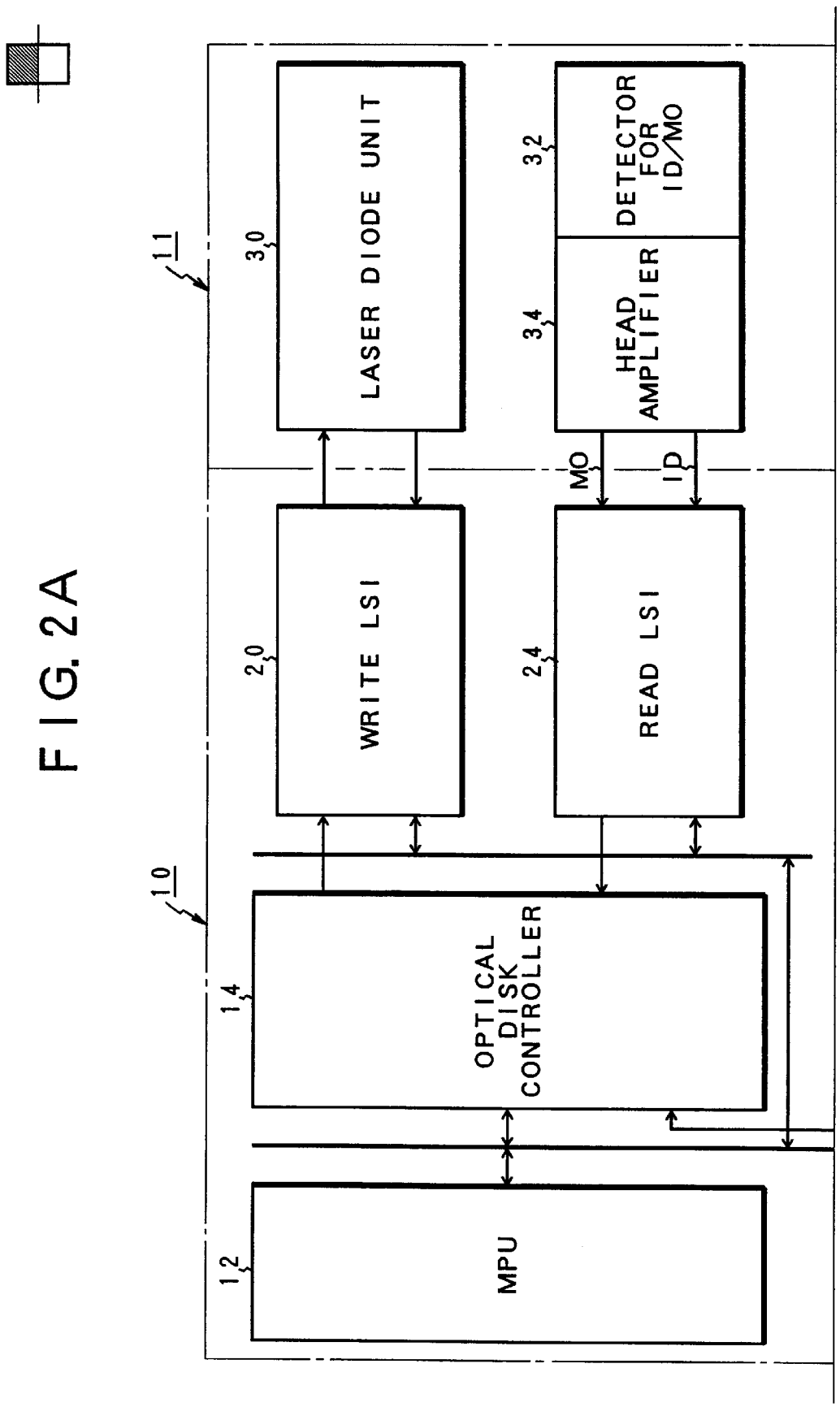
FIGS. 2A and 2B are block diagrams of an optical disk drive to which the invention is applied.
Figure 2B:
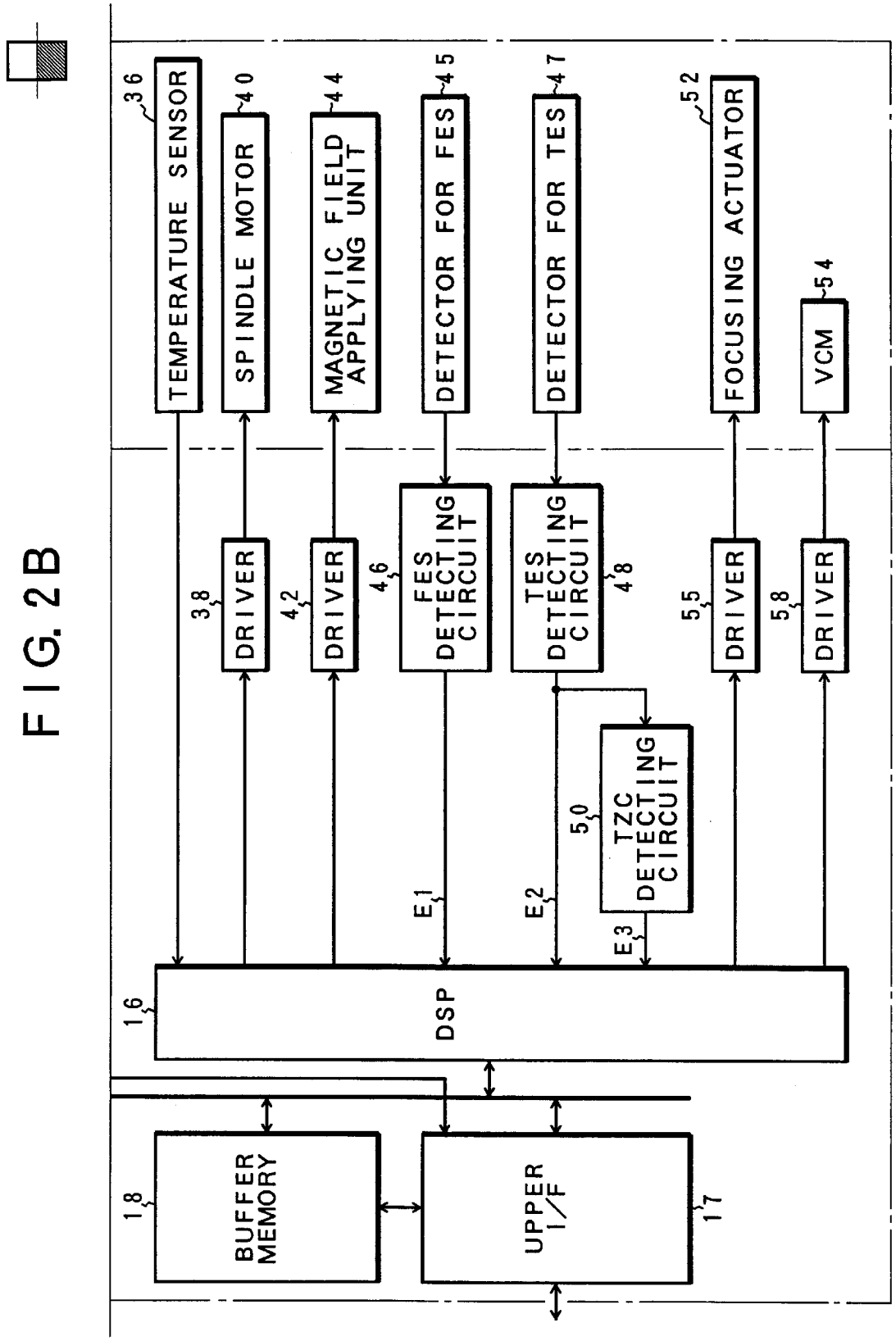

FIGS. 2A and 2B show a storage apparatus of the invention and relates to an optical disk drive as an example. The optical disk drive of the invention is constructed by a control unit 10 and an enclosure 11. The control unit 10 has: an MPU 12 to perform a whole control of the optical disk drive; an upper interface 17 to transmit and receive commands and data to/from an upper apparatus; an optical disk controller (ODC) 14 to perform processes necessary to write and read data to/from an optical disk medium; a DSP 16; and a buffer memory 18. The buffer memory 18 is used in common by the MPU 12, optical disk controller 14, and upper interface 17. A formatter and an ECC unit are provided for the optical disk controller 14. At the time of a write access, the formatter divides NRZ write data on a sector unit basis of the medium and forms a recording format, and the ECC unit forms an ECC code on a sector write data unit basis and adds it and, if necessary, forms a CRC code and adds it. Further, sector data which was ECC encoded is converted into, for example, a 1–7 RLL code. At the time of a read access, sector read data is 1–7 RLL inversely converted and subsequently CRC checked by the ECC unit and, thereafter, is subjected to error detection and correction. Further, the NRZ data of the sector unit is coupled by the formatter and transferred to the upper apparatus as a stream of NRZ read data. A write LSI 20 is provided for the optical disk controller 14. A write modulating unit and a laser diode control unit are provided for the write LSI 20. The laser diode unit 30 has a laser diode and a detector for monitoring. The write LSI 20 converts write data into data of a data format in the PPM recording or PWM recording (also referred to as a mark recording or edge recording). As an optical disk to which the recording and reproduction are performed by using the laser diode unit 30, namely, a rewritable MO cartridge medium, any of media of 128 MB, 230 MB, 540 MB, 640 MB, 1.3 GB, and the like can be used. Among them, with respect to the MO cartridge medium of 128 MB, the pit position recording (PPM recording) in which data is recorded in correspondence to the presence or absence of a mark on the medium is used. A recording format of the medium is a zone CAV and the number of zones of a user area is equal to 1 in case of the 128 MB medium. As for the MO cartridge media of 230 MB, 540 MB, 640 MB, and 1.3 GB corresponding to the high density recording, the pulse width recording (PWM recording) in which edges of a mark, namely, the front edge and the rear edge are made correspond to data is used. A difference between storage capacities of the 640 MB medium and 540 MB medium is based on a difference of sector capacities. When the sector capacity is equal to 2048 bytes, the storage capacity is equal to 640 MB. When the sector capacity is equal to 512 bytes, the storage capacity is equal to 540 MB. The recording format of the medium is the zone CAV and the number of zones of the user area is equal to 10 in case of the 230 MB medium, to 18 in case of the 540 MB medium and 1.3 GB medium, and to 11 in case of the 640 MB medium. In this manner, the optical disk drive of the invention can cope with the MO cartridges of the storage capacities such as 128 MB, 230 MB, 540 MB, 640 MB, and 1.3 GB, and further, 230 MB, 540 MB, 640 MB, and the like corresponding to the direct overwrite. Therefore, when the MO cartridge is loaded into the optical disk drive, an ID portion of the medium is first read out, the kind of medium is recognized by the MPU 12 from a pit interval, and the recognized kind as a recognition result is notified to the optical disk controller 14. As a reading system for the optical disk controller 14, a read LSI 24 is provided. A read demodulating unit and a frequency synthesizer are built in the read LSI 24. A photosensing signal of the return light of the beam from the laser diode by a detector 32 for ID/MO provided for the enclosure 11 is inputted as an ID signal and an MO signal to the read LSI 24 through a head amplifier 34. Circuit functions of an AGC circuit, a filter, a sector mark detecting circuit, and the like are provided for the read LSI 24. The read LSI 24 forms a read clock and read data from the inputted ID signal and MO signal and demodulates PPM data or PWM data into the original NRZ data. Since the zone CAV is used, the MPU 12 performs a setting control of a frequency division ratio to generate a zone correspondence clock frequency to the frequency synthesizer built in the read LSI 24. The frequency synthesizer is a PLL circuit having a programmable frequency divider and generates a reference clock, as a read clock, having a predetermined inherent frequency according to a zone position on the medium. The read data demodulated by the read LSI 24 is sent to the reading system of the optical disk controller 14 and 1–7 RLL inversely converted. After that, it is subjected to a CRC check and an ECC process by the decoding function of the ECC unit, so that the NRZ sector data is reconstructed. Subsequently, it is converted to a stream of the NRZ read data in which the NRZ sector data is coupled by the formatter and transferred to the upper apparatus by the upper interface 17 via the buffer memory 18. A detection signal of a temperature sensor 36 provided on the enclosure 11 side is supplied to the MPU 12 via the DSP 16. The MPU 12 controls each of the light emitting powers for reading, writing, and erasing in the laser diode unit 22 to the optimum value on the basis of the environmental temperature of the unit in the apparatus detected by the temperature sensor 36.

The MPU 12 controls a spindle motor 40 provided on the enclosure 11 side by a driver 38 via the DSP 16. Since the recording format of the MO cartridge is the zone CAV, the spindle motor 40 is rotated at a predetermined speed of, for example, 3000 rpm. The MPU 12 controls a magnetic field applying unit 44 using an electromagnet provided on the enclosure 11 side through a driver 42 via the DSP 16. The magnetic field applying unit 44 is arranged on the side opposite to the beam irradiating side of the MO cartridge loaded in the apparatus and supplies an external magnetic field to the medium at the time of the recording, erasure, or the like. The DSP 16 has a servo function to position the beam from the laser diode 30 for the medium and performs: a seek control (coarse control) for seeking the light spot to the target track so as to enter an on-track state; a track-following control (fine control) for allowing the light spot to trace the center of the target track; and further, a track jump control for moving the light spot to an adjacent track. The seek control and the track-following control can be executed simultaneously in parallel with the write access or read access for an upper command by the MPU 12. The track jump control is performed repetitively at every specified track position during the track-following control. To realize a servo function of the DSP 16, a detector 45 for FES for receiving the return light from the light spot on the medium is provided for the optical unit on the enclosure 12 side. An FES detecting circuit (focusing error signal detecting circuit) 46 forms a focusing error signal from a photosensing output of the detector 45 for FES and sends it to the DSP 16. A detector 47 for TES having a multidivision (6 division or 9 division) photosensing unit to receive the return light from the light spot on the medium is provided for the optical unit on the enclosure 11 side. A TES detecting circuit (tracking error signal detecting circuit) 48 forms a tracking error signal from a photosensing output of the detector 47 for TES and sends it to the DSP 16. A tracking error signal is also referred to as a tracking error signal. In the embodiment, the tracking error signal is formed by a push-pull method (also referred to as a far field method). The tracking error signal is inputted to a TZC detecting circuit (track zero-cross point detecting circuit) 50 and a track zero-cross pulse is formed and inputted to the DSP 16. Further, to control the position of a light spot on the medium, the DSP 16 controls a focusing actuator 52 and a VCM 54 through drivers 55 and 58.

An outline of the enclosure 11 in the optical disk drive is as shown in FIG. 3. The spindle motor 40 is provided in a housing 60. By inserting an MO cartridge 64 from the side of an inlet door 62 to a hub of a rotary shaft of the spindle motor 40, the loading in which an internal MO medium 66 is loaded to a hub of the rotary shaft of the spindle motor 40 is performed. The single stage positioner mechanism is constructed by a carriage 68, an objective lens 70, a fixed optical system 72, and a mirror 74. The carriage 68 which can be freely moved by the VCM 54 in the direction which transverses the tracks on the medium is provided below the MO medium 66 of the loaded MO cartridge 64. The objective lens 70 is mounted on the carriage 68, allows the beam from a laser diode provided for the fixed optical system 72 to enter through the rising mirror 74, and forms an image of a light spot onto the medium surface of the MO medium 66. The objective lens 70 is moved in the optical axial direction by the focusing actuator 52 shown in the enclosure 11 in FIG. 2. The light spot can be moved in the radial direction which transverses the tracks on the medium by the linear driving of the carriage 68 by the VCM 54. The carriage 68 is supported by a slide bearing to two guide rails which are fixedly arranged and simultaneously performs a seek control known as a coarse control for moving the light spot to an arbitrary track position and a track-following control known as a fine control for allowing the laser beam to trace the track center at the sought track position. As a single stage positioner mechanism as mentioned above, a mechanism disclosed in, for example, JP-A-9-312026, JP-A-9-54960, or the like can be used.

Feedback Control System of Track Jump Control

FIG. 4 is a block diagram showing a fundamental concept of an embodiment of a feedback system having a track jump control unit 101 of the positioner in the storage apparatus of the invention. The fundamental feedback control system of a carriage 88 is constructed by a tracking error detecting unit 78, a feedback control unit 80, and a carriage driving unit 86. The tracking error detecting unit 78 optically detects a tracking error signal TES as a difference between the tracking position that is fluctuated due to the medium eccentricity and the position of the laser beam and outputs the TES signal. A repetitive eccentricity disturbance due to the eccentricity of the medium is applied to an input of the tracking error detecting unit 78. The feedback control unit 80 receives the tracking error signal TES and drives the carriage 88 by the carriage driving unit 86 so as to eliminate a deviation amount from the track center of the light spot. The feedback control unit 80 outputs a feedback control signal $I_{FB}$ by, for example, a PID arithmetic operation. The control signal $I_{FB}$ becomes a feedback current instruction value to the carriage driving unit 86 using the VCM 54 shown in FIG. 3. A selector 110 is provided between the feedback control unit 80 and carriage driving unit 86. The selector 110 has two input terminals 110-1 and 110-2. During the track-following control, the selector 110 is switched to the input terminal 110-1 side as shown in the diagram and outputs the control signal $I_{FB}$ from the feedback control unit 80 to the carriage driving unit 86 through an addition point 84. At the time of the 1-track jump, the selector is switched to the input terminal 110-2 side and supplies a track jump signal (current instruction value) $I_{TJ}$ that is supplied at this time to the carriage driving unit 86 through the addition point 84 and allows the positioner to jump by one track by the driving of the carriage 88. In addition to the fundamental feedback control system for such track-following control and track jump as mentioned above, in the invention, a selector 108, a learning control unit 82, and the adder 84 are provided between the feedback control unit 80 and carriage driving unit 86. Even during the track-following control or the track jump, the learning control unit 82 always adds a feedforward signal (hereinafter, simply referred to as an "FF signal") for repetitive disturbance compensation which includes the rotation eccentricity of the medium and is obtained by the learning control to the addition point 84 and drives the carriage 88. The learning capture of the FF signal for repetitive disturbance compensation in the learning control unit 82 is performed at the state of the initializing process at which, for example, a cartridge medium is loaded into the apparatus. At the time of the learning process, the selector 108 is switched to the input terminal 108-1 side and receives the control signal IF, from the feedback control unit 80. The learning capture is performed by a learning algorithm, which will be explained hereinlater. The FF signal for repetitive disturbance compensation is learned and captured by the continuous tracking (continuous tracking without a kick back or a track jump) of the spiral tracks within a range between the track formed at a position of several tracks from the first track and the track formed at a position of tens of tracks therefrom in the disk rotation. After completion of the learning, the selector 108 is switched again to the input terminal 108-2 side. After that, there is also a case where the learning operation by the continuous tracking is performed as necessary and the FF signal is updated. However, fundamentally, during either the subsequent track jump or the track-following control, the selector 108 is switched to the input terminal 108-2 side. The learning control unit 82 generates the FF signal (which has already learned and captured) synchronously with the medium rotation irrespective of the interval during the track-following control or the track jump.

Further, in the track jump control unit 101 of the invention, a low pass filter 112, a sample holder 114 having a sample switch 116 and a holder 118, and a selector 120 are provided between the feedback control unit 80 and adder 84. The system comprising the low pass filter 112, sample holder 114, and selector 120 samples and holds a value just before the track jump of a low band component of the feedback control signal during the track-following control, adds the sampled and held value to the track jump signal $I_{TJ}$ and the signal Γrepeat from the learning control unit 82 by the adder 84, and drives the carriage 88 during the track jump. Therefore, the sample holder 114 holds the value just before the track jump of the low band component during the feedback control during the track-following control obtained through the low pass filter 112 into the holder 118 and adds it to the adder 84 through the selector 120 which has already been switched to an input terminal 120-2 side during the track jump. The low band component in the feedback control signal just before the track jump which is held in the holder 118 denotes the final value of the low band component of the control signal for track-following control just before the track jump. The above description relates to the fundamental concept. In the actual apparatus, the low pass filter 112 is not applied to the output of the feedback control unit 80 in order to obtain the low band component of the control signal but an output of a low band emphasizing filter which is calculated in the feedback control unit 80 or the like is used.

Figure 5A:
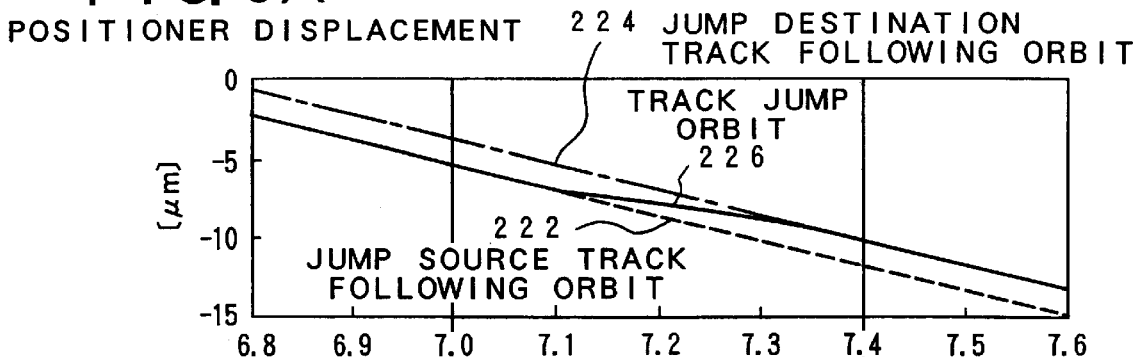
FIGS. 5A to 5D are time charts for a positioner displacement, a positioner speed, a track jump acceleration, and a disturbance compensation in a track jump control for feed-forward outputting a learning result of a repetitive disturbance.
Figure 5B:
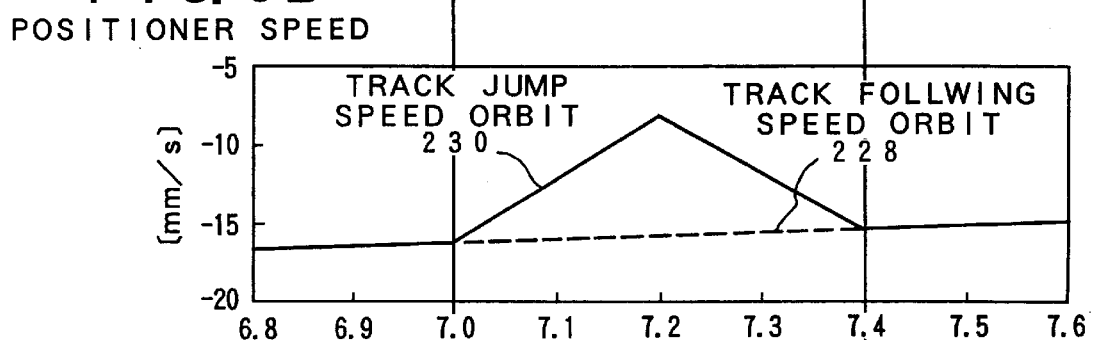
Figure 5C:
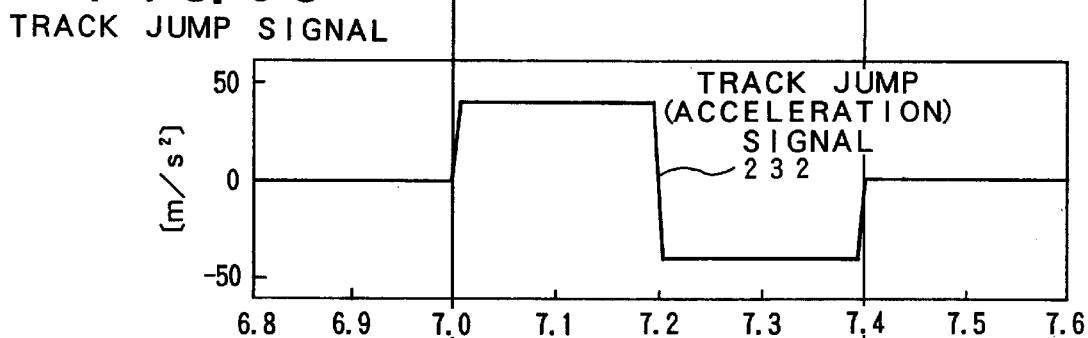
Figure 5D:
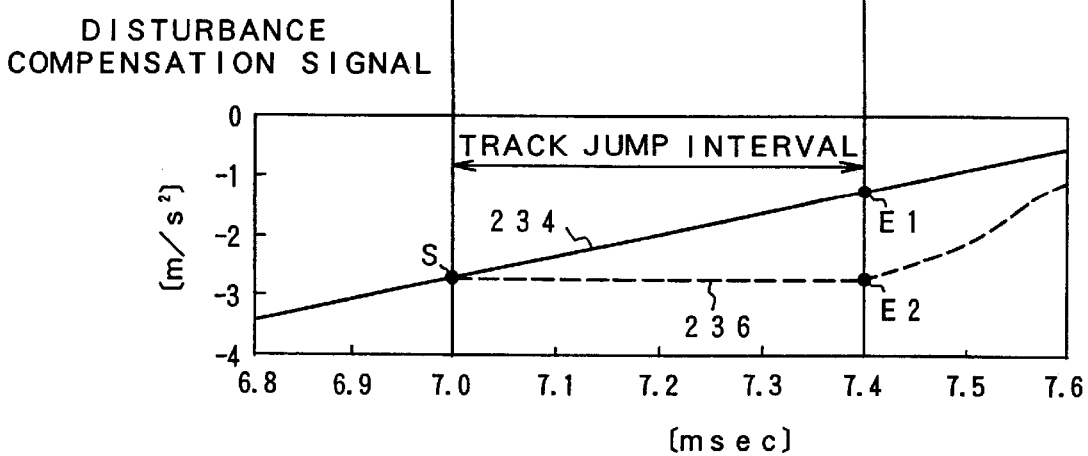

FIGS. 5A to 5D are time charts for the control process by the FF signal for repetitive disturbance compensation during the track jump by the learning control unit 82 provided for the track jump control unit 101 in FIG. 4. FIG. 5A shows a positioner displacement. FIG. 5B shows a positioner speed. FIG. 5C shows a track jump signal (acceleration FF signal for allowing the positioner to jump). Further, FIG. 5D is an explanatory diagram in the case where the repetitive disturbance compensation during the track jump is performed by the learning control unit 82 and the case where the low band component just before the track jump is FF outputted. FIGS. 5A to 5D show the case where a track pitch TP of the medium is set to TP=1.6 μm. The track jump signal $I_{TJ}$ is assumed to be a bang bang of a simple acceleration/deceleration target as shown in FIG. 5C. A track jump acceleration is set to ±40 m/sec². Further, conditions of the eccentricity, friction, and the like are set such that an eccentricity amplitude RRO is equal to 70 μmp-p and a coefficient of friction is equal to μ=0.4. In the positioner displacement of FIG. 5A, an orbit at the time of the track-following control and an orbit at the time of the track jump control are shown. That is, track following orbits 222 and 224 shown by two parallel lines. For example, the track following orbit 222 denotes a jump source track following orbit before track jump and the track following orbit 224 indicates the jump destination track following orbit after the track jump. An orbit 226 connecting them indicates a track jump orbit. FIG. 5B shows a speed orbit of the positioner carriage in the track jump having the track jump orbit 226 as shown in FIG. 5A. At the time of the track jump, a track jump speed orbit 230 is obtained for a track eccentricity following speed orbit 228 in the track-following control. As shown in the track jump control unit 101 in FIG. 4, in the case where the high precision FF signal for repetitive disturbance compensation obtained as a capture result by the learning of the learning control unit 82 is added to the addition point 84 during the track jump, an FF signal 234 connecting points S and E1 in FIG. 5D is added and the repetitive disturbance can be FF compensated at high precision. Therefore, the accurate track jump can be performed as shown in the track jump orbit 226 in FIG. 5A and the track jump speed orbit 230 in FIG. 5B. On the other hand, in the case where the low band component of the feedback control signal just before the track jump is added as an FF signal to the addition point 84 during the track jump, a constant value 236 is fed-forward during the track jump as shown by a broken line in FIG. 5D. A compensation error occurs during the track jump and becomes a compensation error as much as an interval between points E1 and E2 when the track jump is finished. The compensation error increases as the eccentricity amount of the medium is larger. It increases as the track jump time is longer. Particularly, in the single stage positioner as a target of the invention, since the track jump is performed by activating the whole carriage, the track jump time certainly becomes longer than that of the conventional double stage positioner in which only the lens is moved, so that the compensation error increases. When such a compensation error occurs, the track jump orbit in FIG. 5A also has an error and it is necessary to correct the compensation errors in the track lead-in and track-following control after that. Therefore, there is a possibility that the lead-in time becomes long or the track lead-in operation fails. On the other hand, in the invention, as shown in FIG. 5D, even in the track lead-in operation and track-following control during the track jump and after the track jump, the compensation error has been sufficiently reduced by the high precision FF signal for repetitive disturbance compensation which is outputted as a learning result from the learning control unit 82 and the compensation precision has risen. Therefore, the track lead-in control after the track jump is more stabilized and a success ratio of the track jump is also improved.

FF Output for Repetitive Disturbance Compensation by Learning Control During Track Jump FIG. 6 is an equivalent block diagram of the feedback control system in case of performing the learning control by the track jump control unit 101 in FIG. 4. FIG. 6 is the equivalent block diagram for explaining the method of learning and capturing the FF signal for repetitive disturbance compensation in the feedback system having the track jump control unit 101 of the invention in FIG. 4. That is, as mentioned above, at the time of the learning capture of the FF signal for repetitive disturbance compensation, since it is performed in the continuous track following state in a range from a few disk rotating times to tens of disk rotating times without the track jump, the block regarding the track jump is deleted from FIG. 4. Specifically speaking, during the learning capture, the selector 110 in FIG. 4 is set to the input terminal 110-1 side, the selector 108 is set to the input terminal 108-1 side, and the selector 120 is set to the input terminal 120-1 side. Therefore, by reflecting them, unnecessary signal lines, blocks, and the like are deleted. In FIG. 6, at the time of the learning control, the feedback control system of the positioner is constructed by: the tracking error detecting unit 78; feedback control unit 80; learning control unit 82; adder 84; carriage driving unit 86; and positioner carriage 88. The learning control unit 82 receives the control signal $I_{FB}$ as a feedback current instruction value outputted from the feedback control unit 80 and captures a learning control signal I^repeat as an approximated function of an unknown driving current function Irepeat to suppress tracking errors such as repetitive frictional disturbance, eccentricity disturbance, and the like in association with the eccentricity rotation of the medium by a learning law. When the learning is finished, the learning control signal I^repeat obtained as a learning result is outputted synchronously with the medium rotation. The learning control signal I^repeat is added as a feed-forward control signal to the control signal $I_{FB}$ from the feedback control unit 80 by the adder 84, thereby obtaining a driving signal $I_{VCM}$. The driving signal $I_{VCM}$ drives the carriage 88 via the carriage driving unit 86. A large frictional disturbance is periodically applied to the carriage 88 as a force disturbance 90 at a point of the moving velocity of 0 and a point when the direction almost steeply changes in response to the inversion of the moving velocity due to the reciprocating motion of the carriage 88 in association with the eccentricity rotation of the medium.

FIG. 7 is a functional block diagram of the learning control unit 82 in FIG. 6. The learning control unit 82 comprises: a control unit 92; a sample processing unit 94; an approximated function calculating unit 96, a ring buffer memory 98; and a feed-forward output unit (hereinafter, referred to as an "FF output unit") 100. A clock signal E1 and an index signal E2 which is obtained synchronously with one rotation of the medium are inputted to the control unit 92. The control unit 92 sets I. learning mode II. learning result output mode as operating modes of the learning control unit 82. The learning mode is executed at the time of a loading process after the medium is inserted and the learning control signal I^repeat as a repetitive approximated function is learned in accordance with a learning law. In the learning result output mode, the learning law does not operate but the learning control signal I^repeat obtained as a learning result is outputted synchronously with the medium rotation and is added to the feedback control system as a feed-forward output. Therefore, in the learning mode, the control unit 92 makes the sample processing unit 94, approximated function calculating unit 96, ring buffer memory 98, and FF output unit 100 operative. In the learning result output mode after completion of the learning, the control unit 92 makes the ring buffer memory 98 and FF output unit 100 operative.

A learning algorithm which is executed by the approximated function calculating unit 96 provided for the learning control unit 82 in FIG. 7 will now be described. In the feedback control system in FIG. 6, it can be regarded that most of the driving current $I_{VCM}$ to drive the carriage 88 synchronously with the medium rotation is a repetition signal of the period synchronized with the medium rotation and can be captured as a current pattern as shown in, for example, FIG. 8. A case where the current pattern which is periodically repeated in FIG. 8 is captured as an unknown driving current function Irepeat(t) and approximately expressed by the height of each rectangular function obtained by dividing the period $T_L$ for one medium rotation into N intervals will now be considered. A time width T for each of the N rectangular functions is $$T = T_L/N \qquad (3)$$

Now, assuming that the height of each rectangular function obtained by dividing the current pattern in FIG. 8 into N intervals is labeled to $C_i$ (where, i=0, 1, . . . , N−1), the approximated function I^repeat is obtained by the following equation.

$$I\text{^repeat}(t) = C_i \qquad (4)$$

where, i=floor(t/T)
 T=$T_L$/N
 0≦t<$T_L$

The floor( ) function of the equation (4) shows the maximum integer value which is smaller than or equal to the argument in ( ). For example, when the argument in ( ) is equal to (0~0.9), floor(0~0.9)=0. When the argument in ( ) is equal to (1.0~1.9), floor(1.0~1.9)=1. The time t is reset by the index signal which is obtained at a predetermined time point in every medium rotation, so that it has a value of 0≦t<$T_L$. As for the height $C_i$ of each rectangular function of the approximated function I^repeat of the equation (4), the learning is progressed in accordance with the following equation by integrating the control signal $I_{FB}$ as a feedback current command value in the time width corresponding to the rectangular function.

$$•_i = K_{learn} \cdot I_{FB}(t) \qquad (5)$$

where, i=floor(t/T)

$K_{learn}$ in the equation (5) denotes a learning gain and is a positive constant. As shown in the equation (5), the value of (i) is determined in accordance with the value of t, namely, the rectangular function $C_i$ as a learning target is selected, and an integration arithmetic operation using the value $I_{FB}(t)$ of the control signal at that time as an input is executed. According to the learning law according to the equation (5), the height of each rectangular function is sequentially integrated until the value of $I_{FB}$ as an input of the learning law is equal to almost zero. Therefore, after the settlement of the learning, the approximated function I^repeat(t) which is expressed by the heights of $C_0$ to $C_{N-1}$ of the rectangular functions becomes a function which approximates Irepeat(t) as an unknown driving current function.

A learning result $$I\text{^repeat}(t) = C_i$$

where, i=floor(T/N)
 T=$T_L$/N
 0≦t<$T_L$ according to the equation (5) becomes a feed-forward output in the learning result output mode and is directly inputted to the driving current $I_{VCM}$ of the carriage driving unit 86 to drive the positioner carriage 88. Therefore, it seems from the feedback control system as if the repetitive disturbance having periodicity were extinguished. According to such a compensating method of the repetitive disturbance by the learning in the invention, even if it takes a slightly long time for settlement to obtain the learning result, that is, even if the learning gain $K_{learn}$ for learning is low, a signal of a high frequency band, strictly speaking, a compensation signal of a high frequency band for the repetitive disturbance having the periodicity can be included in a learning control signal which is finally obtained. The height $C_i$ of each rectangular function obtained by the learning law of the equation (5) has been stored in a relevant memory cell in the ring buffer memory 98.

Figure 9:
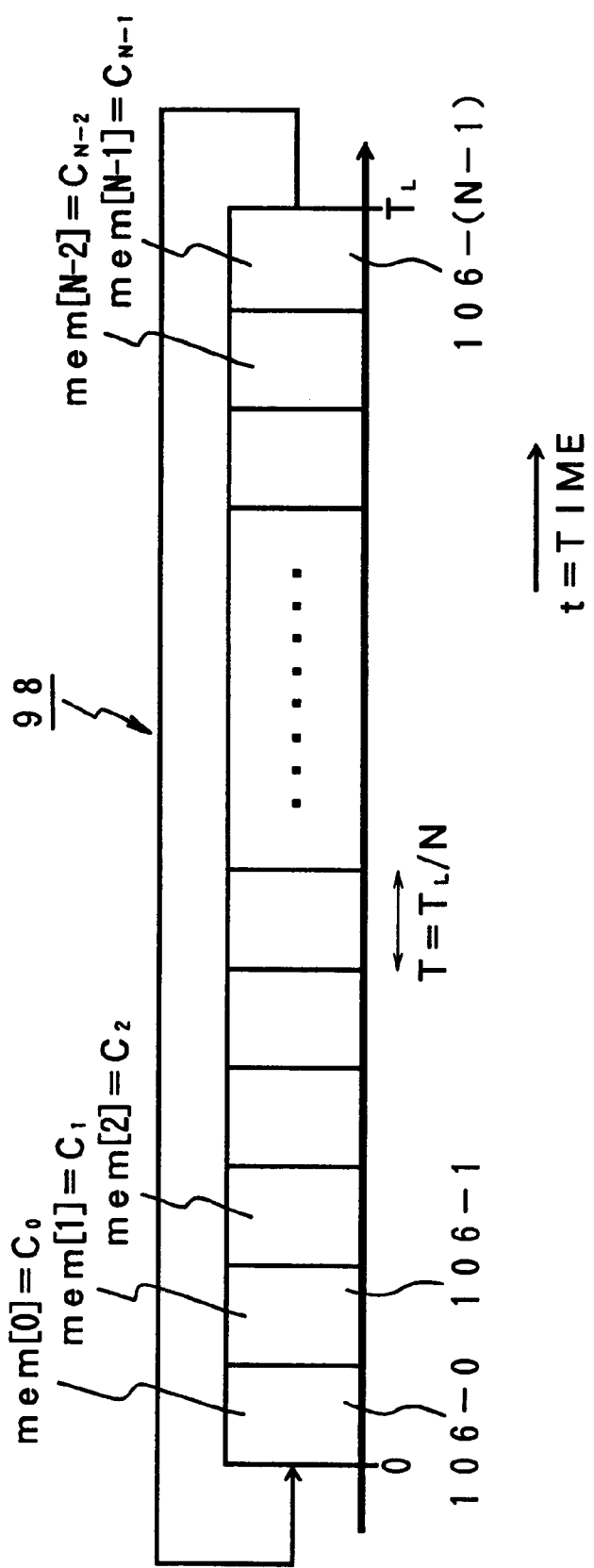
FIG. 9 is an explanatory diagram of a memory in FIG. 7.

FIG. 9 shows a memory construction of the ring buffer memory 98 provided for the learning control unit 82 in FIG. 7. The ring buffer memory 98 has N memory cells 106-0 to 106-(N−1) in correspondence to the division number N of the period $T_L$ for one medium rotation. The value of the height $C_i$ of each rectangular function calculated by the equation (5) synchronously with the disk rotation is stored as mem[i] into a cell address (i) of the memory cells 106-0 to 106-(N−1). That is, the time t shown in correspondence to the positions of the memory cells 106-0 to 106-(N−1) in the ring buffer memory 98 in FIG. 9 is time which is reset by the index signal obtained every medium rotation. The time t is detected by setting the time of the rotation start position when the index signal is obtained to t=0 and by setting this time point to a start point in every medium rotation. The time width T of each rectangular function shown in FIG. 8 is set to a longer width as compared with a sampling period $T_{sample}$ of the input signal $I_{FB}$ by the sample processing unit 94 in FIG. 7. The memory cell as a target in the ring buffer memory 98 to which the learning calculation result of the equation (5) is applied at sampling time t is determined by the calculation of the address (i) of the following equation.

$$i = \text{floor}(t/T) \qquad (6)$$

T denotes the time width of each rectangular function in FIG. 8 and T=$T_L$/N. For example, assuming that the rotational speed of the medium is equal to 4500 rpm, its rotating frequency is equal to 75 Hz and the period $T_L$ of one rotation is $T_L$=13.3 msec. It is now assumed that one period $T_L$ is divided into, for example, N=128 intervals. In this case, the time width T for each rectangular function is $$T = T_L/N = 104.2 \; \mu\text{sec}$$

Therefore, now assuming that a sampling frequency of the control signal $I_{FB}$ from the feedback control unit 80 to the learning control unit 82 is equal to 55 kHz, namely, sampling period $T_{sample}$=18.18 $\mu$sec, the control signal $I_{FB}$ is sampled about five times in the time width T of each rectangular function. That is, as for each rectangular function, the learning arithmetic operation of the equation (5) is performed approximately five times per medium rotation. A learning arithmetic operation when the learning law of the equation (5) is actually implemented to the DSP is given by the following equation.

$$\text{mem}[i] = \text{mem}[i] + K_{learn} \cdot T_{sample} \cdot I_{FB}(t) \qquad (7)$$

where, i=floor(t/T)

As will be obviously understood from the equation (7), the arithmetic operation results which are stored in the memory cells 106-0 to 106-(N−1) in FIG. 9 are based on the integration arithmetic operation in which the learning gain $K_{learn}$ is used as an integration gain and the control signal $I_{FB}$ is used as an input. That is, it is a process for reading out the learning result mem[i] previously stored in the memory cells in the corresponding address (i), adding $$\{K_{learn} \times T_{sample} \times I_{FB}(t)\}$$

calculated at every sampling timing to the read-out learning result mem[i], and after that, storing an addition result. The arithmetic operation of the equation (7) will now be described hereinbelow with respect to the height $C_i$ of each rectangular function. That is, an initial value (ordinarily, zero) has been set into mem[i] before learning. The height $C_i$ of the rectangular function is selected for a specific time interval in each disk rotation after the start of the learning, namely, for a period of time during which the condition of i=floor(t/T) is satisfied. The integration arithmetic operation of the equation (7) for mem[i] as a target is performed by using $I_{FB}(t)$ at that time as an input. For the other period of time, another rectangular function is selected and similar processes are executed. For a period of time when another rectangular function is selected, the value of mem[i] is not updated. After the disk rotates once and the rectangular function $C_i$ is again selected, the integration arithmetic operation of the equation (7) is further performed by using the integration result up to the previous rotation in which mem[i] has already been stored as an initial value. In the learning mode, simultaneously with the integrating process in the memory cell corresponding to the ring buffer memory 98 of the calculation result of the approximated function calculating unit 96 according to the equation (7), the FF output unit 100 likewise performs such a feed-forward control that the calculation result in the ring buffer memory 98 is read out and it is added by the adder 84 in FIG. 6 and a resultant addition value is added to the feedback control system. In the learning mode, with respect to the elapsed time of one rotational period $T_L$ from the time t=0 when the index signal E2 is obtained to a point when the index signal E2 is subsequently obtained, in a range from T=0 to T=$T_L$, the approximated function calculating unit 96 in FIG. 7 calculates the cell address (i) by the equation (6) and performs the storage of the calculation result $C_i$ into the ring buffer memory 98 by the approximated function calculating unit 96 by the output of an address control signal and the reading and output of the learning result at that time to the FF output unit 100. After the learning process according to the learning mode in the loading process of the medium is completed, the learning control unit 82 in FIG. 7 shifts the operating mode to the learning result output mode. In the learning result output mode, the control unit 92 makes the ring buffer memory 98 and FF output unit 100 operative and performs the feed-forward control in which the learning control signal I^repeat as a final learning result is read out, for example, at the same reading period as the sampling period $T_{sample}$ in the learning mode synchronously with the index signal E2 that is obtained every medium rotation, the read-out signal I^repeat is outputted to the adder 84 in FIGS. 5A to 5D from the FF output unit 100 and added to the control signal $I_{FB}$ obtained by the feedback control unit 80 at that time, the driving current $I_{VCM}$ is supplied to the carriage driving unit 86, and the positioner carriage 88 is driven so that the repetitive frictional disturbance is suppressed in association with the medium eccentricity. To guarantee the stability of the learning process in the learning mode, in the case where the learning result at the time when the arithmetic operation result has been stored in the ring buffer memory 98 is outputted to the feedback control system by the FF output unit 100, it is necessary to feed-forward output the learning result at the advanced time (lead time) in consideration of the time delay such as a phase delay or the like of the control target. Owing to the feed-forward output of the learning result at the lead time, there is no need to use a so-called phase-lead filter or the like. In the learning control unit 82, as shown in FIG. 6, since the current pattern serving as a feed-forward output is managed in correspondence to the time t, it is sufficient to select the memory cell in correspondence to the lead time in consideration of the phase delay of the control target and output the learning result at that time. That is, now assuming that the elapsed time from the start point for one medium rotational period when the index signal is obtained is equal to t, although the memory cell to store the learning result is selected by the equation (6), the selection of the memory cell for the feed-forward output by the FF output unit 100 is calculated by the following equations when it is assumed that the lead time is labelled as Δtlead.

$$\begin{cases} i = \text{floor } \{(t + \Delta tlead)/T\}, \\ \quad \text{if } 0 \leq t < (T_L - \Delta tlead) \\ i = \text{floor } \{(t + \Delta tlead - T_L)/T\}, \\ \quad \text{if } (T_L - \Delta tlead) \leq t < T_L \end{cases} \quad (8)$$

As shown in the first equation of the equations (8), fundamentally, the memory cell number (i) is determined on the basis of the time obtained by adding the lead time Δtlead to the time t1. However, when t exceeds ($T_L$−Δtlead), namely, when ($T_L$−Δtlead)≦t<$T_L$, the memory cell number (i) is calculated in accordance with the calculation as shown in the second equation of the equations (8). That is, the reading position is returned to the head in the ring buffer and the data is read out from an instant when t exceeds ($T_L$−Δtlearn). By performing the advance compensation for the feed-forward output of the learning result as mentioned above, such a situation that a response waveform in the case where the advance compensation is not performed becomes oscillatory is prevented and the stable learning result can be obtained.

Figure 10:
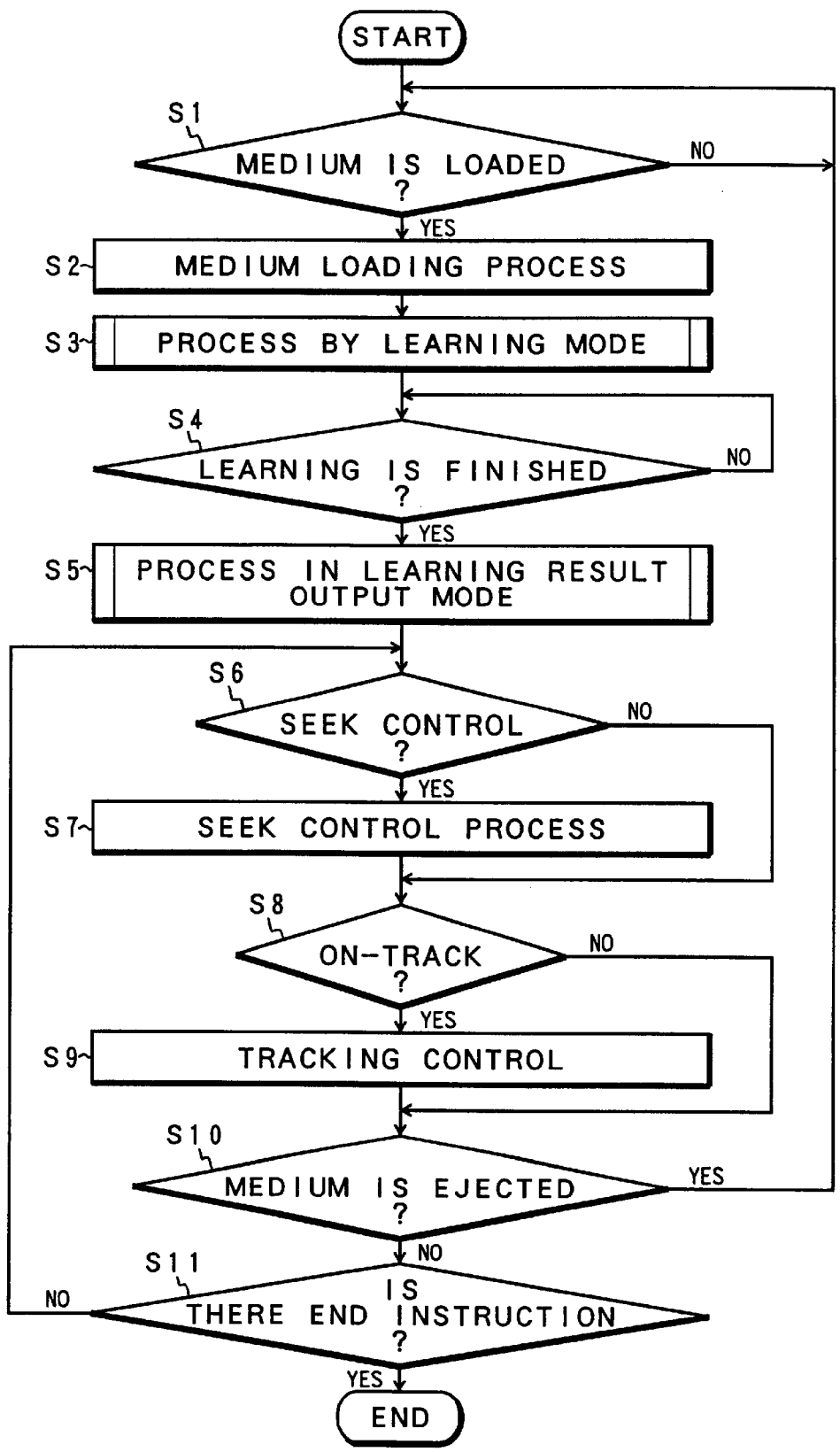
FIG. 10 is a flowchart for a whole control process in the embodiment of FIG. 6.

FIG. 10 is a flowchart for a positioning control in the storage apparatus of the invention having the learning control unit 82 in FIG. 6. First, in step S1, when the medium is loaded into the apparatus, a medium loading process according to a predetermined medium loading sequence is executed in step S2. In the medium loading process, a process in the learning mode in step S3 by the learning control unit 82 newly provided in the invention is executed. The end of the learning process in the learning mode is discriminated by I. the number of learning times, II. learning time, III. evaluation of the tracking error signal TES, or the like For example, in case of discriminating the end of the learning by the time setting, the number of times of rotation of the disk after the start of the learning is counted and when it is equal to the specified number of times, the learning is finished. When the end of the learning is confirmed in step S4, step S5 follows and the processing routine advances to the process in the learning result output mode. In the learning result output mode, the learning result obtained in step S3 is feed-forward outputted as a fixed value to the feedback control system. In the seek control and track-following control after step S6, therefore, the eccentricity disturbance synchronized with the medium rotation, particularly, the peak-like frictional disturbance occurring at a timing of the zero moving velocity in association with the reciprocating movement of the carriage corresponding to the medium eccentricity is effectively suppressed by a feed-forward output based on the learning result. A stable control environment without a repetitive disturbance is obtained in view of the feedback control system. Therefore, in the processes after the learning result output mode in step S5, if there is the seek control in step S6, step S7 follows. The seeking process for positioning the carriage toward the target track by controlling the velocity, what is called a coarse control is performed. When the light spot is moved to the target track so as to enter an on-track state by the seek control in step S8, the track-following control for allowing the laser beam to trace the target track center is performed in step S9. During the track-following control, a track jump control to return the light spot to the position that is one track before the present track is performed at the specified position of one rotation of the track. The seek control or on-track control in steps S6 to S9 corresponding to the process in the learning result output mode in step S5 is repeated until the medium ejection is discriminated in step S10. When the medium is ejected, the processing routine is returned to step S1. When the next medium is loaded, the learning process in the learning mode in step S3 is newly performed. When there is an end instruction in step S11, the series of processes is finished.

As for the process in the learning mode in step S4 by the learning control unit 82, at the time of the getting operation of the approximated function, the approximated function getting operation is performed at each of a plurality of positions in the disk radial direction. In this instance, in the approximated function getting operation at a plurality of positions, if the approximated function which has already been obtained at another position exists, the learning control unit 82 applies the learning algorithm by using the already existing approximated function data as an initial value. In the process in the learning result output mode in step S5 at the time of the feed-forward after the learning, the learning control unit 82 selects the approximated function to be used in accordance with the radial direction position at that time and performs the feed-forward operation. For example, an example in which there are 15000 tracks in a range from the inner region to the outer region on the disk will be considered. First, the approximated function getting operation is performed at a location near the 7500th track corresponding to the position near the center region. Subsequently, to obtain the approximated function at a point near the inner region, the light spot is sought and moved to a position near the 2500th track. The approximated function getting operation is performed at a position near the 2500th track by using another set of memory cells which is separately prepared to obtain the approximated function for the inner region. Subsequently, to obtain the approximated function at a point near the outer region, the light spot is sought and moved to a position near the 12500th track. The approximated function getting operation is performed at a position near the 12500th track by using another set of memory cells which is separately prepared to obtain the approximated function for the outer region. Assuming that the learning is finished when the disk rotates 100 times, for instance, the learning which is performed at the 7500th track is executed at a location between the 7500th track and the 7600th track. At the learning at the inner region which is executed after that, its approximated function is considered to be almost equal to the function obtained at the center region. Therefore, the initial value of the approximated function (initial value of each value in the memory cells) is not started from zero but the learning result at the center region is copied into the set of memory cells for the inner region and the learning is started by using it as an initial value. Thus, the learning time can be reduced. For example, the learning can be finished when the disk rotates 50 times. At the learning at the outer region, the learning time can be similarly reduced. The above operations are performed, for example, at the time of the medium loading. Three approximated functions for the inner region, center region, and outer region are prepared. In the subsequent operating state, when the light spot is moved to a track in a range from the first to the 5000th tracks and the reading/writing operation is performed, the approximated function obtained at a position near the 2500th track is fed-forward. When the light spot is moved to a track in a range from the 5001st to the 10000th tracks and the reading/writing operation is performed, the approximated function obtained at a position near the 7500th track is fed-forward. Further, when the light spot is moved to a track in a range from the 10001st to the 15000th tracks and the reading/writing operation is performed, the approximated function obtained at a position near the 12500th track is fed-forward. Consequently, for example, as compared with the case where the approximated function obtained at one position near the center region is used for the whole region from the inner region to the outer region, if the circularity of the track in the inner region on the disk differs from that in the outer region, if the difference between the phases or amplitudes of the repetitive disturbances in association with the spindle rotation in the inner region and the outer region cannot be ignored, or even if the magnitudes of the friction in the inner region and the outer region differ in case of using the pickup having the single stage structure, the track-following operation of a higher precision can be performed.

Figure 11:
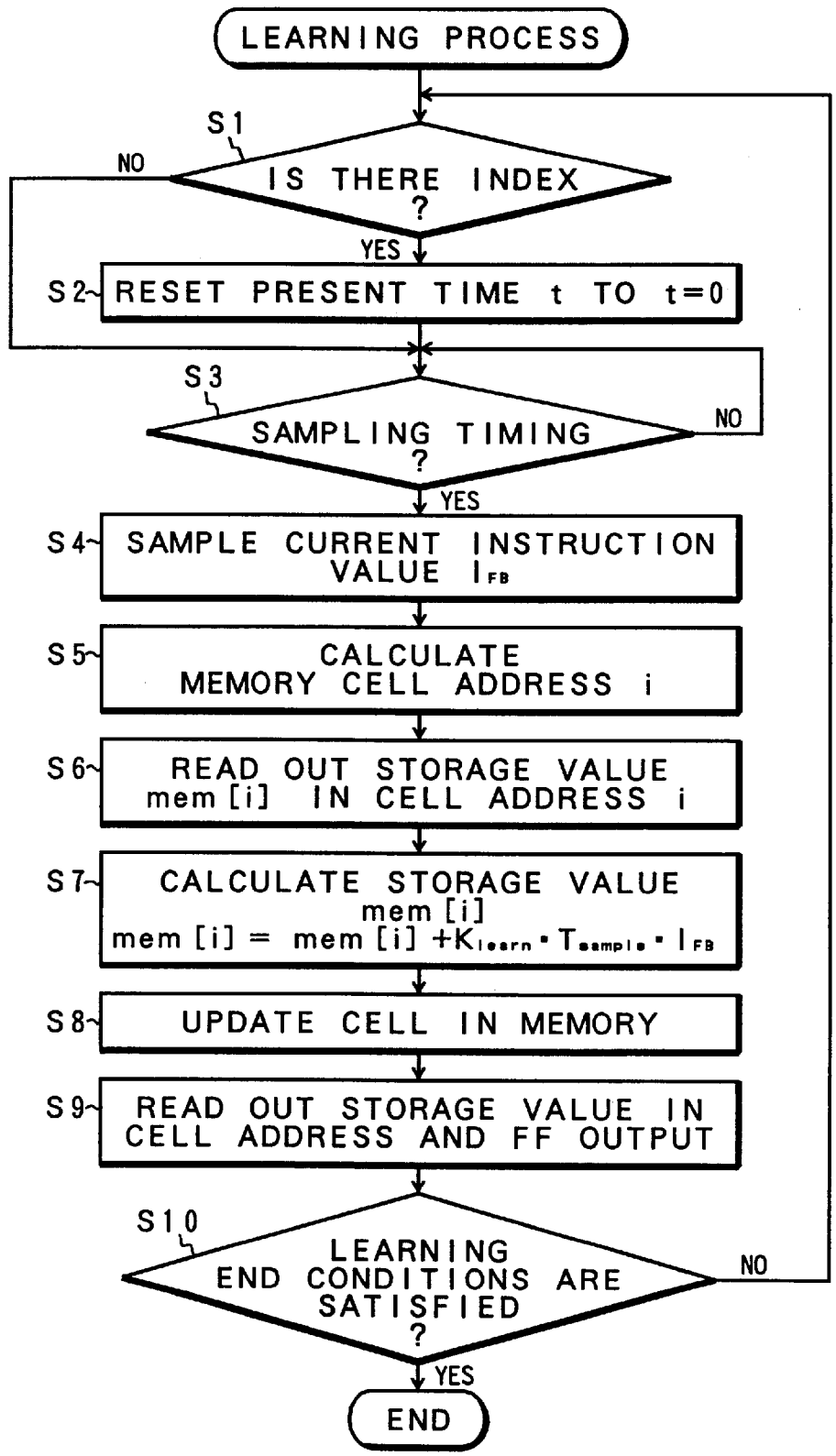
FIG. 11 is a flowchart for the learning control unit in FIG. 10.

FIG. 11 is a flowchart for the learning process in the learning mode by the learning control unit 82 in FIG. 7. In the learning process, the presence or absence of the index which is obtained every rotation of the medium is first checked in step Si. When the index is obtained, step S2 follows and the present time t is reset to t=0. Whether the time t is the sampling timing or not is discriminated in step S3. If YES, the current instruction value $I_{FB}$ as a control signal is sampled in step S4. The address (i) of the memory cell is calculated from the time t at that point in step S5 on the basis of the equation (4). The storage value mem[i] of the cell address (i) is read out in step S6. In step 57, a new storage value mem[i] is subsequently calculated in accordance with the equation (5). The newly calculated storage value is stored into the memory cell and updated in step S8. In step S9, the previous storage value in the cell address calculated by the equation (6), namely, the cell address that precedes by the lead time Δtlead is read out and feed-forward outputted to the feedback control system. The processes in steps S1 to S9 as mentioned above are repeated in step S10 until a learning end condition is satisfied, for example, the present time reaches a preset learning time.

Figure 12:
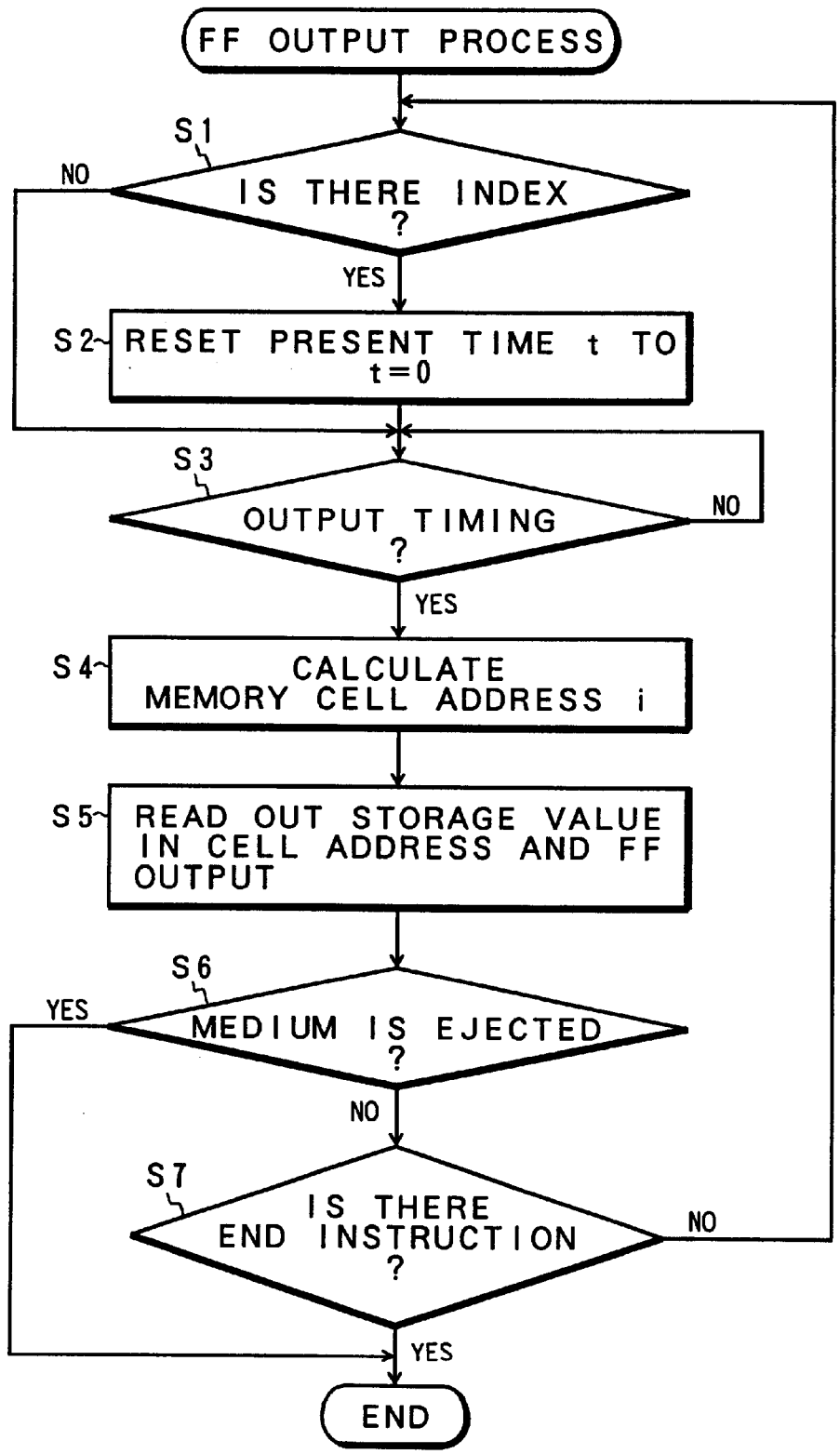
FIG. 12 is a flowchart for a feed-forward output process in FIG. 10.

FIG. 12 is a flowchart for a feed-forward outputting process in the learning result output mode of the learning control unit 82 in FIG. 7. In the feed-forward outputting process, the presence or absence of the index which is obtained every medium rotation is discriminated in step S1. When the index is obtained, the present time t is reset to t=0 in step S2. Whether the present time is an output timing or not is discriminated in step S3. It is assumed that the output timing is, for example, a timing that is determined by the same output period as the sampling period $T_{sample}$ in the learning mode in FIG. 11. When the output timing is discriminated in step S3, the address (i) in the memory cell based on the time obtained by adding the lead time Δtlead to the present time t by the equation (6) is calculated in step S4. In step S5, the storage value in the cell address is read out and feed-forward outputted to the feedback control system. If there is a medium ejection in step S6 or if there is an end instruction of the apparatus in step S7, the feed-forward output is finished.

Figure 13A:
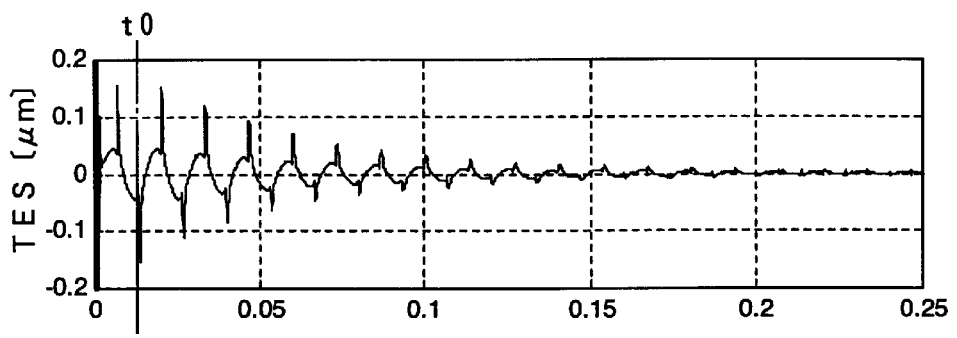
FIGS. 13A to 13D are waveform diagrams of a tracking error signal, a feedback control signal, a learning control signal, and a driving signal for a period of time from the start to the end of the learning according to the embodiment of FIG. 7.
Figure 13B:
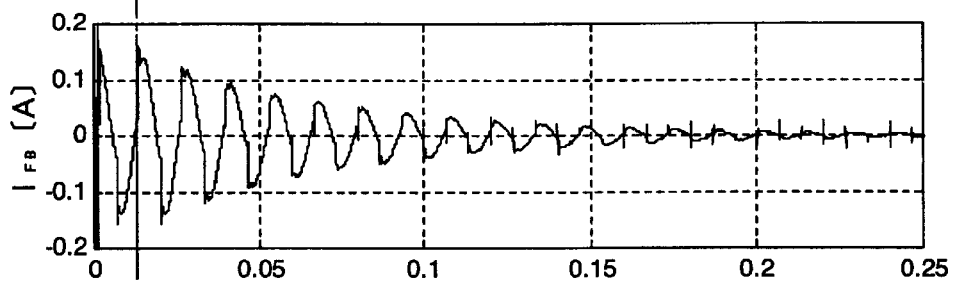
Figure 13C:
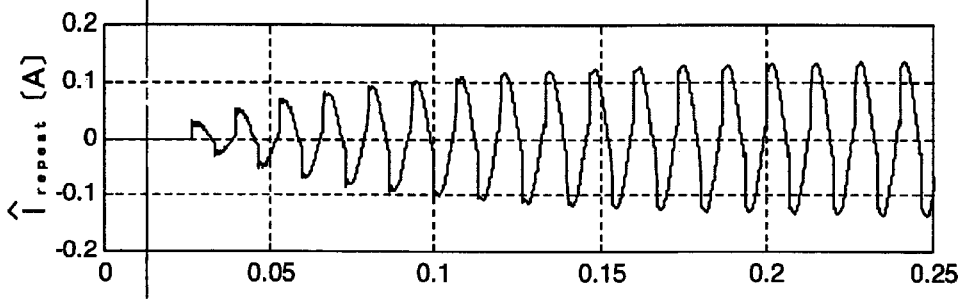
Figure 13D:
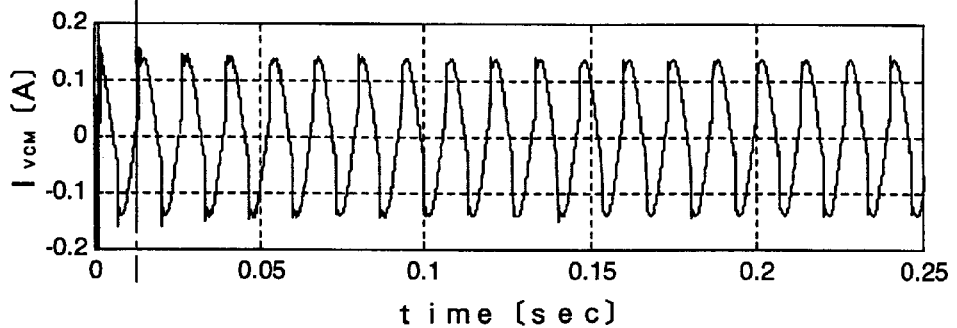

FIGS. 13A to 13D are waveform explanatory diagrams of the tracking error signal TES, feedback control signal $I_{FB}$, learning control signal I^repeat, and carriage driving signal $I_{VCM}$ for a period of time from the start of the learning to the end thereof by the learning control unit 82 in FIG. 6. An axis of abscissa indicates the time by seconds. FIG. 13A shows the tracking error signal TES. FIG. 13B shows the feedback control signal $I_{FB}$. FIG. 13C shows the learning control signal I^repeat. Further, FIG. 13D shows the carriage driving signal $I_{VCM}$. In FIGS. 13A to 13D, the learning process is started from time t0. Just after the start of the learning at time t0, the tracking error signal TES in FIG. 13A shows a large positional deviation due to the peak-like frictional disturbance and the eccentricity occurring at the zero moving velocity of the carriage in association with the medium eccentricity. The tracking error signal TES gradually attenuates in association with the progress of the learning and the frictional disturbance and the positional deviation are finally suppressed. In the first one rotation just after the learning start time t0, as a memory cell from which the learning result is read out, the learning control signal I^repeat is the initial value of zero before the learning because it is read out from the cell that is earlier by the predetermined time Δtlead than the memory cell in which the learning result is stored. The learning process from time t0 is such a process that the disturbance component included in the feedback control signal $I_{FB}$ in FIG. 13B is transferred step by step to the learning control signal I^repeat which is outputted as a learning result as shown in FIG. 13C. When the present time reaches time within a range from 0.2 to 0.25 sec on the learning end side, most of the disturbance component included in the feedback control signal $I_{FB}$ in FIG. 13B at the time of the start of the learning is transferred to the learning control signal I^repeat serving as a feed-forward output in FIG. 13C, so that the disturbance seen in the tracking error signal TES in FIG. 13A is almost perfectly suppressed.

Figure 14A:
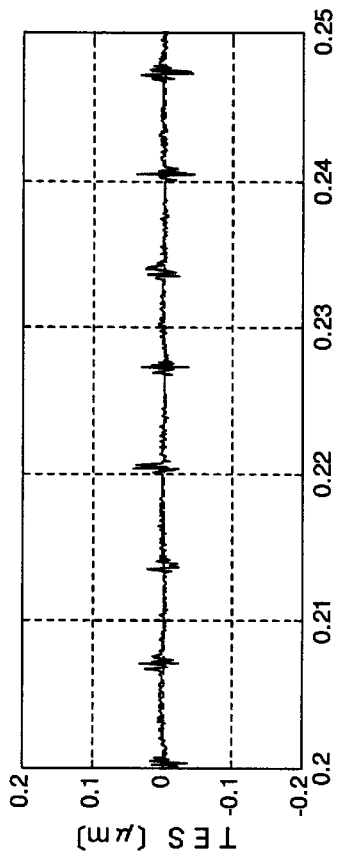
FIGS. 14A to 14C are waveform diagrams of the tracking error signal, feedback control signal, learning control signal, and driving signal for a period of time from the start to the end of the learning in the case where an advance compensation is not performed in the embodiment of FIG. 6.
Figure 14B:
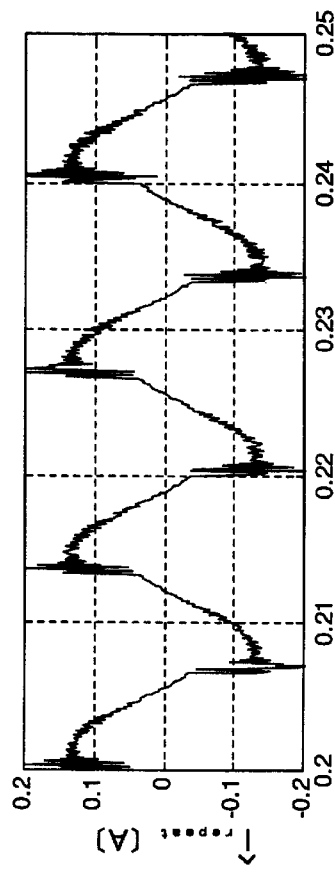
Figure 14C:
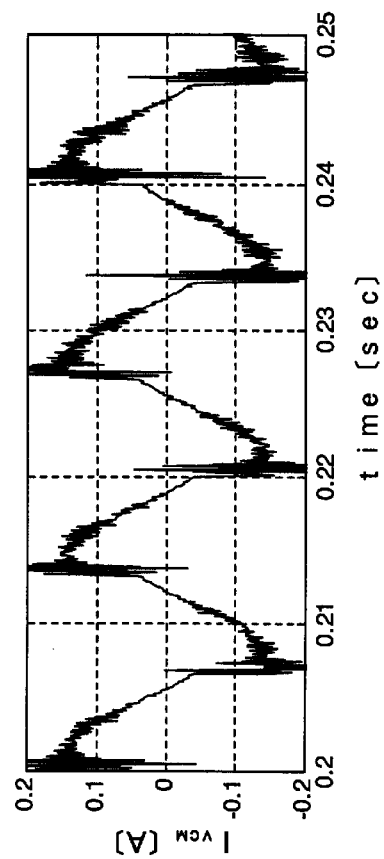

FIGS. 14A to 14C show waveforms in the respective portions in the learning process in the case where the compensation by the lead time Δtlead to compensate the delay time of the feedback control system is not performed in the FF output unit 100 in the learning control unit 82 in FIG. 7. If the process to advance the reading timing by the lead time Δtlead to compensate the delay time of the feedback control system is not performed at the time of the feed-forward output, the response waveform is influenced by the delay time of the feedback control system and becomes oscillatory. Thus, it will be obviously understood that an oscillatory component due to the delay is also transferred as a learning result into the learning control signal I^repeat that is outputted as a learning result at the end of the learning and an enough suppressing effect of the disturbance component cannot be expected. On the other hand, a good learning result as shown in FIGS. 13A to 13D is obtained by the output of the learning result by the setting of the lead time corresponding to the delay time of the feedback control system by the FF output unit 100 in FIG. 7. Since the learning control unit 82 in FIG. 6 handles the feedback current itself, as a learning target, to the carriage driving unit 86 which is outputted from the feedback control unit 80, a waveform of small noises can be learned. Since the learning result shows the feedback current itself, there is such an advantage that it is outputted directly as feed-forward current to the feedback control system and the repetitive disturbance can be compensated at high precision at the time of the seek control, track-following control, track jump control, or the like.

FB Control Output and FF Output of Low Band Component During Track Jump)

The FF signal for repetitive disturbance compensation from the learning control unit 82 during the track jump in FIG. 4 relates to the control that is effective only to the compensation of the repetitive disturbance such as a rotation eccentricity or the like of the medium, and no compensating effect is obtained with respect to the non-repetitive disturbance like a disturbance from the outside of the apparatus in which it occurs irrespective of the medium rotation. In the invention, for the non-repetitive disturbance, the further stable track jump control system is constructed by feed-forwarding the low frequency component in the output of the feedback control system during the track jump. By feed-forwarding the low frequency component in the output of the feedback control system during the track jump as mentioned above, the stable track jump can be performed even when there is an oscillatory disturbance from the unit out of the apparatus. In the optical disk apparatus, generally, in order to prevent that the high frequency disturbance component from the outside of the apparatus is transferred to the positioner mechanism system, a rubber vibration isolator or the like is inserted between the external frame of the apparatus and the positioner mechanism system and a mechanical low pass filter is constructed. Therefore, by feed-forwarding the low band compensation component in the output of the feedback control system during the track jump, even if the system is subjected to the disturbance from the outside of the apparatus, in many cases, the track jump can be stabilized by compensating the disturbance. In the case where only the low frequency component just before the track jump of the output of the conventional feedback control system is used during the track jump, when the track jump in which the light spot passes through a step change point of the frictional disturbance due to the eccentricity speed is performed, a difference corresponding to the frictional change has to exist between the low band compensation signal at the start of the track jump and that at the end thereof. However, in case of feed-forwarding only the low band component in the output of the conventional feedback control system just before the track jump, in the lead-in and track-following control after the end of the track jump, it is necessary to converge the low band compensation component of the feedback control system to a new value. Thus, the lead-in converging time in the track lead-in operation is extended or the lead-in fails in the worst case. On the other hand, as shown in the invention of FIG. 4, in such a control that the FF signal for repetitive disturbance compensation from the learning control unit 82 obtained by the learning control at the time of the track-following control is fed-forward during the track jump besides the feed-forward operation of the value just before the track of the low band compensation component of the feedback control system, since the repetitive disturbance compensation signal follows the change in frictional component at the end of the track lead-in operation (accurately, although it does not always follow such a change during the track jump, it has a correct value at least at the end of the track jump), the low band compensation component of the output of the feedback control system hardly needs to be changed at the end of the track jump from the value held just before the track jump. Therefore, even in the case where the track jump over the step change of the eccentricity caused by the frictional disturbance is performed, the low band compensating precision after the end of the track jump according to the invention is sufficiently high and a correction width by the feedback compensation arithmetic operation is also equal to approximately zero, so that the lead-in operation can be stably and rapidly performed.

FIG. 15 is a block diagram of an embodiment which more specifically embodies the track jump control unit 101 according to the invention of FIG. 4. The feedback control unit 80 has such a construction that a proportional calculating unit 122 for multiplying a proportional gain Kp, a low band emphasizing filter 124 using a PI compensator, a phase-lag compensator, or the like, and a phase-lead compensator 126 are serially arranged. A gain Kp1 of a gain multiplier 128 applied to an output of the low band emphasizing filter 124 in FIG. 15 is a DC gain of a phase-lead compensation. For example, if the phase-lead compensation is linear and has the following form $$G_{pl}(s) = \frac{1+T_L s}{1+T_H s} \qquad (9)$$

the DC gain of the phase-lead compensation is equal to 1, so that the gain Kp1=1. That is, in this case, the output of the low band emphasizing filter 124 is equivalent to the low band component of the output of the feedback control unit 80 as it is. If the phase-lead compensation has the following form $$G_{pl}(s) = \frac{s+\omega_L}{s+\omega_H} \qquad (10)$$

the gain Kp1 of the gain multiplier 128 is equal to Kp1= $\omega_L/\omega_H$.

If it is necessary to further advance a phase at a position near the control band, as for the phase-lead compensating portion, two linear phase-lead filters are used like $$G_{pl}(s) = \frac{1+T_{L1}s}{1+T_{H1}s} \cdot \frac{1+T_{L2}s}{1+T_{H2}s} \qquad (11)$$

or, more generally, a phase-lead element expressed by a general transfer function of degree n like $$G_{pl}(s) = \frac{1+b_1 s+b_2 s^2+\ldots+b_n s^n}{1+a_1 s+a_2 s^2+\ldots+a_n s^n} \qquad (12)$$

is inserted by a polar zero arranging method or the like. For example, in case of the equations (11) and (12), both DC gains are equal to 1 and the gain of the multiplier 128 is equal to Kp1=1.

FIG. 16 shows a modification of FIG. 15. The embodiment of FIG. 16 relates to a case where the feedback control unit 80 has such a construction that the low band emphasizing filter 124, the phase-lead compensator 126, and a proportional calculating unit 130 are serially arranged in order and a multiplication of the proportional gain Kp is performed in a terminating portion of the arithmetic operation of the feedback control unit 80. In the case where the arithmetic operation of the proportional gain Kp in the feedback control unit 80 is performed in the terminating portion as mentioned above, the compensation gain of the gain multiplier 128 is obtained by $$K_{comp}=K_p 1 \times K_p$$

More generally, a whole DC gain of the filter which is inserted in a circuit from a branch point 125 between the low band emphasizing filter 124 and phase-lead compensator 126 to an output point 127 of the feedback control unit 80 in FIG. 16 is set as a gain of the gain multiplier 128. For example, there is a case where a notch filter to cancel a high-order resonance is inserted between the points 125 and 127, two phase-lead compensating filters are also used, or the like. However, in this case, a whole DC gain of them, namely, a DC gain of transfer characteristics between the points 125 and 127 is set to the gain of the gain multiplier 128.

Figure 17A:
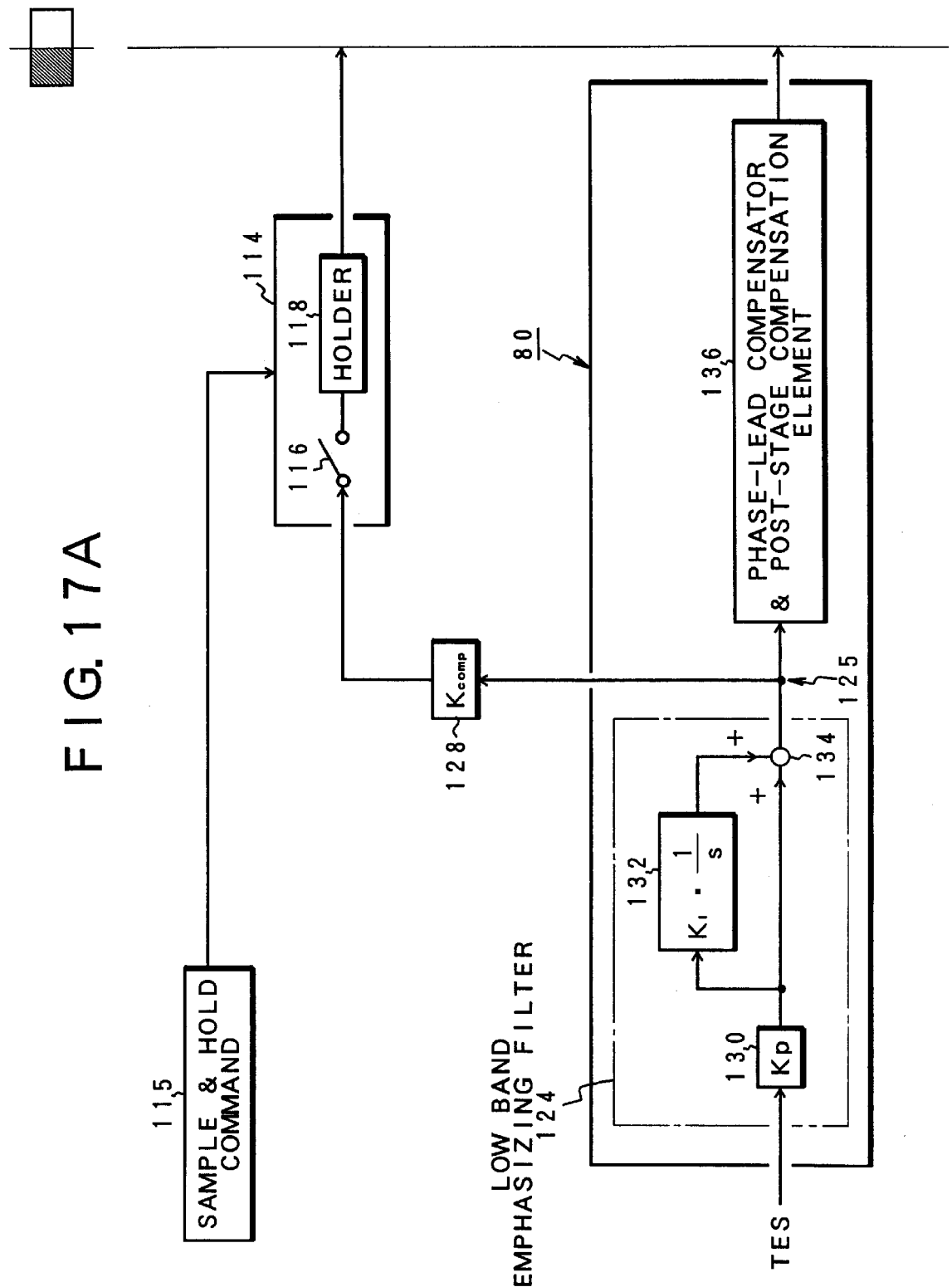

FIGS. 17A and 17B relate to an embodiment in the case where the low band emphasizing filter 124 of the feedback control unit 80 is a filter of a PI compensating type. In the low band emphasizing filter 124, an output of the proportional calculating unit 130 is inputted to an addition point 134, an output of the proportional calculating unit 130 is inputted to an integration calculating unit 132, and its integration output is added by the addition point 134. In this case, a gain $K_{comp}$ of the gain multiplier 128 is used as a correction coefficient that is equal to the DC gain in a range from the branch point 125 to the output point 127 of the feedback control system. Further, the output stage of the feedback control unit 80 becomes a phase-lead compensator & post-stage compensation element 136. The post-stage compensation element includes a notch filter or the like to compensate a high-order resonance of, for example, a mechanical portion.

Figure 18A:
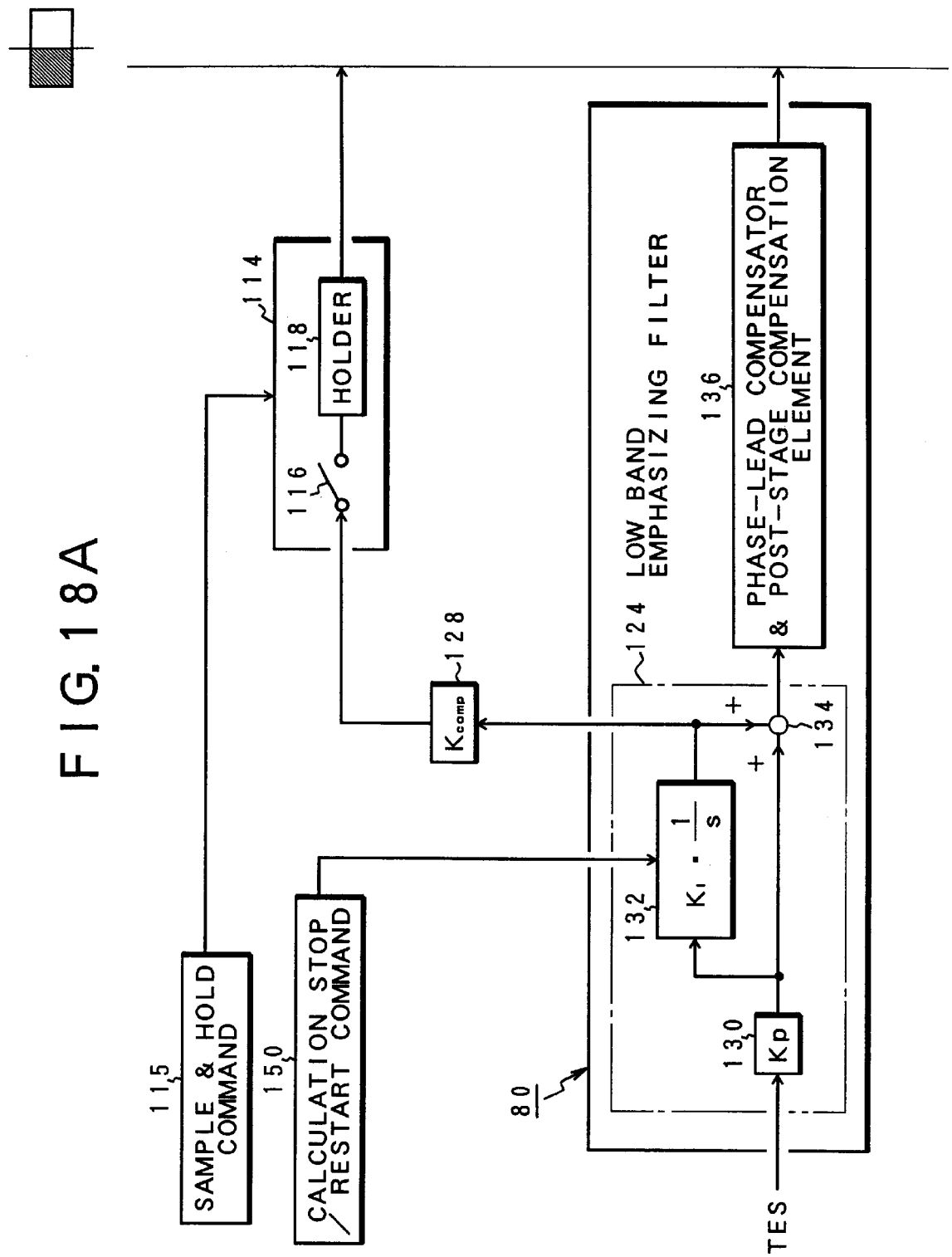
FIGS. 18A and 18B are block diagrams of another embodiment in which the filter of the PI compensating type is used as a low band emphasizing filter.
Figure 18B:
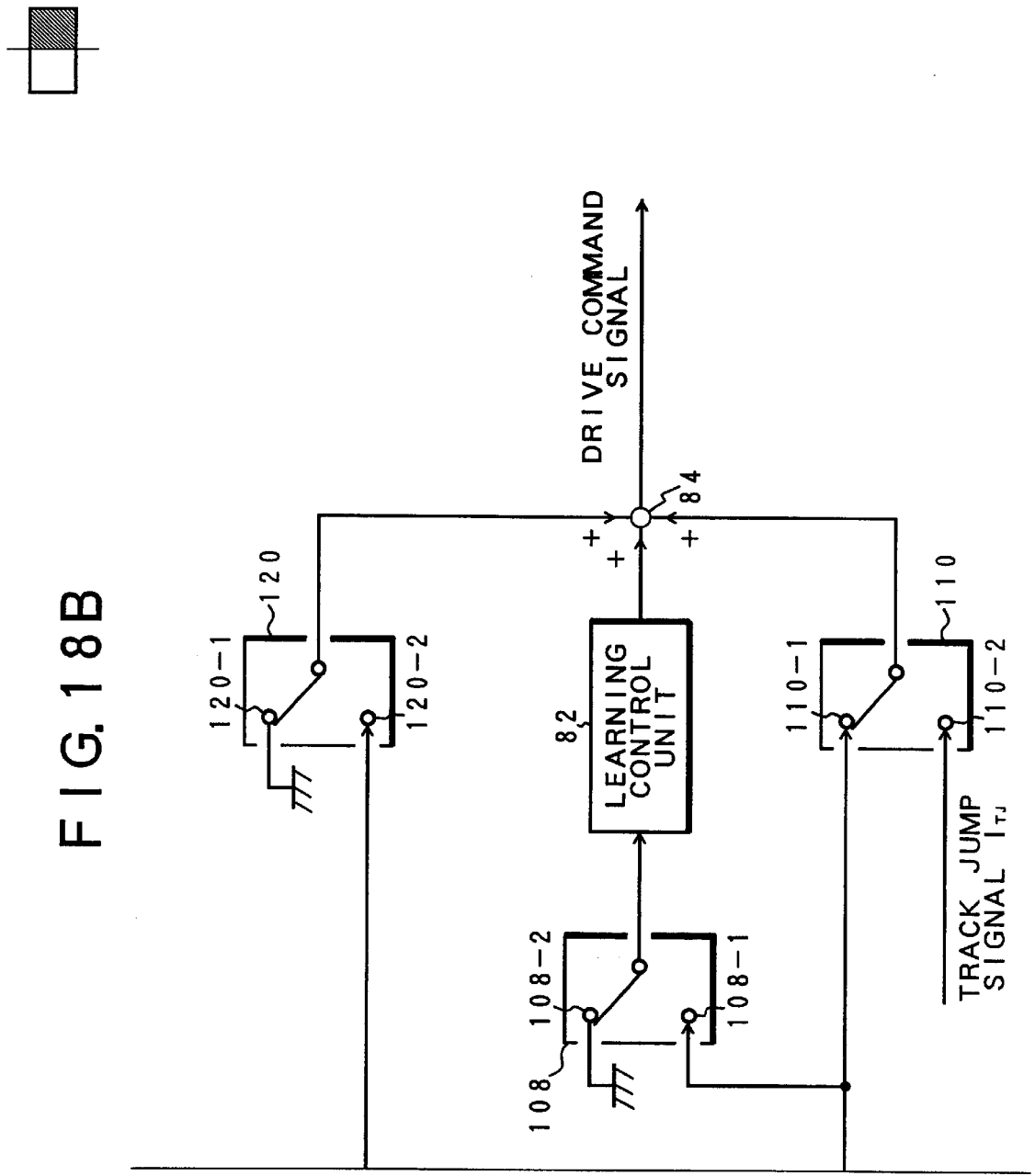

FIGS. 18A and 18B relate to a modification of FIGS. 17A and 17B. In the embodiment, the value just before the track jump of an integration compensation value from the integration calculating unit 132 in the low band emphasizing filter 124 to perform the PI compensation in the feedback control unit 80 is held in the holder 118 of the sample holder 114 during the track jump and fed-forward. A calculation stop/restart command 150 will be clearly described hereinlater.

FIGS. 19A and 19B describe a difference between the embodiment of FIGS. 17A and 17B and the embodiment of FIGS. 18A and 18B. FIG. 19A shows the gain for the frequency. FIG. 19B shows a phase angle for the frequency. In case of holding and outputting the value just before the track jump of the PI compensation value of the low band emphasizing filter in FIGS. 17A and 17B during the track jump, frequency characteristics like PI output characteristics 138 in FIG. 19A to which a proportional component P and an integration component I have been added are obtained. Even if the oscillatory disturbance of a frequency close to a frequency near 500 Hz at a PI folding point is applied, since PI output characteristics 142 of the phase angle in FIG. 19B near such a point are also improved as compared with I output characteristics 144 consisting of only an I component, a feed-forward compensation signal during the track jump which is also effective to a higher oscillatory component is obtained for the vibration occurring from the outside of the apparatus. However, since the proportional component is included in case of FIGS. 17A and 17B, the modification of FIGS. 17A and 17B has transfer characteristics which are flat up to a high band as shown in the PI output characteristics 138 in FIG. 19A and there is a possibility that they are easily influenced by noises or the like according to circumstances.

On the other hand, in case of the characteristics consisting of only the integration component I as shown in FIGS. 18A and 18B, they are opposite to those in the case of the PI component. On the other hand, in case of only the integration I component as shown in FIG. 18, its gain and phase characteristics become as shown by I output characteristics 140 in FIG. 19A and I output characteristics 144 in FIG. 19B. In this case, they are opposite to those in case of the PI component in FIG. 17 and, although they are slightly weak against the oscillatory disturbance of a high frequency, since the gain drops in a high band, there is such an advantage that they are strong against the noises. Therefore, it is sufficient to select a preferred one of a mode in which the value just before the track jump of the PI component in FIGS. 17A and 17B is held and outputted during the track jump and a mode in which the value just before the track jump of only the I component is held and outputted during the track jump as shown in FIGS. 18A and 18B in accordance with the characteristics of the apparatus, a specification request, or the like.

Figure 20A:
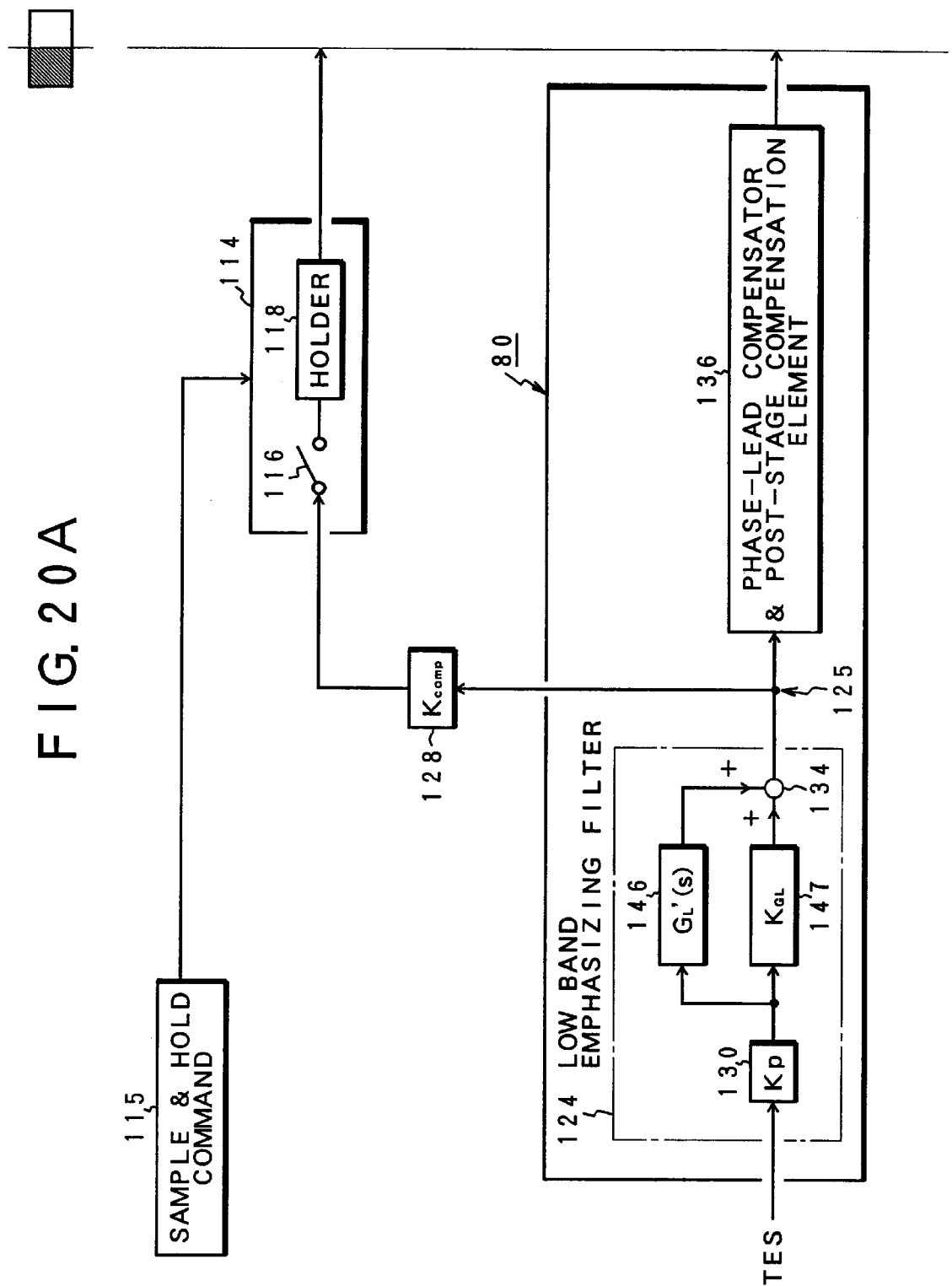
FIGS. 20A and 20B are block diagrams showing FIGS. 17A and 17B by generalizing them.
Figure 20B:
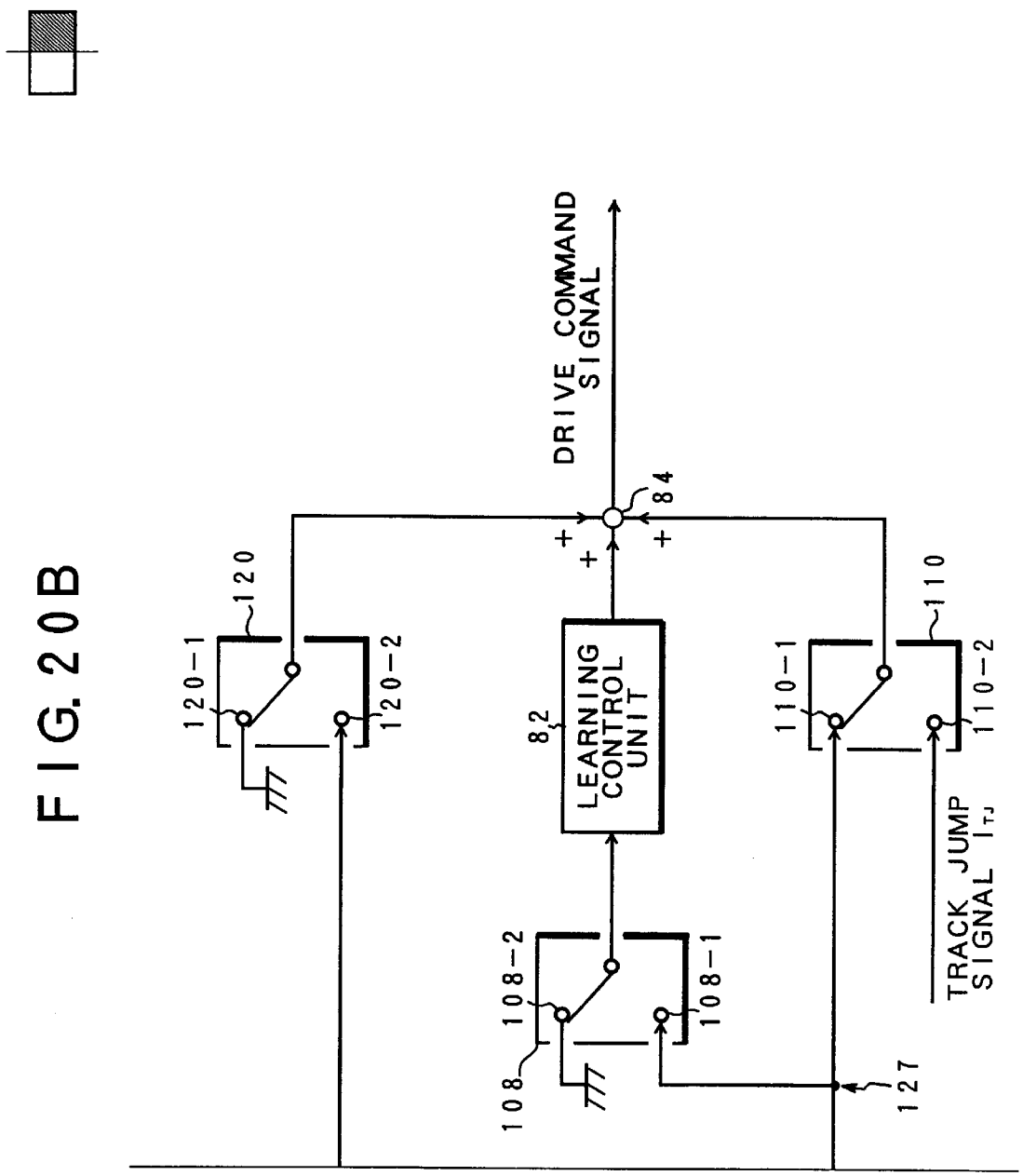
Figure 21A:
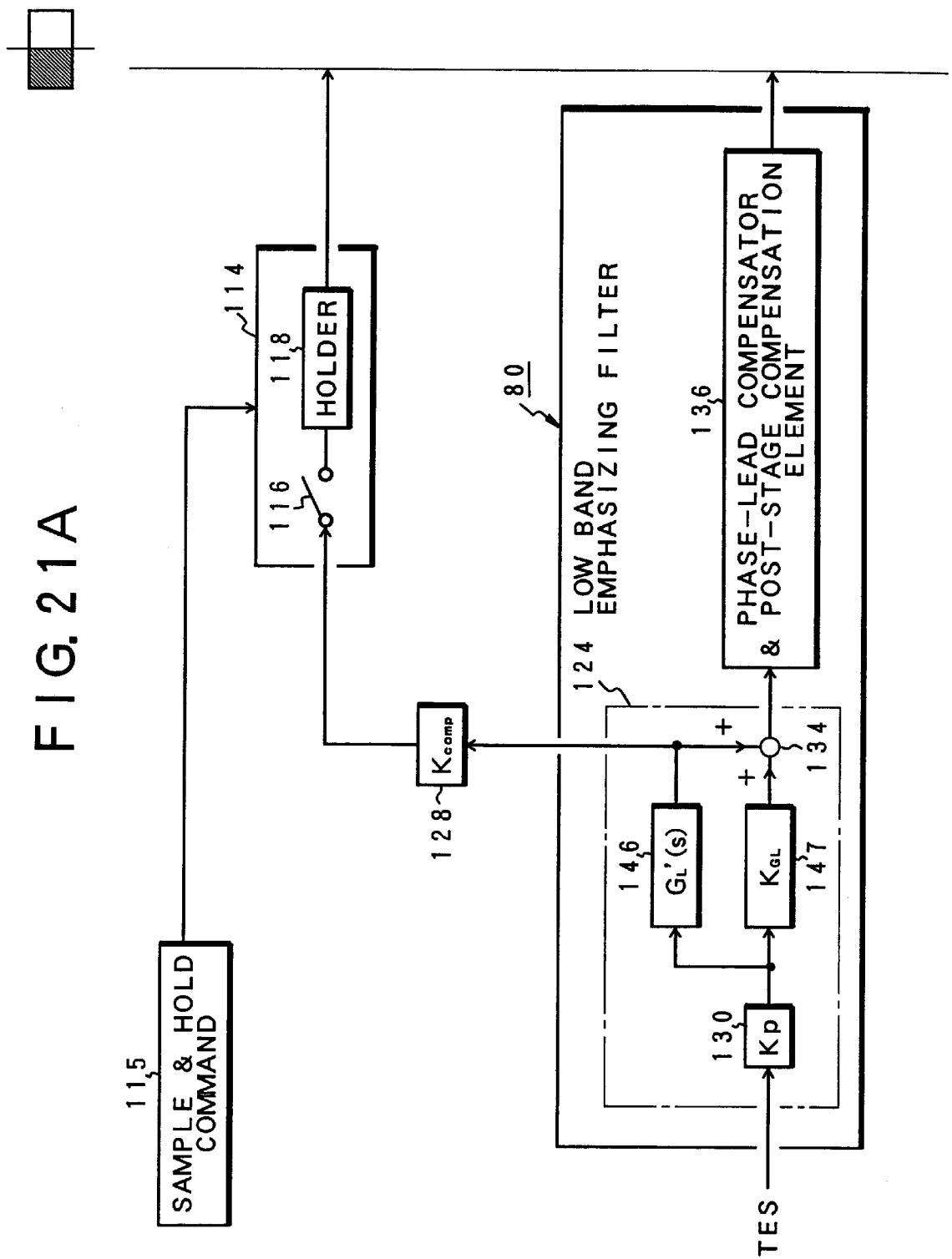
Figure 22A:
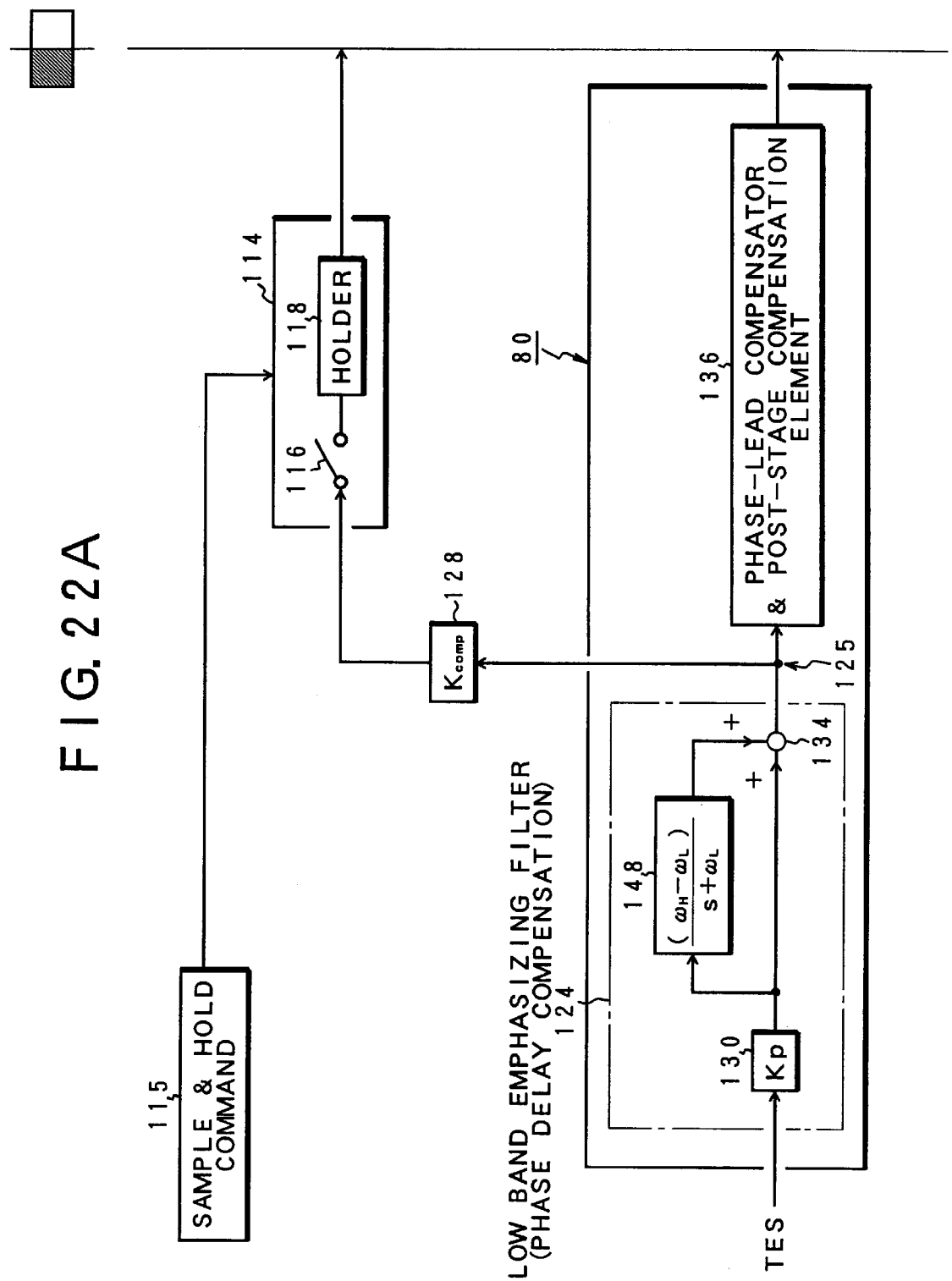
FIGS. 22A and 22B are block diagrams of an embodiment in which a transfer function of a phase-lag compensating type is used as a transfer function $G_L(s)$ of the low band emphasizing filter with respect to FIGS. 20A and 20B.
Figure 22B:
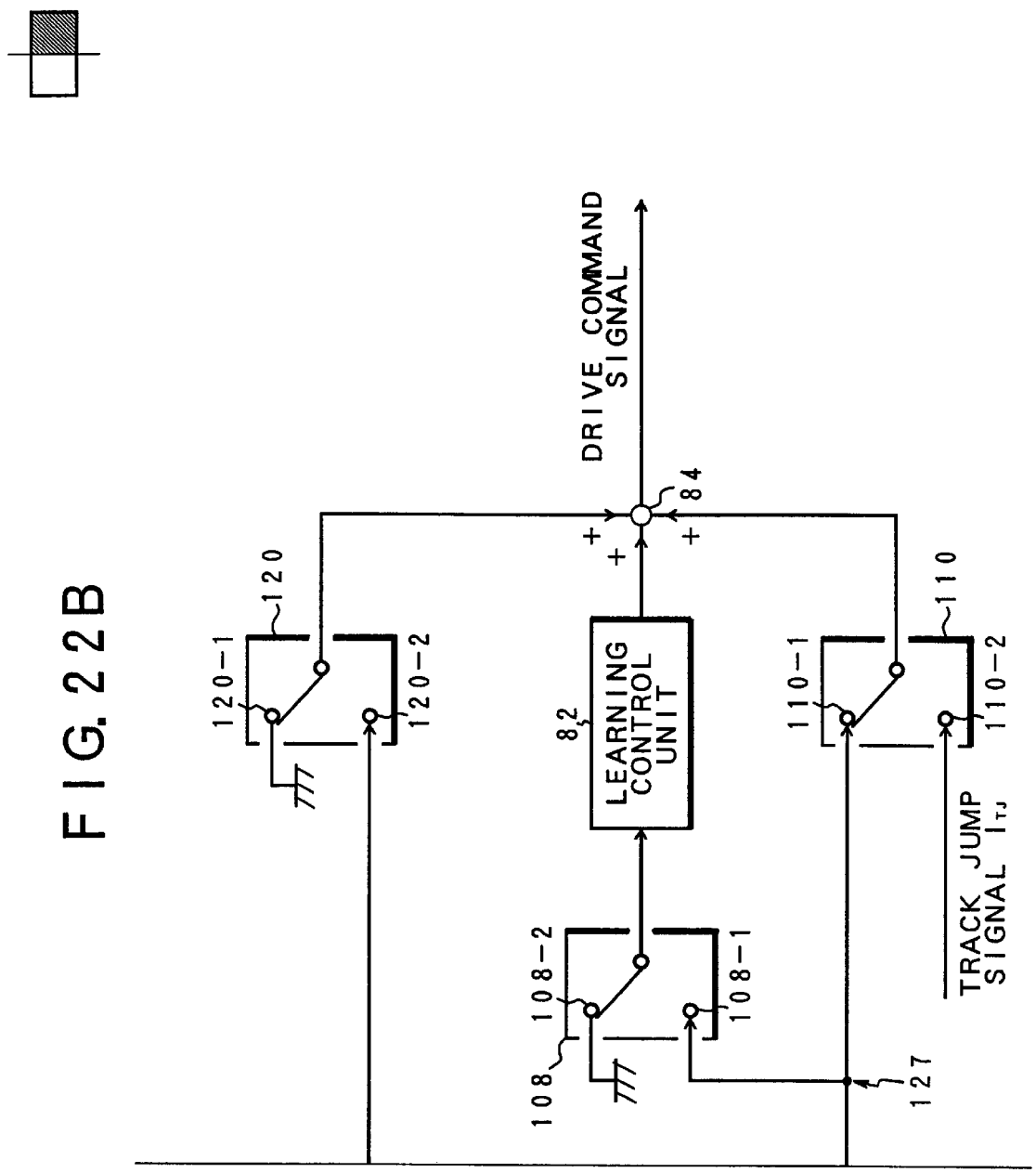
Figure 23A:
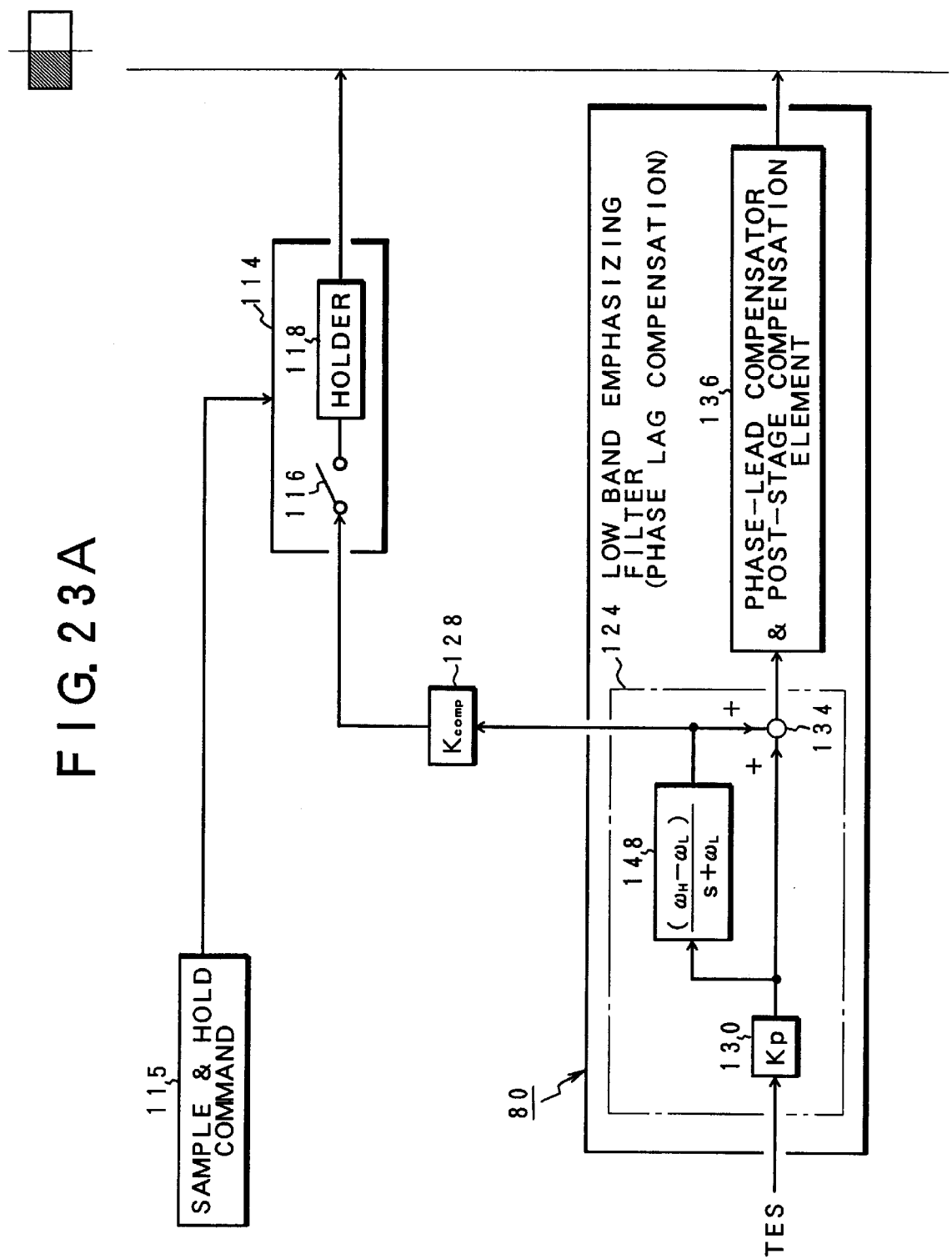

The above relation is generally expressed as shown in FIGS. 20A, 20B, 21A, and 21B. Transfer characteristics of the whole low band emphasizing filter are assumed to be $G_L(s)$. FIGS. 20A and 20B show a general form in the case where the value just before the track jump of the PI component in FIGS. 17A and 17B is held and outputted during the track jump and show a case where an output (in the invention, referred to as a "PI type low band compensation component") of the whole low band emphasizing filter is held and outputted during the track jump. FIGS. 21A and 21B show a general form in the case where the value just before the track jump of only the I component in FIGS. 18A and 18B is held and outputted during the track jump and show a case where an output (in the invention, referred to as an "I type low band compensation component") of the low band emphasis calculating unit is held and outputted during the track jump.

In FIGS. 20A, 20B, 21A, and 21B, the low band emphasizing filter 124 provided for the feedback control unit 80 comprises: the proportional calculating unit 130 in which the proportional gain Kp is set; a low band emphasis calculating unit 146 having a transfer function $G_L'(s)$; a proportional calculating unit 147 in which a direct transfer gain (DC transfer gain) $K_{GL}$ of the proportional component of the low band emphasizing filter has been set; and the addition point 134. That is, in FIGS. 20A, 20B, 21A, and 21B, a transfer function of the low band emphasizing filter 124 is assumed to be $G_L(s)$. That is, when the transfer function of the low band emphasizing filter 124 is assumed to be $G_L(s)$, it is generally expressed as follows.

$$G_L(s) = \frac{b_m s^m + \ldots + b_1 s + b_0}{a_n s^n + \ldots + a_1 s + a_0} \tag{13}$$

In general, $m \leq n$. The low band emphasizing filter 124 usually includes the DC transfer component of the proportional component. In this case, the degrees of the numerator and denominator are equal (m=n). When m=n, the transfer function of the equation (13) can be generally dissolved as follows.

$$G_L(s) = G_L'(s) + K_{GL} \tag{14}$$

where, $G_L'(s)$ is the transfer function that is strictly proper (namely, the degree of the numerator is smaller than that of the denominator). That is, when the degrees of the numerator and denominator of the transfer function $G_L(s)$ of the low band emphasizing filter 124 are equal, as shown by the equation (14), the transfer function $G_L(s)$ can be expressed as a sum of the DC transfer term ($K_{GL}$) of the proportional component and the transfer function $G_L'(s)$ that is strictly proper. In the invention, the transfer function $G_L'(s)$ is referred to as a low band emphasis calculating unit. As a transfer function $G_L(s)$, besides $$G_L(s) = 1 + \frac{K_I}{s} = \frac{s + K_I}{s} \tag{15}$$

in the PI compensation shown above, it is also possible to use $$G_L(s) = \frac{s + \omega_H}{s + \omega_L} \tag{16}$$

of a phase-lag compensation which is ordinarily and frequently used or a low band emphasizing filter (m<n) of a wider definition that is shown generally by $$G_L(s) = \frac{b_m s^m + \ldots + b_1 s + b_0}{a_n s^n + \ldots + a_1 s + a_0} \tag{17}$$

FIGS. 22A, 22B, 23A, and 23B show an embodiment in the case where the low band emphasizing filter 124 provided for the feedback control unit 80 is constructed by a phase-lag compensation as shown by the, equation (16) and the proportional calculating unit 130. That is, the phase-lag compensation of the equation (12) is realized by an addition synthesis of a low band emphasis calculating unit 148 expressed by $$G_L'(s) = (\omega_H - \omega_L)/(s + \omega_L)$$

and the DC transfer component ($K_{GL}$=1) of the proportional component. There is the following difference between the embodiment of FIGS. 22A and 22B and the embodiment of FIGS. 23A and 23B. According to the embodiment of FIGS. 22A and 22B, the value just before the track jump of the output (PI type low band compensation component) of the whole low band emphasizing filter is held and outputted as shown in FIGS. 20A and 20B. On the other hand, according to the embodiment of FIGS. 23A and 23B, only the value just before the track jump of the output (I type low band compensation component) of the low band emphasis calculating unit 148 is held and outputted as shown in FIGS. 21A and 21B. As mentioned above, in the track jump control unit 101 of the invention shown in FIG. 4, the FF signal for repetitive disturbance compensation from the learning control unit 82 prepared for the track-following control is continuously fed-forward even during the track jump. Further, by performing the track jump by the track jump signal $I_{TJ}$ in a state where the value just before the track jump of the low band compensation component of the feedback control unit 80 for the track-following control is held to the constant value during the track jump and fed-forward, the track jump can be stabilized.

Figure 24A:
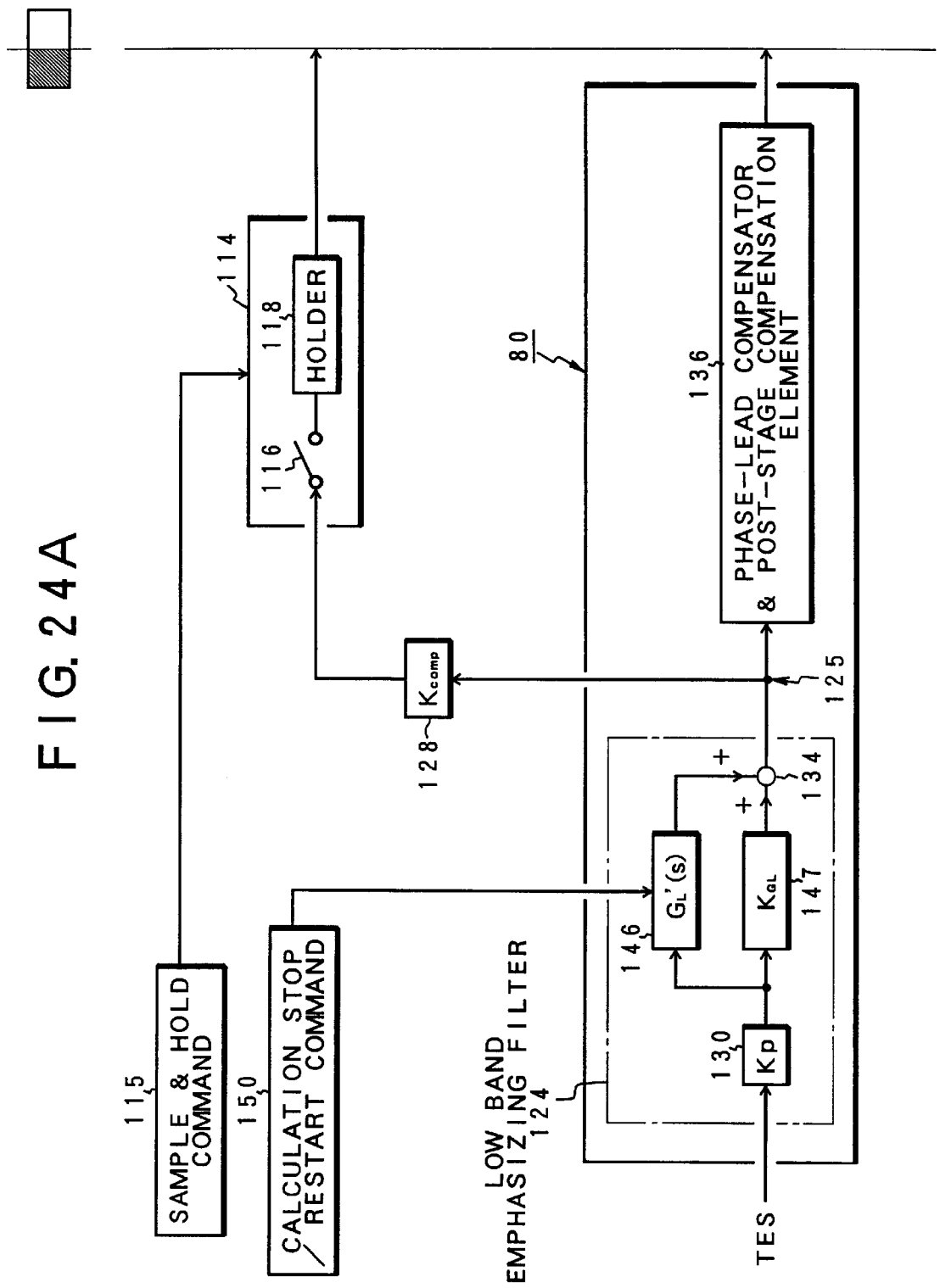

FIGS. 24A and 24B show an embodiment for changing the control mode to the track-following control again after the track jump with respect to the case where the value just before the track jump of the output (PI type low band compensation component) of the low band emphasizing filter 124 shown in FIGS. 20A and 20B is held and outputted during the track jump. This embodiment has such a function that the calculation of the low band emphasizing filter 124 provided for the feedback control unit 80 is temporarily stopped and restarted by issuing the calculation stop/restart command 150 to the low band emphasis calculating unit 146 of the low band emphasizing filter 124. When a calculation stop command is received, the low band emphasis calculating unit 146 to perform the calculation of "$G_L'(s)$" of the low band emphasizing filter 124 temporarily stops the filter calculation while a variable in the filter at that time is held. In the control system of the optical disk drive of the invention, the control function is realized by the arithmetic operation of the software by the DSP 16 as shown in FIGS. 2A and 2B, and such a calculation stop of the low band emphasizing filter 124 can be easily realized. While the calculation is stopped, the low band emphasis calculating unit 146 does not perform the calculation even if the input signal is updated and its output holds and outputs the value just before the calculation stop. When a calculation restart command is received during the calculation stop, the low band emphasis calculating unit 146 restarts the calculation by the internal variables held and the input value at the time of the restart of the calculation and outputs a calculation result.

Figure 25A:
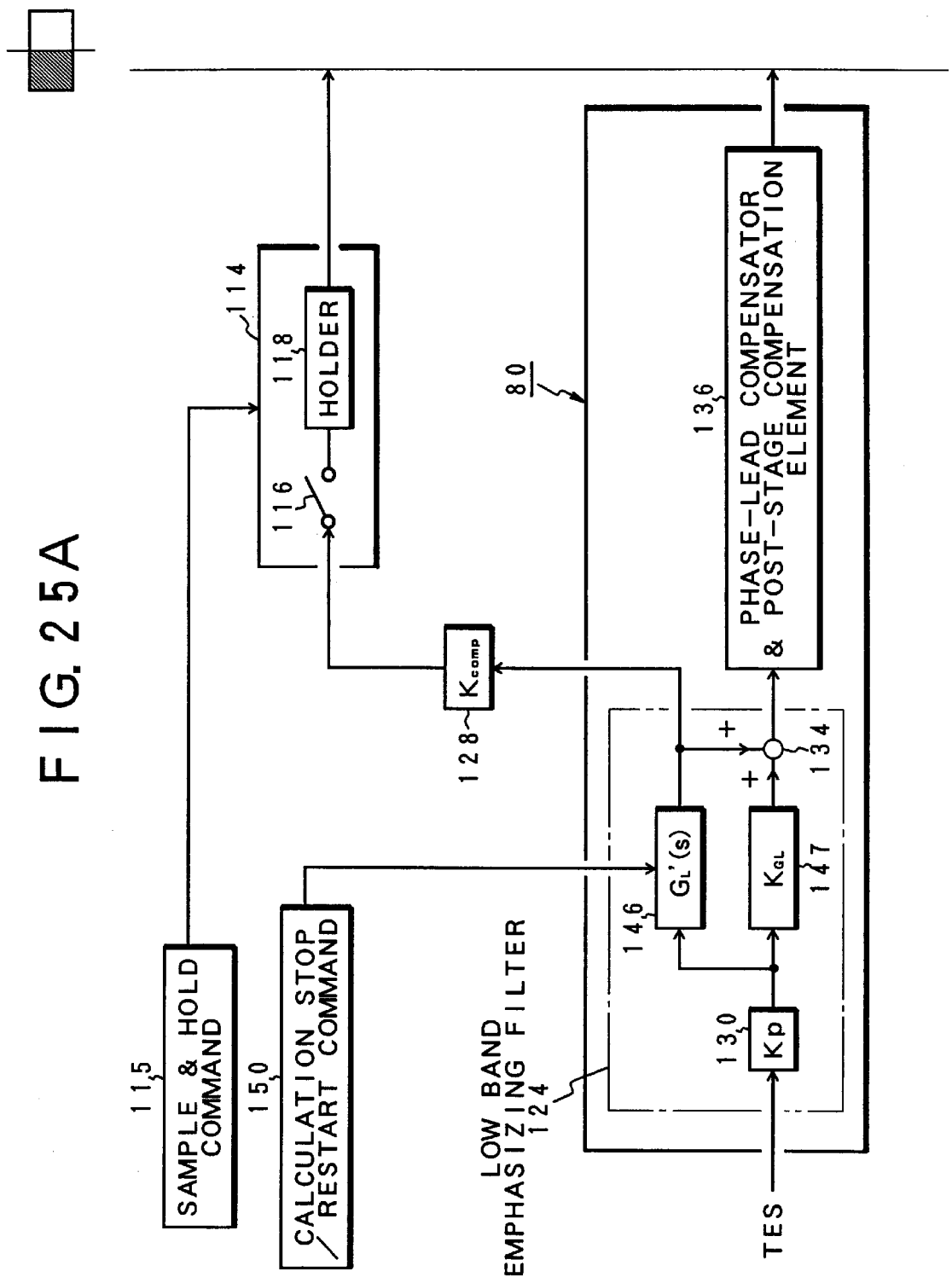

FIGS. 25A and 25B show an embodiment for changing again the control mode to the track-following control after the track jump in the case where the value just before the track jump of the output (I type low band compensation component) of the low band emphasis calculating unit 146 shown in FIGS. 21A and 21B is held and outputted during the track jump. The stop and restart of the calculation of the low band emphasis calculating unit are executed in a manner similar to the case of FIGS. 24A and 24B. In this case, since the output of the low band emphasis calculating unit has been held during the track jump, the sample holder 114 can be omitted.

Signal Waveform of Track Jump Signal)

Figure 26A:
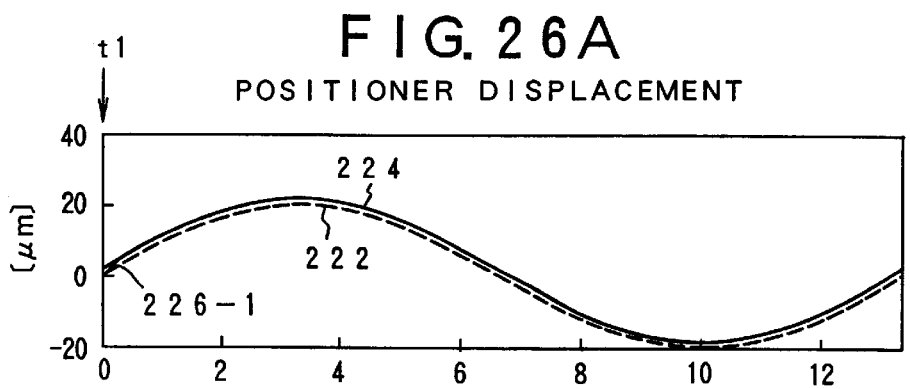
FIGS. 26A to 26D are explanatory diagrams of a track jump control without an FF error which was started at an eccentricity period t1=0 msec.
Figure 26B:
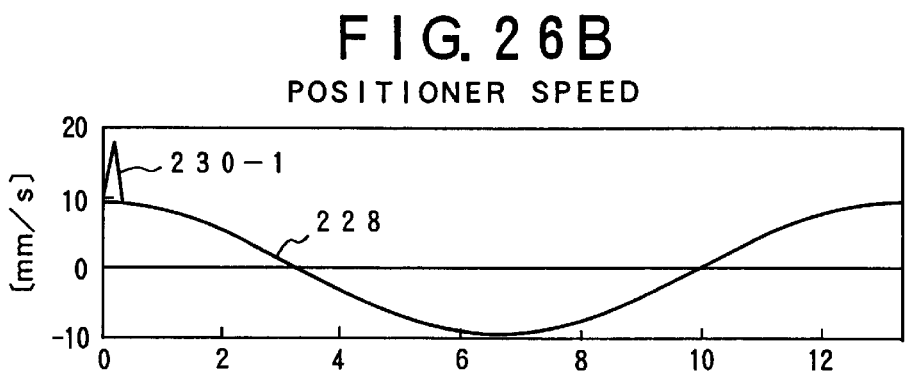
Figure 26C:
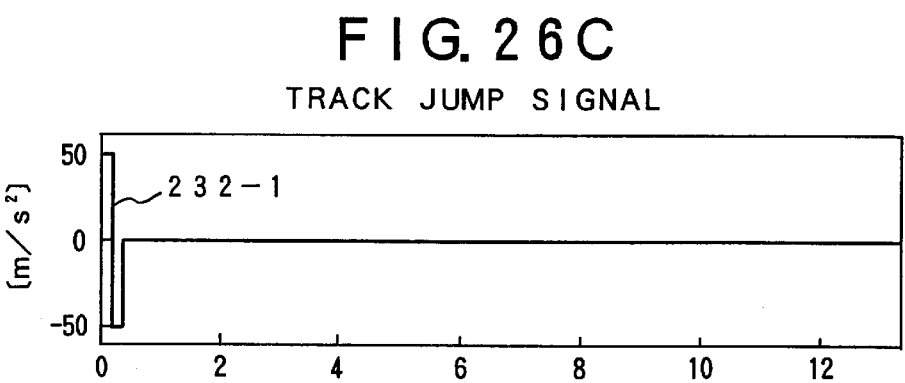
Figure 26D:
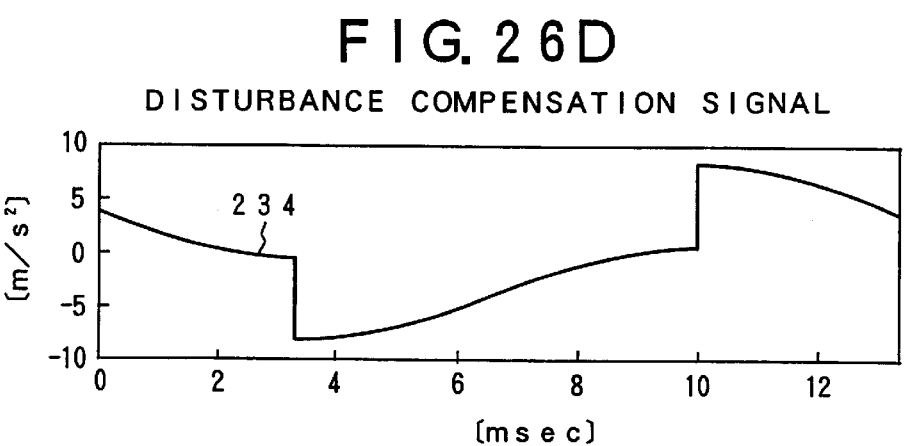
Figure 27A:
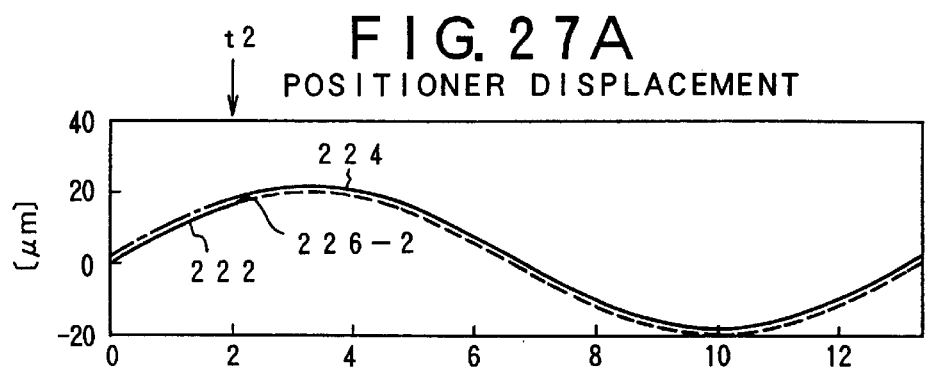
FIGS. 27A to 27D are explanatory diagrams of a track jump control without an FF error which was started at an eccentricity period t2=2 msec.
Figure 27B:
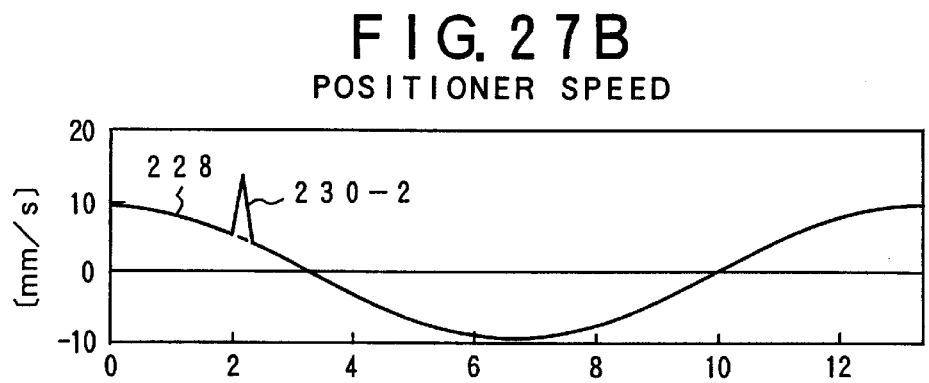
Figure 27C:
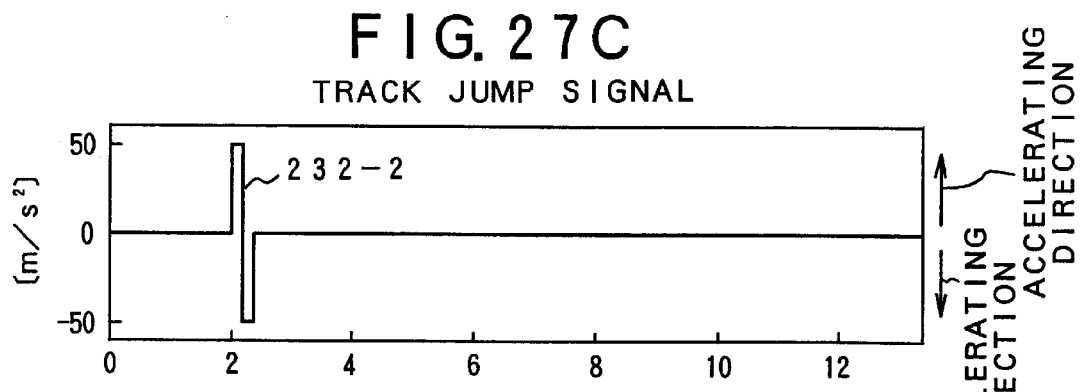
Figure 27D:
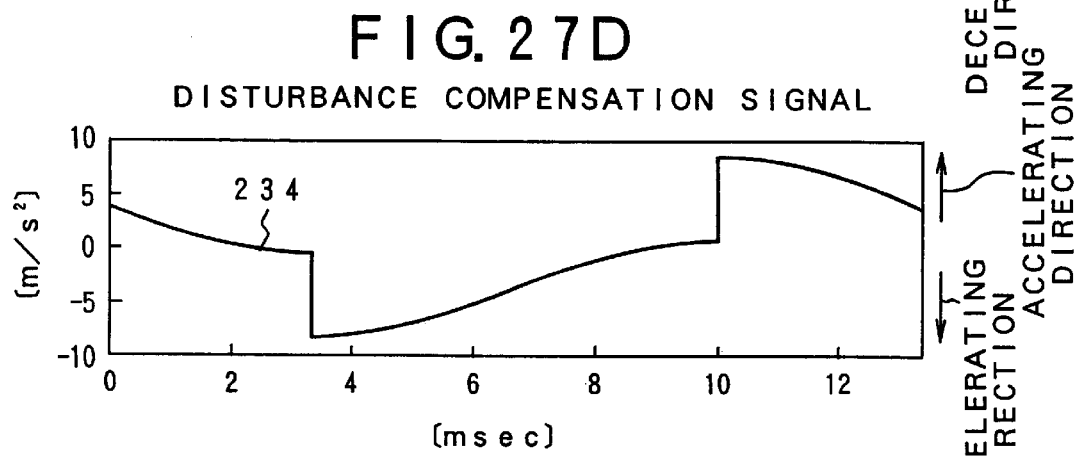
Figure 28A:
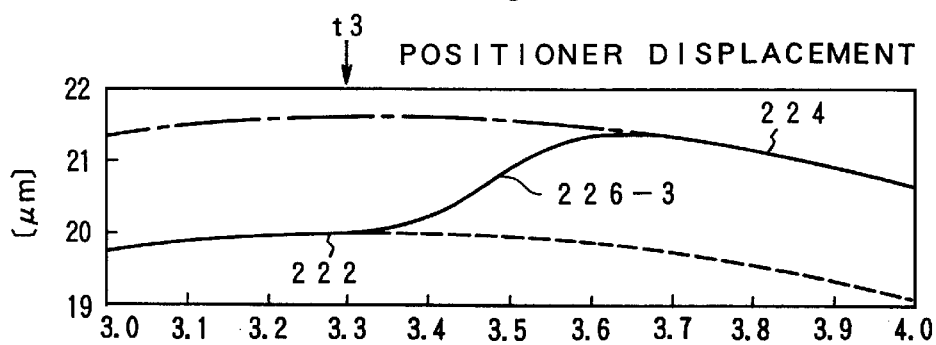
FIGS. 28A to 28D are explanatory diagrams of a track jump control with an FF error which was started at an eccentricity period t3=3.3 msec.
Figure 28B:
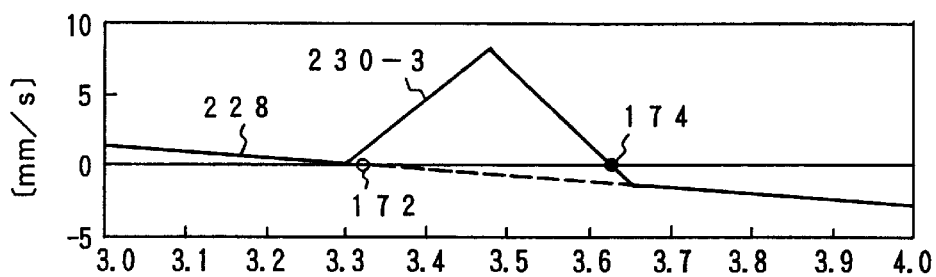
Figure 28C:
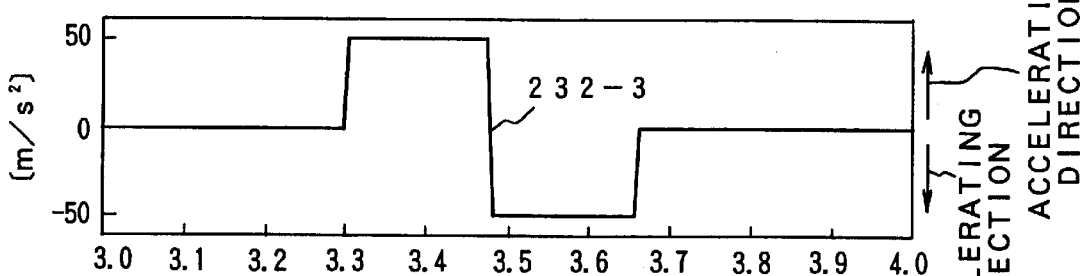
Figure 28D:
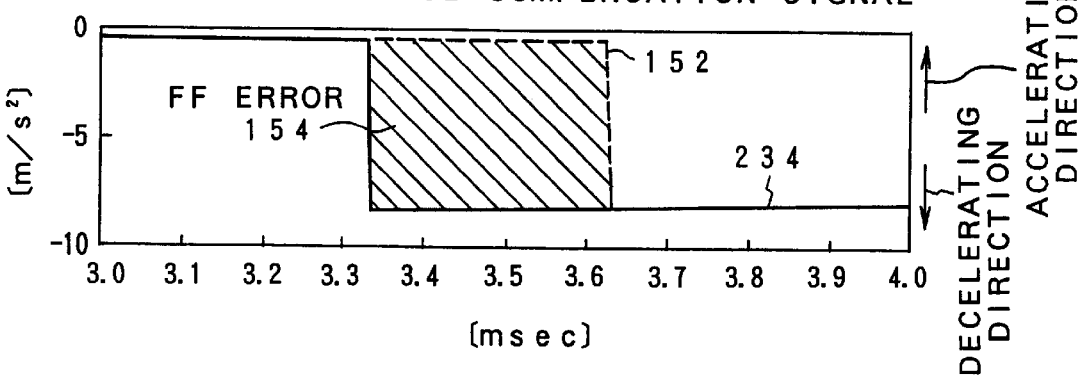
Figure 29A:
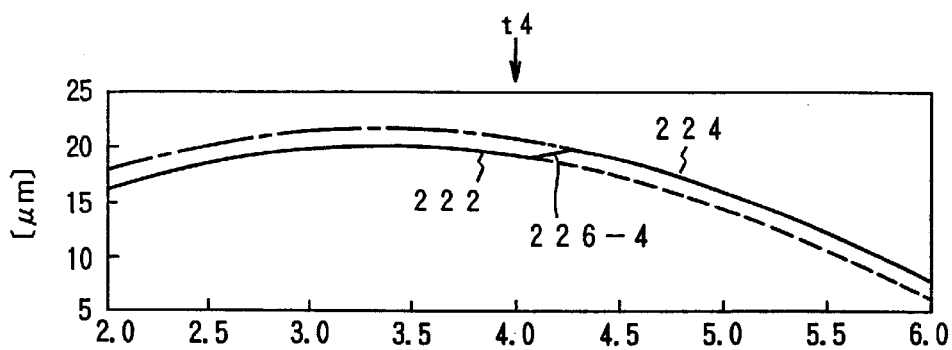
FIGS. 29A to 29D are explanatory diagrams of a track jump control with an FF error which was started at an eccentricity period t4=4 msec.
Figure 29B:
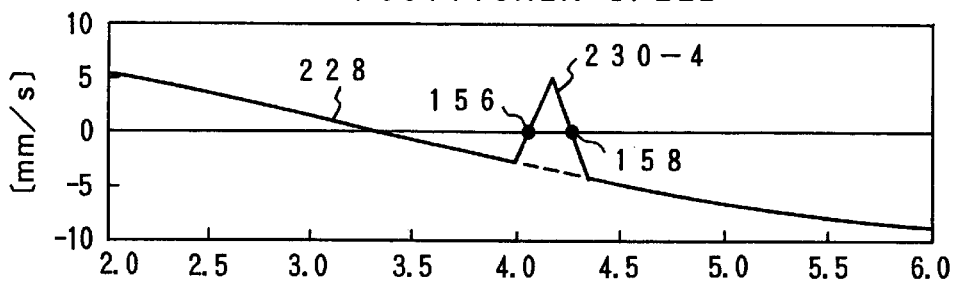
Figure 29C:
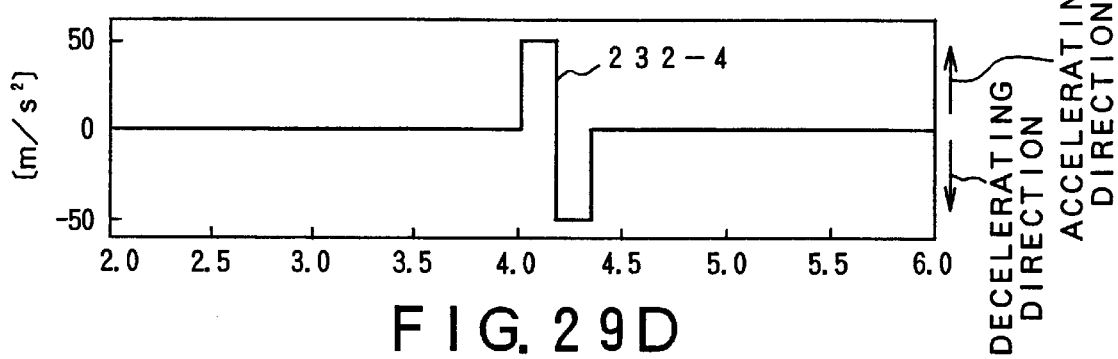
Figure 29D:
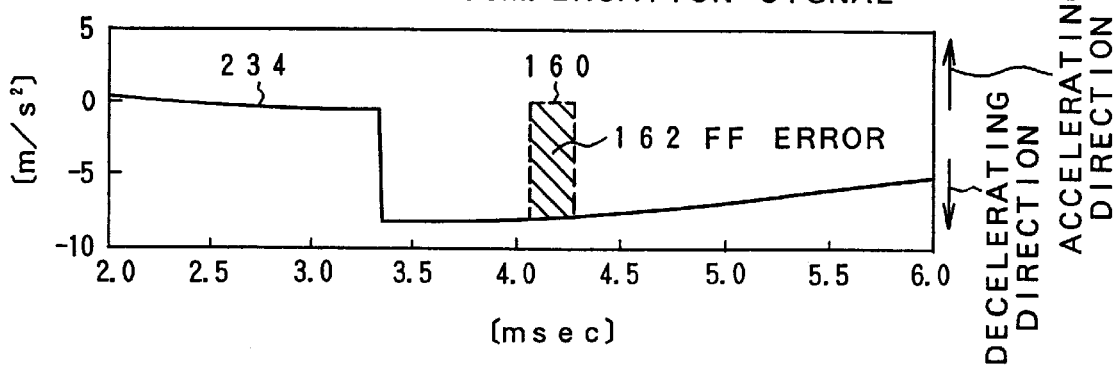
Figure 30A:
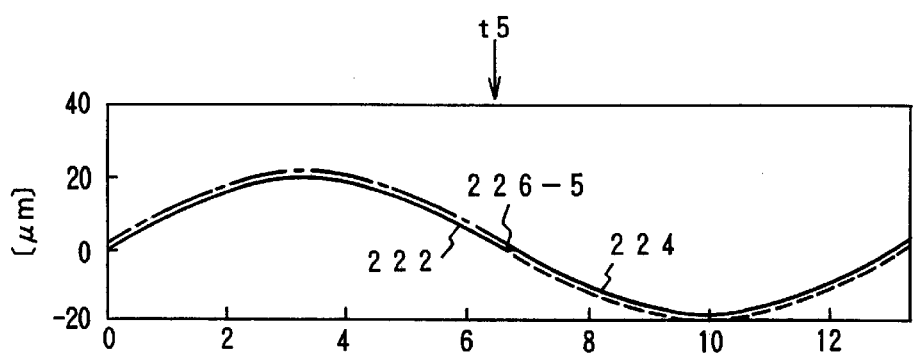
FIGS. 30A to 30D are explanatory diagrams of a track jump control without an FF error which was started at an eccentricity period t5=6.3 msec.
Figure 30B:
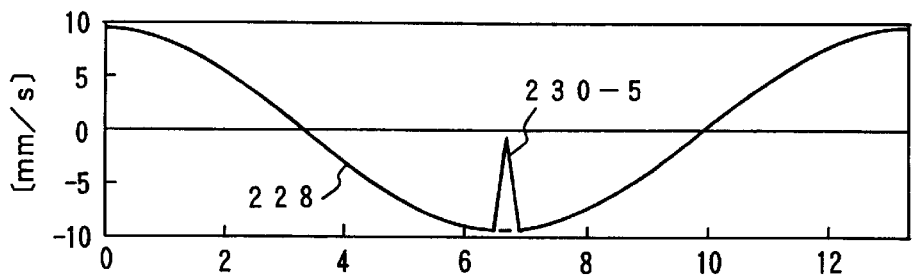
Figure 30C:
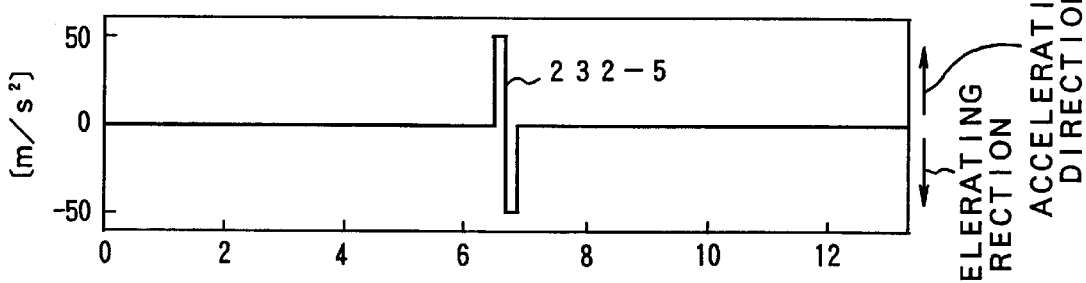
Figure 30D:
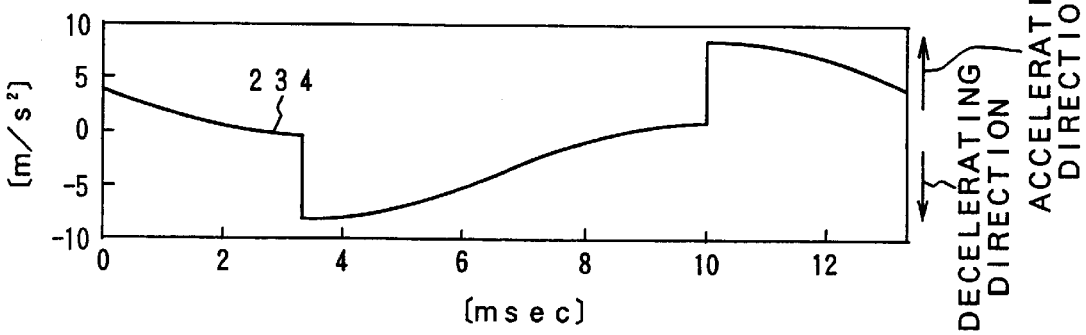
Figure 31A:
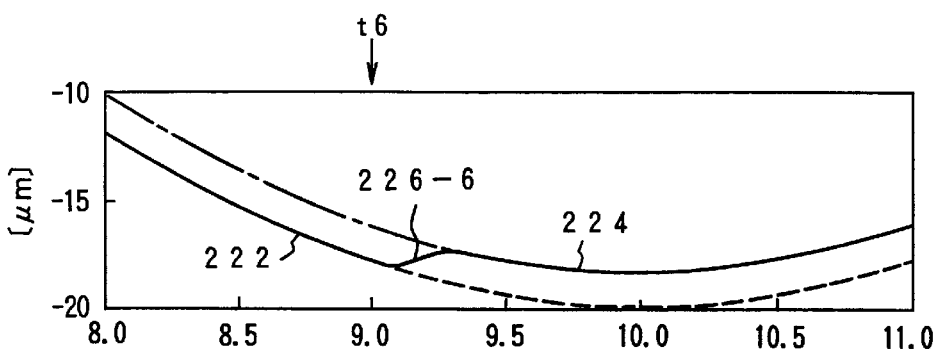
FIGS. 31A to 31D are explanatory diagrams of a track jump control with an FF error which was started at an eccentricity period t6=9 msec.
Figure 31B:
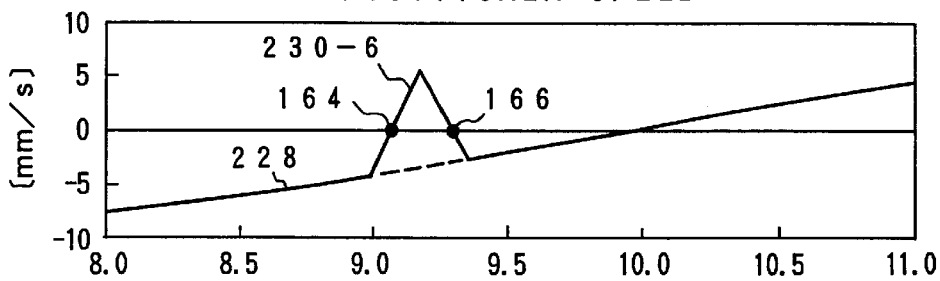
Figure 31C:
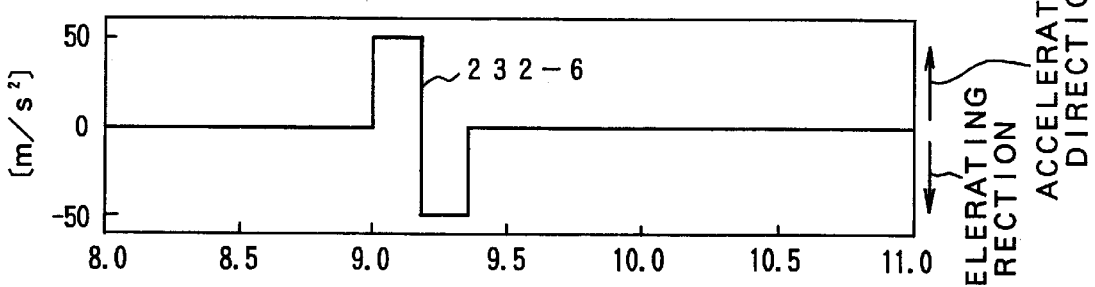
Figure 31D:
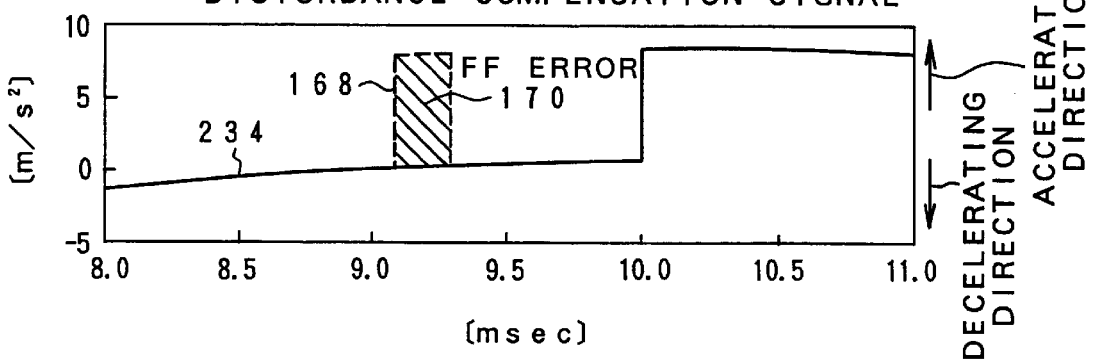

The track jump in the case where a Coulomb frictional disturbance exists in the positioner carriage will now be analyzed in detail. FIGS. 26A to 33D show states in the case where the track jump is performed while changing the timing (phase) for the period of the eccentricity disturbance when there is an eccentricity in the medium and there is a Coulomb frictional disturbance in the positioner carriage. For example, referring now to FIGS. 26A to 26D, FIG. 26A shows the positioner displacement, FIG. 26B shows the positioner speed, FIG. 26C shows the track jump signal (track jump acceleration FF signal), and further, FIG. 26D shows the disturbance compensation signal. The positioner displacement of FIG. 26A shows the jump source track following orbit 222 and the jump destination track following orbit 224 in a manner similar to FIG. 5A and shows a movement orbit for one medium rotational period of t=0 to 13 msec with respect to the time t of the axis of abscissa. The track pitch of the medium is equal to TP=1.6 µm, the eccentricity amount is equal to 40 µmp-p, and further, the coefficient of friction is equal to $\mu$=0.4. Further, the track jump acceleration and deceleration are equal to ±50 m/sec$^2$ as shown in FIG. 26C. This point is also similarly applied to FIGS. 26A to 33D. In FIGS. 26A to 33D, the track jump is performed at the following timings for the period of the positioner displacement which follows the eccentricity disturbance.

FIGS. 26A–26D: t1=0.0 msec
FIGS. 27A–27D: t2=2.0 msec
FIGS. 28A–28D: t3=3.3 msec
FIGS. 29A–29D: t4=4.0 msec
FIGS. 30A–30D: t5=6.3 msec
FIGS. 31A–31D: t6=9.0 msec
FIGS. 32A–32D: t7=9.8 msec
FIGS. 33A–33D: t8=11.0 msec Further, although one period of the eccentricity disturbance corresponding to one medium rotation is shown in FIGS. 26A to 26D, FIGS. 27A to 27D, FIGS. 30A to 30D, and FIGS. 33A to 33D, the states near the timings t3, t4, t6, and t7 of the track jump are enlargedly shown in FIGS. 28A to 28D, 29A to 29D, 31A to 31D, and 32A to 32D, respectively. With respect to the positioner displacement in each of FIGS. 26A, 27A, 28A, 29A, 30A, 31A, 32A, and 33A, the jump source track following orbit 222 and jump destination track following orbit 224 are drawn in parallel and track jump orbits 226-1 to 226-7 which start from the jump source track following orbit 222 and reach the jump destination track following orbit 224 are shown at the track jump time t1 to t8, respectively. In the positioner speed in each of FIGS. 26B, 27B, 28B, 29B, 30B, 31B, 32B, and 33B, the track eccentricity following speed orbit 228 of the positioner carriage and track jump speed orbits 230-1 to 230-7 occurring by the track jump at the track jump times t1 to t8 are shown. In FIGS. 26C, 27C, 28C, 29C, 30C, 31C, 32C, and 33C, track jump signals 232-1 to 232-8 are shown at the track jump times t1 to t8, respectively. Further, with respect to the disturbance compensation signal of each of FIGS. 26D, 27D, 28D, 29D, 30D, 31D, 32D, and 33D, the disturbance compensation signal at the time of the track-following control is shown by a solid line 234 and the disturbance compensation signal that is necessary at the time of the track jump is shown by a broken line.

The learning result (FF signal for repetitive disturbance compensation) which is outputted by the learning control unit 82 in FIG. 4 can be regarded as a signal which is approximated to the disturbance compensation signal 234 at the time of the track-following control at high precision. In the invention, (the learning result as an approximated function of) the compensation signal 234 is always fed-forward to the carriage driving unit 86 through the addition point 84 either during the track-following control or during the track jump. First, as shown in FIGS. 26A to 26D, 27A to 27D, and 33A to 33D, when the direction of the eccentricity following speed, namely, the track eccentricity following speed orbit 228 at each of the track jump time t1, t2, and t8 and the speed direction of each of the track jump speed orbits 230-1, 230-2, and 230-8 coincide, since the moving direction of the carriage is not changed during the track jump, the repetitive disturbance compensation signal 234 in each of FIGS. 26D, 27D, 28D, 29D, 30D, 31D, 32D, and 33D becomes the signal to accurately compensate for the disturbance even if it is used during the track jump. That is, in those cases, the disturbance compensation signal that is shown by a broken line and is necessary during the track jump perfectly coincides with the solid line 234.

As shown in FIGS. 30A to 30D, even if the speed direction of the track jump speed orbit 230-5 is opposite to that of the track eccentricity following speed orbit 228, if the speed specified by the track jump speed orbit 230-5 is lower than the track eccentricity following speed orbit 228, the moving direction of the positioner carriage is not changed during the track jump. The repetitive disturbance compensation signal 234 for track-following control can be regarded as a signal to compensate for the disturbance at high precision even if it is used during the track jump. That is, in this case as well, the disturbance compensation signal that is shown by a broken line and is necessary during the track jump perfectly coincides with the solid line 234.

The above description will now be summarized as follows.

[moving velocity of the carriage for the rail]=[eccentricity following speed]+[track jump speed in which the track is used as a reference] (18)

Since the Coulomb friction occurs between the positioner carriage and the rail, it depends on the sign (moving direction) of the moving velocity of the positioner carriage for the rail and the frictional disturbance occurs in the direction adapted to obstruct the movement. In other words, in the case where the moving direction of the carriage for the period of time of the track jump coincides with that of the carriage when it is allowed to follow the track for such a period of time, even if the Coulomb friction exists, the moving direction of the carriage during the track jump coincides with that during the track-following control. Therefore, the repetitive disturbance compensation signal for track-following control can be used as a high precision disturbance compensation signal even if it is used during the track jump.

FIGS. 29A to 29D and 31A to 31D relate to the case where although the speed specified by each of the track jump speed orbits 230-4 and 230-6 is opposite to that of the track eccentricity following speed orbit 228 at that time in a manner similar to FIGS. 30A to 30D, a range where the value of the speed of the track jump itself is higher than the track eccentricity following speed at that time exists. For example, as shown at points 156 and 158 of the track jump speed orbit 230-4 in FIG. 29B, a range where the carriage speed crosses the zero point and the speed direction is reversed during the track jump occurs. In the range between the points 156 and 158, since the direction of the carriage speed due to the track jump is opposite to that of the track eccentricity following speed orbit 228, the direction of the Coulomb frictional disturbance is opposite to that at the time of the track eccentricity following operation. Therefore, the ideal disturbance compensation signal in the time range between the points 156 and 158 becomes a signal as shown by a broken line 160. An FF error shown by a hatched portion 162 occurs between the signal of 160 and the compensation signal 234 which is actually fed-forward. Therefore, to cancel the Coulomb frictional disturbance, it is necessary to supply the driving current in the accelerating direction to compensate for the Coulomb frictional disturbance in a range shown by the broken line 160 in FIG. 29D where the direction of the Coulomb frictional disturbance is opposite to that upon track-following control in which the FF error 162 occurs. This means that when only the feed-forward of the repetitive disturbance compensation signal only by the learning control unit 80 is performed, a feed-forward error shown by the hatched portion 162 surrounded by the broken line 160 remains.

Figure 32A:
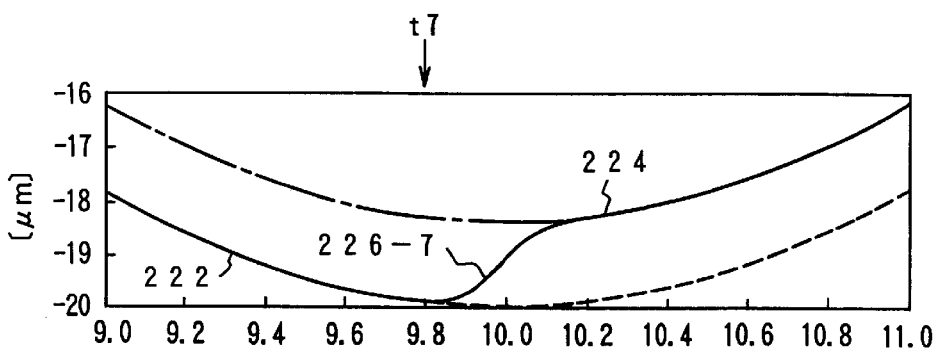
FIGS. 32A to 32D are explanatory diagrams of a track jump control with an FF error which was started at an eccentricity period t7=9.8 msec.
Figure 32B:
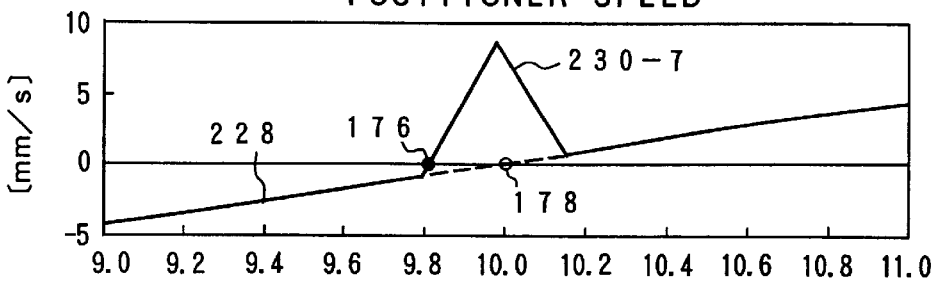
Figure 32C:
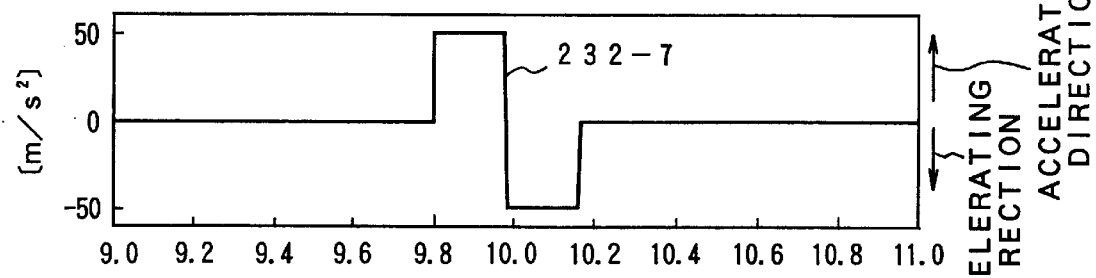
Figure 32D:
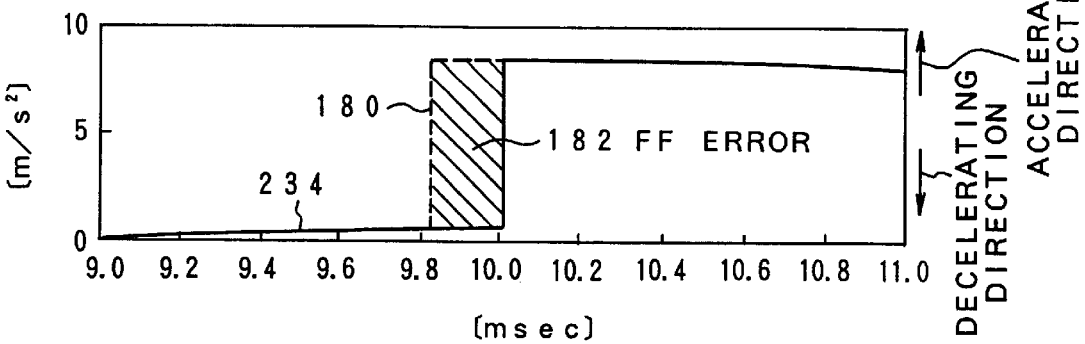
Figure 33A:
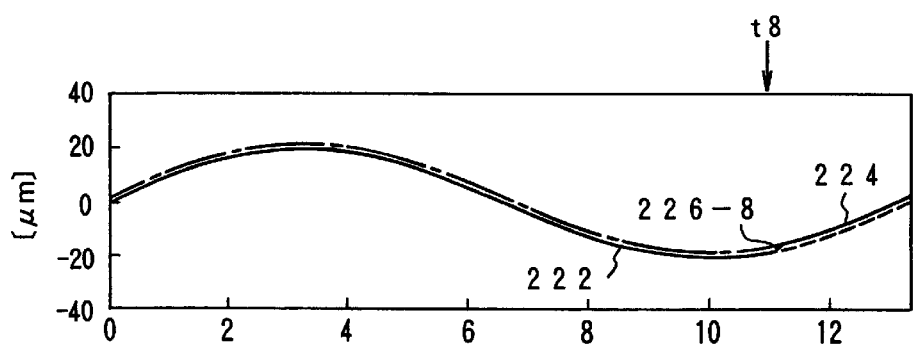
FIGS. 33A to 33D are explanatory diagrams of a track jump control without an FF error which was started at an eccentricity period t8=11 msec.
Figure 33B:
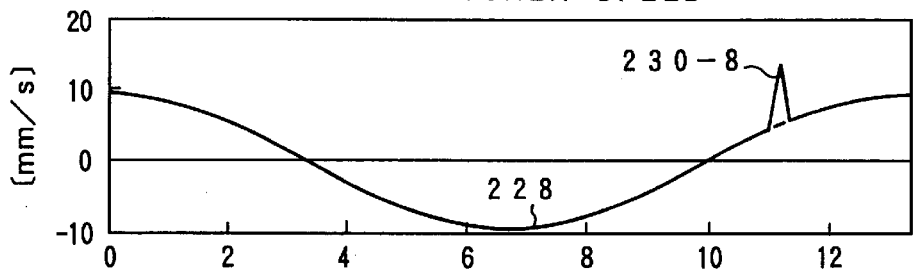
Figure 33C:
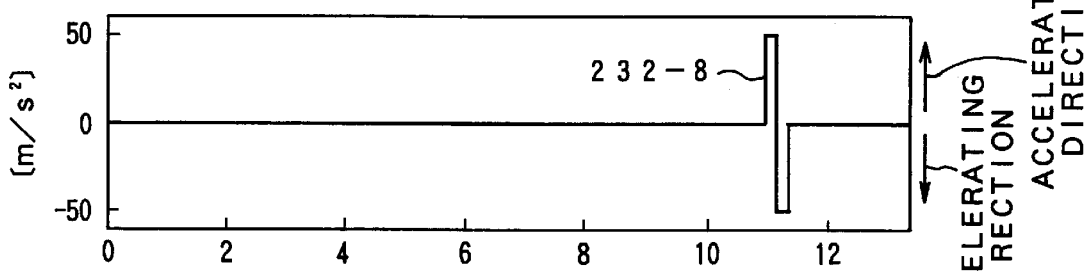
Figure 33D:
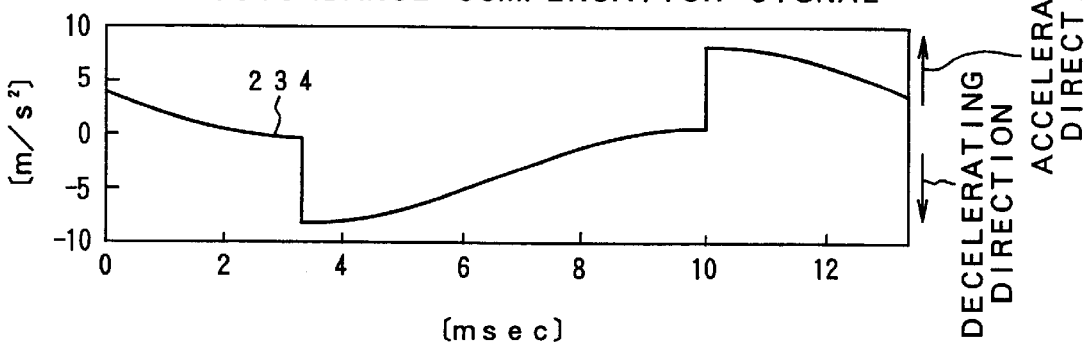
Figure 34A:
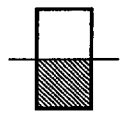
FIGS. 34A and 34B are explanatory diagrams of a table in which analysis results in FIGS. 26A to 33D are collected.
Figure 34B:
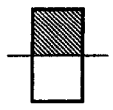

FIGS. 28A to 28D and FIGS. 32A to 32D show a case where the track jump is performed at time t3 and t7 near the timing when the speed becomes zero with respect to the track eccentricity following speed orbit 228. For example, in FIG. 28B, although the moving direction of the speed specified by the track eccentricity following speed orbit 228 is reversed at a time point 172, the moving velocity of the carriage is changed from the velocity upon track-following control as shown by the track jump speed orbit 230-3 by starting the track jump at a time point of time t3=3.3 msec before the reversal of the moving direction. Therefore, the reversal of the moving direction is changed to a time point 174 delayed from the time point 172. In FIG. 32B, although the carriage moving direction is reversed at a point 178 as shown by the track eccentricity following speed orbit 228, it shows the track jump speed orbit 230-7 by the track jump from time t7=9.8 msec and the carriage moving velocity is changed from the velocity upon track-following control, so that the reversal of the moving direction is changed to a point 176. Thus, the ideal disturbance compensation signal in a time range between the points 172 and 174 in FIG. 28D becomes a signal as shown by a broken line 152. When the repetitive disturbance compensation signal 234 is fed-forward, an FF error shown by a hatched portion 154 occurs. In case of FIG. 32D as well, an FF error shown by a hatched portion 182 likewise occurs. Analysis results of FIGS. 26A to 33D will now be summarized as shown in tables of FIGS. 34A and 34B. In the tables of FIGS. 34A and 34B, in the track jump in the apparatus in which the Coulomb frictional disturbance exists, there is a point where the direction of the Coulomb friction occurring in a slide portion between the positioner carriage and the guide is steeply reversed in dependence on the direction (positive/negative) of the relative speed between them. In the apparatus using the single stage positioner as a target of the invention, the relative speed is determined by the eccentricity following speed and the track jump speed. Thus, as shown in the tables of FIGS. 34A and 34B, in case of FIGS. 26A to 26D, 27A to 27D, and 33A to 33D where the moving direction of the eccentricity speed during the track jump and the moving direction of the track jump coincide, since the direction of the relative speed between the positioner carriage and the rail during the track jump is the same as that during the track-following control. Therefore, no contradiction occurs in the magnitude or direction of the Coulomb frictional disturbance and the feed-forward compensation can be performed at high precision even if the repetitive disturbance compensation signal 234 is used during the track jump. On the other hand, when the moving direction of the eccentricity speed during the track jump is opposite to the moving direction of the track jump and the magnitude of the speed (relative speed of the positioner carriage in which the track is used as a reference) of the track jump is larger than the magnitude of the eccentricity speed at that time, the direction of the relative speed between the positioner carriage and the rail during the track jump is reversed from that during the track-following control as shown in FIGS. 29A to 29D and FIGS. 31A to 31D, the direction where the Coulomb frictional disturbance occurs is opposite to that during the track-following control for such an interval. Further, there is a case where the track jump is performed over a time point when the eccentricity speed becomes zero as shown in FIGS. 28A to 28D and FIGS. 32A to 32D. In FIGS. 28A to 28D, since the track jump is started in the positive direction just before the eccentricity following speed is changed from a positive value to zero, the time when the speed of the positioner carriage crosses the zero point and becomes a negative speed is delayed from the point 172 to the point 174 as compared with the timing upon eccentricity following. If the repetitive disturbance compensation signal for eccentricity following shown by the solid line 234 is fed-forward, the feed-forward operation of an insufficient acceleration is performed as compared with the ideal disturbance compensation signal 152 shown by the broken line to be fed-forward during the track jump. In FIGS. 32A to 32D, since the track jump is started in the positive direction just before the track eccentricity following speed is changed from a negative value to zero, the time when the speed of the positioner carriage crosses the zero point and becomes a positive speed is advanced from the point 178 to the point 176 as compared with the timing upon eccentricity following. Therefore, if the repetitive disturbance compensation signal for eccentricity following shown by the solid line 234 is fed-forward, a feed-forward operation of an insufficient acceleration is likewise performed as compared with an ideal repetitive disturbance compensation signal 180 (shown by a broken line) to be fed-forward during the track jump. From the above analysis results, there is such a feature that with respect to the case where the compensation error occurs when there is the Coulomb friction, the direction where the compensation error occurs becomes the direction of the insufficient acceleration in any case. In the invention, therefore, by forming the track jump signal in consideration of the feature in which the direction where the compensation error occurs when there is the Coulomb friction becomes the direction of the insufficient acceleration, even in the case where an error occurs in the repetitive disturbance compensation signal to be fed-forward during the track jump, the track jump can be stably and rapidly performed.

Figure 35A:
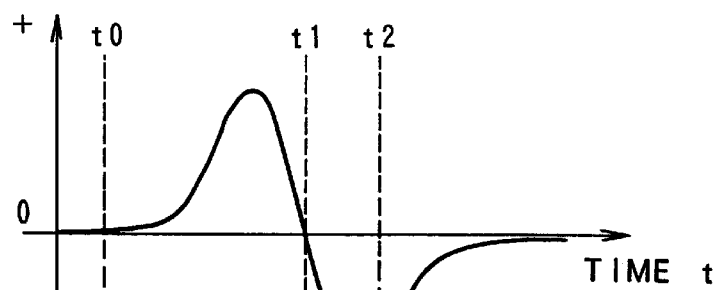
FIGS. 35A to 35C are explanatory diagrams of a track jump signal, a tracking error signal TES, and a track jump speed of the invention in the case where there is no disturbance compensation error.
Figure 35B:
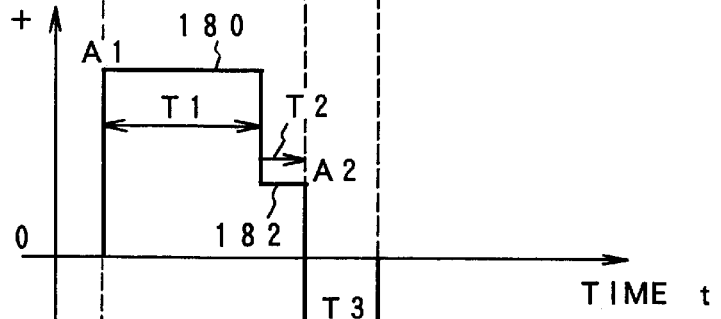
Figure 35C:
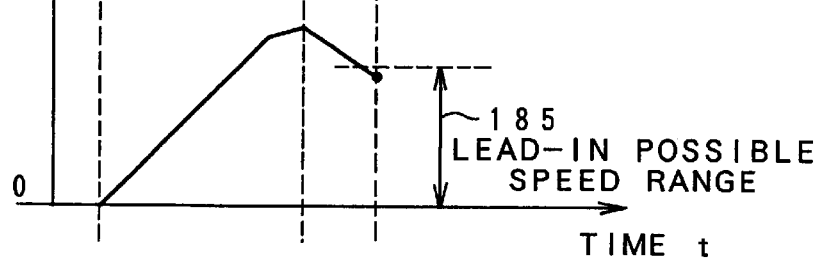

FIGS. 35A to 35C show the track jump signal of the invention obtained by considering such a principle that the disturbance compensation error certainly occurs in the direction of the insufficient acceleration in the feed-forward by the repetitive disturbance compensation signal. That is, FIG. 35A shows the tracking error signal TES. FIG. 35B shows the track jump signal of the invention. FIG. 35C shows the track jump speed (relative speed between the track and the positioner). The track jump signal to jump the light spot by one track in FIG. 35B is constructed by a first kick pulse 180, a second kick pulse 182, and a brake pulse 184. The first kick pulse 180 has a predetermined acceleration height A1 and a predetermined time width Ti smaller than the minimum value of the time (t1–t0) from a track jump start time t0 in FIG. 35A to a track zero-cross point detection time t1 showing the passage of 0.5 track in the tracking error signal TES. Although the duration of the time (t1–t0) is fluctuated by various disturbance amounts which are applied at the time of the track jump as will be also explained hereinlater, the values of A1 and T1 are designed so that the predetermined time width T1 can be set to a duration that is equal to or shorter than the minimum time of (t1–t0) in consideration of presumed disturbance conditions. As a second kick pulse 182, a predetermined acceleration A2 whose height is lower than the first kick pulse 180 is continued until the track zero-cross point detection time t1. Therefore, a continuation time T2 of the second kick pulse is changed due to the disturbance amount upon track jump and is not constant. Further, the brake pulse 184 has a height of predetermined deceleration A3 and a predetermined time width T3 with respect to a period of time after the track zero-cross point detection time t1 and is adjusted so that its end time point becomes a time point t2 that is ¼ track before the target track. In the track jump signal according to the invention, the first kick pulse 180 becomes a main acceleration pulse and is set to the acceleration A1 which is largest possible, in order to rapidly accelerate, in a range where the deceleration can be performed by the brake pulse 184 and the subsequent lead-in control considering the acceleration performance of the positioner carriage. The continuation time T1 of the first kick pulse 180 is set to a continuation time as long as possible in a range where the first kick pulse 180 is finished at a point that is earlier than the track zero-cross detection time point t1 even if the maximum value of a disturbance compensation error which is presumed acts. The disturbance compensation error denotes an error between the disturbance compensation amount due to the feed-forward which is executed during the track jump mentioned above and an amount of disturbance which actually acted. Further, the second kick pulse 182 subsequent to the first kick pulse 180 is set in such a manner that the acceleration A2 is smaller than that of the first kick pulse 180 and larger than the maximum value of the disturbance compensation error that is presumed, namely, the insufficient acceleration clarified by the analysis of FIGS. 24A to 33D, that is, the disturbance compensation error occurring in the decelerating direction and can compensate for the disturbance compensation error in the decelerating direction. There are the following advantages in case of using such a track jump signal. First, in an acceleration phase until the track zero-cross point detection time t1, the first kick pulse 180 and second kick pulse 182 of the acceleration exceeding the disturbance compensation error in the decelerating direction are always generated. Therefore, as shown in FIGS. 27A to 27D, 28A to 28D, 31A to 31D, and 32A to 32D, even if the compensation error in the decelerating direction occurs, the track jump is not reversely performed by the deceleration disturbance. The first kick pulse 180 of the large acceleration A1 is set so as not to continue until the track zero-cross point detection time t1 and the second kick pulse 182 is set to the magnitude of the necessary minimum acceleration A2. Therefore, even if there is a variation of detection time of the track zero-cross point, which will be clearly explained hereinlater, in other words, even if there is usually a variation depending on the precision of about one sampling time, a self-applied acceleration variation due to the variation of the track zero-cross point detection time is suppressed to the minimum value. That is, a speed variation due to the self applied acceleration at the end of the acceleration is minimized. The brake pulse 184 is adjusted so that the height of deceleration A3 is constant and an end time point of its continuation time T3 is set to a point near the time point that is approximately ¼ track before the target track, more accurately, a point near the time point when the tracking error signal TES has the maximum amplitude. At a point that is ½ track before the target track serving as a position near a groove of the medium track, since a sensitivity of the tracking error signal TES is inverted from that at a portion near the land, a range close to the target track exceeding the peak near a point that is ¼ track before the target track can be used easily as a feedback signal for track lead-in control. Therefore, the continuation time T3 of the brake pulse 184 has a meaning of waiting for a passage of a range where it is difficult to use the signal as a feedback signal for track lead-in control. However, if the brake pulse 184 of the predetermined deceleration A3 as mentioned above is continued for a long time, there is a possibility that the errors are accumulated because of a kind of open control. Therefore, it is proper to stop the brake pulse 184 as quickly as possible and absorb the errors occurring during the track jump by the feedback control for track lead-in. Consequently, it is considered that it is the optimum way to set the continuation time T3 of the brake pulse so that the continuation time of the brake pulse 184 is finished at a point near a position that is ¼ track before the target track corresponding to the peak point of the tracking error signal TES in consideration of the following points.

I. Wait for the passage of the range where it is difficult to use the TES signal for feedback control of lead-in control.

II. It is proper to stop the brake pulse as quickly as possible and absorb the errors occurring during the track jump by the feedback control.

Figure 36A:
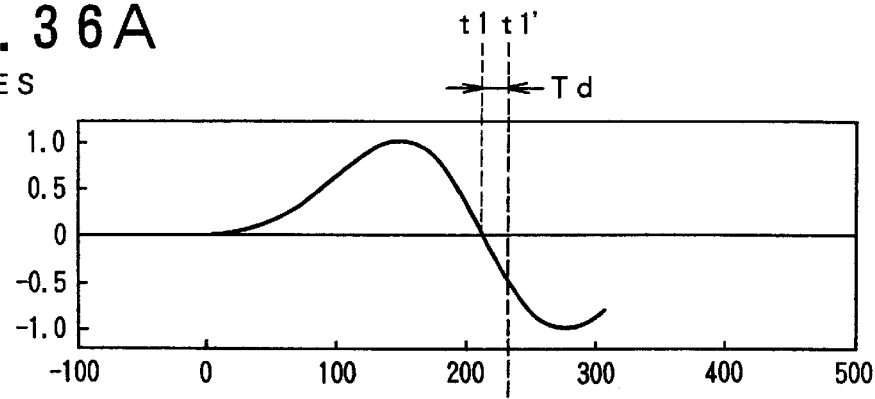
FIGS. 36A to 36D are explanatory diagrams of a track jump control in an ideal case where there is no deceleration disturbance.
Figure 36B:
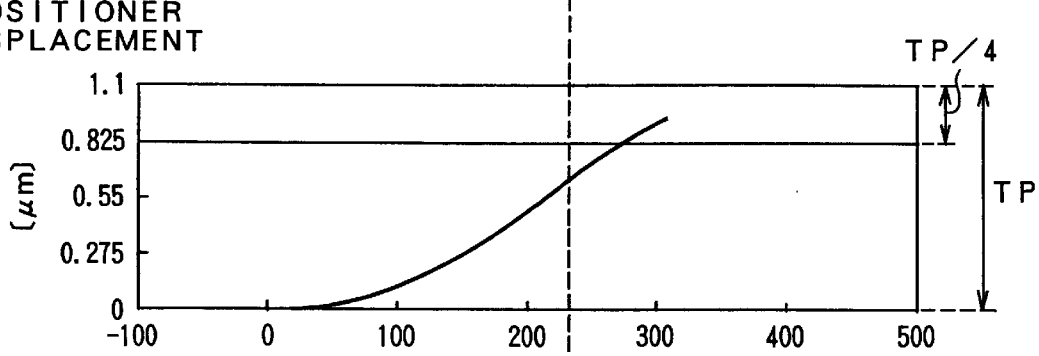
Figure 36C:
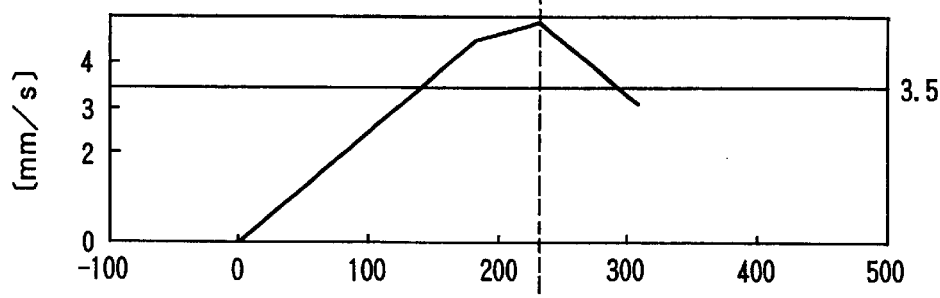
Figure 36D:
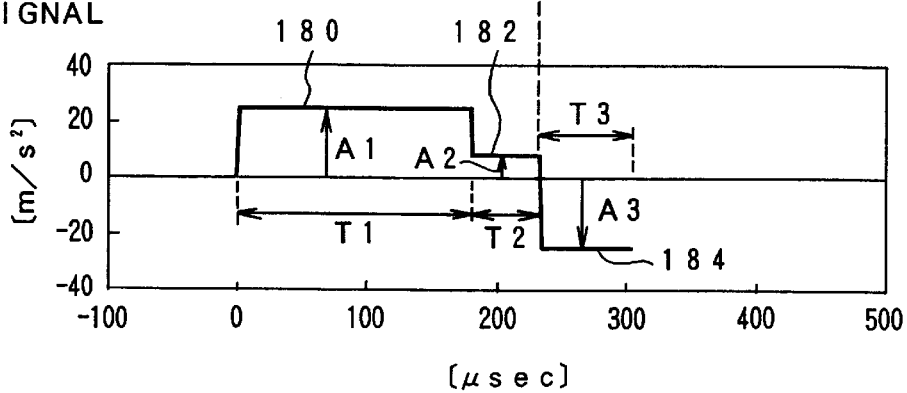

FIGS. 36A to 36D show the track jump signal according to the invention in FIG. 35B and a specific example of its control. FIG. 36A shows the tracking error signal TES. FIG. 36B shows the positioner displacement. FIG. 36C shows the positioner speed. FIG. 36D shows the track jump signal of the invention. In FIGS. 36A and 36B, both of the positioner displacement and the positioner speed are shown as relative amounts in which the track is used as a reference. The embodiment presumes the ideal case where the track pitch TP of the medium is set to TP=1.1 μm and there is no compensation error of the disturbance. Further, a sampling frequency of the control system is set to 55 kHz, a total delay amount Td of a detection delay of the track zero-cross point, an output delay that is caused until the brake pulse is actually outputted, and the like is averagely set to a value of approximately one sampling period for the actual track zero-cross time t1 of the tracking error signal TES in FIG. 36A, and the brake pulse is generated at time t1' as shown in the diagram. The height A1 of the first kick pulse 180 in FIG. 36D is set to a relatively small value of A1=25 [m/sec$^2$] also considering a limitation of the maximum generating acceleration of the carriage in the apparatus using the single stage positioner, or the like. Although not shown in FIGS. 36A to 36D, in the actual apparatus, the repetitive disturbance compensation signal for track-following control from the learning control unit 82, the low band compensation component from the feedback control unit 80, and the like are applied as feed-forward components as shown in the embodiment of FIG. 4. The eccentricity amount of the exchangeable medium such as an MO cartridge or the like that is used in the apparatus of the invention, the frictional disturbance of the apparatus, the vibration disturbance from the outside of the apparatus, and the like are compensated mainly by the feed-forward of the repetitive disturbance compensation signal upon track-following control, the low band compensation component of the feedback control system, and the like. It is necessary to set the compensation margins for those disturbances to, for example, about 25 [m/sec$^2$]. Therefore, if the maximum generating acceleration of the carriage is set to about 50 [m/sec$^2$], the acceleration A1 that is allocated to the first kick pulse 180 is equal to about A1=25 [m/sec$^2$]. The height of the second kick pulse 182, namely, the acceleration A2 is set to A2=8 [m/sec$^2$]. Now, assuming that the maximum value of the coefficient of friction in the slide portion of the carriage of the single stage apparatus is set to $\mu_{max}$=0.35, FF compensation errors 154, 162, 170, and 182 in FIGS. 28A to 28D, 29A to 29D, 31A to 31D, and 32A to 32D are twice as large as the friction amount. Therefore, if they are converted to an acceleration error, it is equal to 2×0.35×9.81=6.87 [m/sec$^2$]

Since the acceleration error acts in the decelerating direction, the second kick pulse 182 is set to A2=8 [m/sec$^2$] so as to set the height of acceleration A2 which can overcome the deceleration component. The deceleration A3 and continuation time T3 of the brake pulse 184 are set in such a manner that the speed accelerated by the first kick pulse 180 and second kick pulse 182 is decelerated to a speed which can be led in by the lead-in control system at a position near a point that is ¼ track before the target track, more accurately, at a position where the tracking error signal TES in FIG. 36A becomes the peak at a point that is ¼ track before the target track. In this case, if the deceleration A3 of the brake pulse 184 is too high, the positioner carriage is moved backward to the end of the brake pulse. If the deceleration A3 of the brake pulse 184 is too low, the speed when the control mode is changed to the lead-in control is too high and the lead-in operation fails. Therefore, it is necessary to adjust the deceleration A3 in such a manner that when the brake pulse 184 is finished, namely, when the control mode is changed to the lead-in control, the positioner carriage is not moving backward and, further, the speed is not too high. In FIG. 36D, a case where a permission value of the highest speed in case of changing the control mode to the lead-in control at a position near a point that is ¼ track before the target track is equal to approximately 3.5 [mm/sec] is presumed. The lowest speed when changing the control mode to the lead-in control is set to 0 [mm/sec] in the worst case under a condition that the positioner carriage is not moving backward. That is, it is sufficient to set the height A1 and continuation time T1 of the first kick pulse 180, height A2 of the second kick pulse 182, and the height A3 and continuation time T3 of the brake pulse 184 in such a manner that the track jump speed when the control mode is changed to the lead-in control at a position near a point that is ¼ track before the target track lies within a range of 0 to 3.5 [mm/sec]. FIGS. 37A to 37D, 38A to 38D, and 39A to 39D show the track jump in the case where the disturbance compensation error by the feed-forward of the repetitive disturbance compensation signal occurs at a different timing. The disturbance compensation error occurs in the decelerating direction. The coefficient of friction is set to $\mu_{max}$=0.35 presumed as a maximum value. When it is converted to an acceleration error, since a double error occurs, it is assumed that the deceleration of −6.87 [m/sec$^2$] occurs in FIGS. 37A to 39D. As shown in FIGS. 28A to 28D, 29A to 29D, 31A to 31D, and 32A to 32D, a time width in which the error in the decelerating direction occurs depends on the phase of the disk rotation at which the track jump is performed, the eccentricity amount, or the like. In FIGS. 37A to 39D, in consideration of the above point, the time when the deceleration disturbance due to the compensation error of the deceleration −6.87 [m/sec$^2$] acts is changed to time td1, td2, and td3.

Figure 38A:
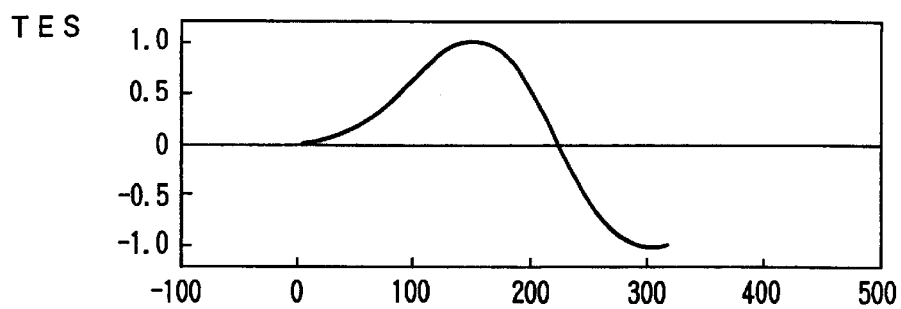
FIGS. 38A to 38D are explanatory diagrams of a track jump control in a case where a deceleration disturbance is applied to an approximately latter half interval.
Figure 38B:
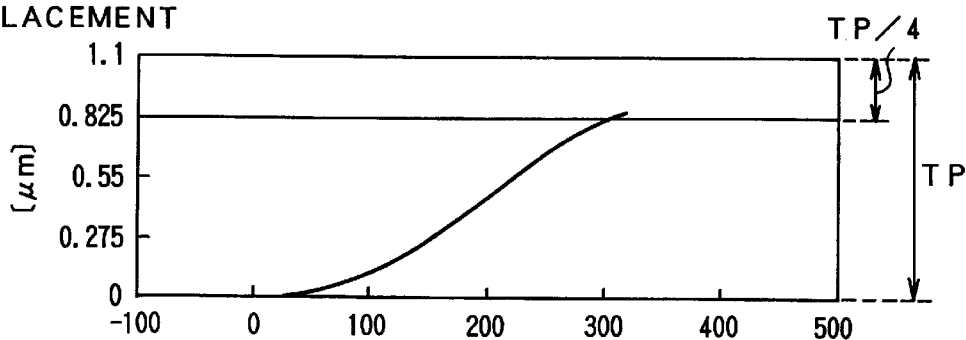
Figure 38C:
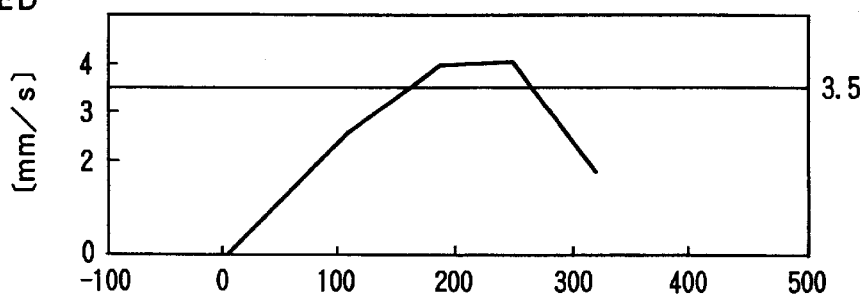
Figure 38D:
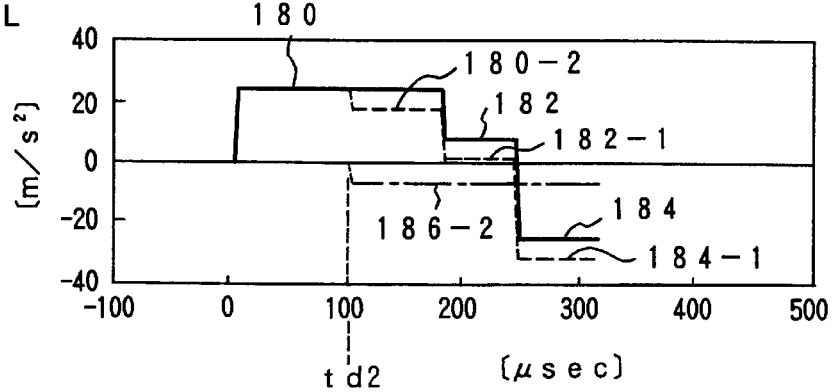
Figure 39A:
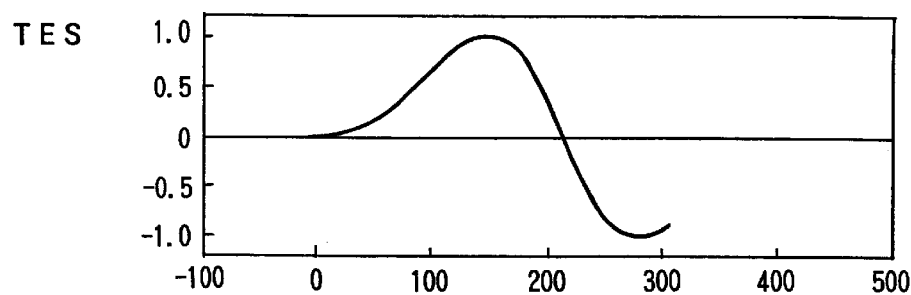
FIGS. 39A to 39D are explanatory diagrams of a track jump control in a case where a deceleration disturbance is applied to the approximately latter half interval.
Figure 39B:
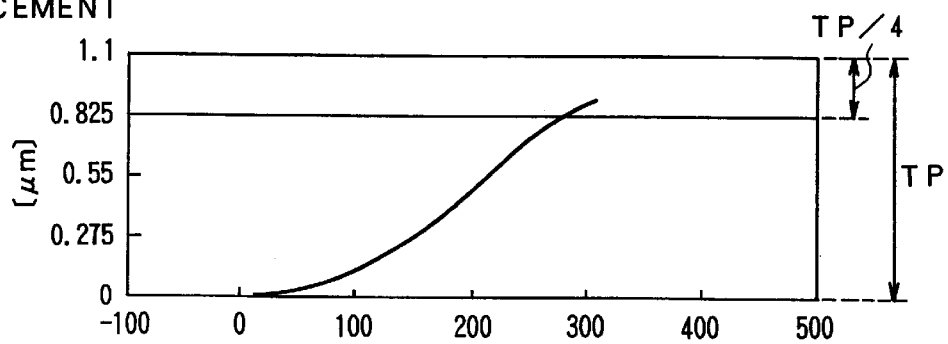
Figure 39C:
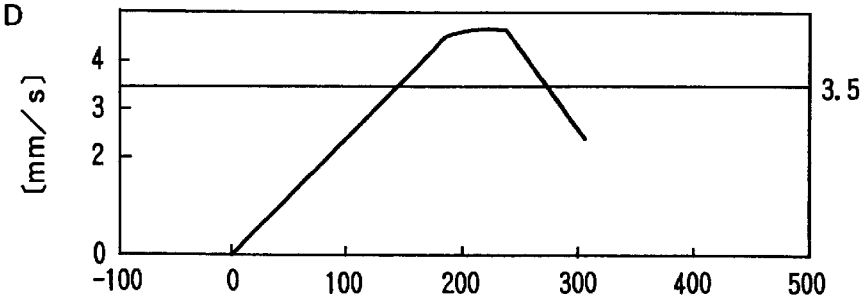
Figure 39D:
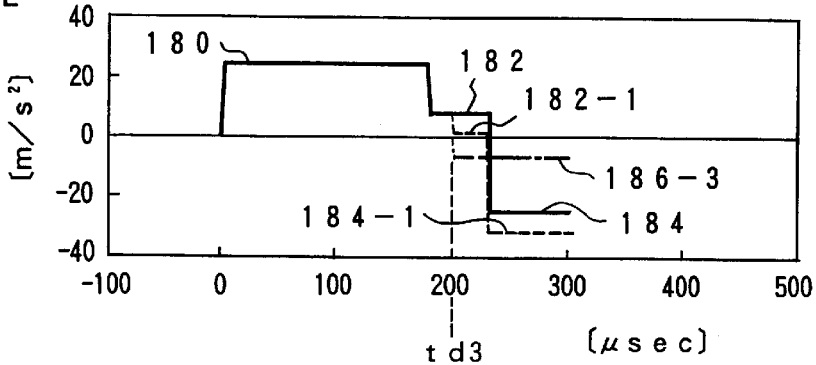

First, FIGS. 37A to 37D relate to a case where a deceleration disturbance 186-1 acts at the time td1=0 just after the start of the track jump and the deceleration disturbance 186-1 is applied continuously during the track jump and show the worst case. The first kick pulse 180, second kick pulse 182, and brake pulse 184 of the track jump signal are effectively changed as shown by 180-1, 182-1, and 184-1 due to the deceleration disturbance. FIGS. 38A to 38D relate to a case where a deceleration disturbance 186-2 occurs at a point near the time td2=100 μsec after the start of the track jump and continues until the end of the track jump. Further, FIGS. 39A to 39D relate to a case where a deceleration disturbance 186-3 occurs at a point near the time td3=200 μsec after the start of the track jump and continues until the end of the track jump. In FIGS. 38D to 39D, the positioner carriage is subjected to the deceleration disturbances 186-2 and 186-3 of the maximum value of the frictional disturbance compensation error for each time interval of approximately ⅔ and ⅓ of the time that is required for the track jump and determined by the sum of the continuation time of the first kick pulse 180, second kick pulse 182, and brake pulse 184. However, when positioner displacements in FIGS. 38B and 39B are seen, the brake pulse 184 is finished at a position near a point of the track pitch 0.825 μm corresponding to a position near a point that is ¼ track before the target track of the track pitch TP=1.1 μm in both of them. As for the track jump speed at that time, since the positioner speed lies within a range of 0 to 3.5 [mm/sec] as shown in FIGS. 38C and 39C, the subsequent lead-in operation succeeds. On the other hand, FIG. 37D relates to the worst case and the positioner carriage is continuously subjected to the deceleration disturbance 186-1 of the maximum value of the frictional disturbance compensation error during the track jump from the time td1=0 μsec just after the start of the track jump. In this case, as shown in FIG. 37B, although the positioner displacement does not slightly reach the position of 0.825 μm that is ¼ track before the target track, the positioner speed leaves the speed in the rushing direction for the target track as shown in FIG. 37C, so that the pickup can be led in even in the worst case. In the formation of the track jump signal of the invention as mentioned above, the height A1 and continuation time T1 of the first kick pulse 180, height A2 of the second kick pulse 182, and the height A3 and continuation time T3 of the brake pulse 184 are all set to the fixed values except for a point that the continuation time T2 of the second kick pulse 182 is variable because it continues until the detection of the track zero-cross point. On the other hand, according to the conventional track jump signal, there is a method whereby by detecting an inclination of the tracking error signal TES at the time of the detection of the track zero-cross point, an amount corresponding to the speed at that time point is captured and the height of brake pulse is changed in accordance with the speed at that time, or the like. The method of deciding the deceleration of the brake pulse in accordance with the speed obtained from the tracking error signal as mentioned above is considered to be fairly effective if the speed can be detected at a high reliability. However, in the actual tracking error signal TES, there is a case where the noises are large due to an influence by the medium ID portion or the like and there are many cases where the speed is detected erroneously. In this case, contrarily, the track jump often becomes unstable. On the other hand, in the track jump signal of the invention, the repetitive disturbance compensation signal captured at the time of the track-following control, the low band compensation component of the feedback control unit, and the like are first fed-forward during the track jump, and the disturbance compensation is performed at a precision as high as possible. Further, by forming the track jump signal in consideration of a feature in the case where the precision of the disturbance compensation by the feed-forward deteriorates, the stable track jump can be realized in spite of a fact that most of the height and continuation time of the track jump signal are set to the fixed values. Since the change in height of the brake pulse or the like due to the speed detection using the tracking error signal during the track jump is not performed, the track jump that is fairly stable for the noises of the tracking error signal TES during the track jump can be performed.

Restart of Arithmetic Operation of Low Band Compensating Filter and Start of Feedback Control In the conventional track jump control, the output of the low pass filter (low band emphasizing filter) provided for the feedback control unit is fed-forward so as to be multiplexed to the track jump signal while it is held to a constant value during the track jump, and simultaneously with the end of the track jump (namely, start of the lead-in FB control), the arithmetic operation of the low band emphasizing filter which receives the TES signal is restarted, namely, the low band FB compensation is restarted. For example, in the embodiment of JP-A-2-152020, the low band emphasizing filter is constructed by a simple integration compensator, the TES signal is inputted to the integration compensator during the track-following control, and the low band disturbance compensation is performed. On the other hand, simultaneously with the start of the track jump, the input to the integration compensator is set to zero, in other words, the output of the integration compensator is held to the integration value just before the track jump and multiplexed to the track jump signal. Simultaneously with the end of the track jump, the TES signal is again selected as an input to the integration compensator and the integration compensation is restarted by using the held integration value as an initial value. However, in many cases, it is not always a better way that at the end of the track jump, the compensation arithmetic operation of the low pass filter is started simultaneously with the start of the feedback control or the lead-in control for track-following control. There is no problem in the case where the tracking error signal TES at a moment when the lead-in control is started after the end of the track jump is sufficiently close to zero, namely, the case where the light spot has already been located at a point near the center of the target track when the lead-in control is started. However, there is a case where even if the track jump signal is designed so that the light spot is located on the target track at the time point of the end of the track jump, the light spot is not located on the target track due to various disturbances. The output of the brake pulse in the track jump signal of the invention is designated in such a manner that the brake pulse is stopped slightly early, the track jump signal is finished at a position near a point that is ¼ track before the target track, and the control mode is changed to the lead-in control. Therefore, even in an ideal state without a disturbance shown in FIG. 36D, at the start of lead-in, the feedback control is started while a state where the large error remains in the tracking error signal TES at a position before the target track of the track pitch 1.1 μm like a positioner displacement in FIG. 36B is set to an initial state. In the case where the lead-in control is started in a state where the error for the target track is large to a certain extent, the output of the low band compensating filter also acts in the direction adapted to eliminate the error. For example, in case of the low band compensating filter of the integration compensating type, since a large error signal is inputted simultaneously with the start of the feedback control, the integration value of the low band compensating filter is largely oscillated. Since the output of the low band compensating filter generally shows a slow response, if the output is largely oscillated once, it takes time to settle the output to the final value. Thus, an adverse influence is exerted to the stability of the lead-in control. In the conventional apparatus, since it is necessary to assure the feedback gain near the eccentricity frequency in order to stabilize the lead-in control even in case of the medium of a large eccentricity, the arithmetic operation of the low band compensating filter and the feedback control of its output have to be started simultaneously with the start of the lead-in control. In the invention, however, since the repetitive disturbance compensation signal which is used for track-following control of high precision is captured by the learning control and always fed-forward during the track-following control and the track jump control, there is no need to start the feedback of the output of the low band compensating filter just after the start of the track lead-in. The invention, therefore, is characterized in that the restart of the arithmetic operation of the low band compensating filter and the start of the feedback control are executed after waiting for a predetermined time after the start of the lead-in. Specifically speaking, as shown in the embodiment of FIGS. 24A, 24B, 25A, and 25B, since the calculation stop/restart command 150 is supplied to the low band emphasis calculating unit 146 provided for the low band emphasizing filter 124 of the feedback control unit 80, with respect to the low band emphasizing filter 124 whose arithmetic operation was stopped by the calculation stop command just before the start of the track jump, a restart command is supplied after waiting for a predetermined time after the start of the lead-in control after completion of the track jump, thereby restarting the arithmetic operation of the low band emphasizing filter 124 and starting the feedback control. A waiting time T4 in a range from the start of the lead-in control to the restart of the arithmetic operation of the low band emphasis calculating unit 146 and the start of the feedback is set to such a time that a transient response due to the lead-in control of the feedback control unit 80 in a state where the arithmetic operation of the low band emphasis calculating unit 146 is held stopped (namely, as an output of the low band emphasis calculating unit, the output value just before the track jump is held and continuously outputted) is regarded to be settled to a certain extent. The arithmetic operation of the low band emphasis calculating unit 146 is restarted after the elapse of the waiting time T4. That is, the low band emphasis calculating unit 146 stops the arithmetic operation while the internal variables is held and holds its output simultaneously with the start of the track jump. After the control mode was changed to the lead-in control, the apparatus waits for the elapse of the waiting time T4. The arithmetic operation is restarted while the input value to the low band emphasis calculating unit 146 at that time and the held internal variables are used as initial values. As an output of the low band emphasis calculating unit 146 when the arithmetic operation is restarted, the held output is used as an initial value and the fluctuation of the output is restarted in accordance with the input to the low band emphasis calculating unit 146. In the embodiment, the phase-lead compensator & post-stage compensation element 136 locating at the post stage of the low band emphasizing filter 124 in the feedback control unit 80 always continues the calculation even during the track jump. The post-stage compensation element is, for example, a notch filter to cancel a high-order resonance of a mechanism. The notch filter or the like is not always limited to the case where it is arranged at such a position. For example, the notch filter can be previously applied to the TES signal before it is inputted to the proportional calculating unit 130. Since the selector 110 is switched to the track jump signal side 110-2 during the track jump, the output of the phase-lead compensator & post-stage compensation element 136 is not reflected to the driving command signal. However, the arithmetic operation is continued on the basis of the output of the adder 134. The constant value which is outputted from the low band emphasis calculating unit 146, namely, the held output value just before the track jump of the low band emphasis calculating unit 146 and the outputted value from the proportional calculating unit 147, which is obtained by multiplying the TES signal by (Kp×$K_{GL}$) (in this case, the value which fluctuates in accordance with the fluctuation of the TES signal during the track jump is outputted) are multiplexed by the addition point 134, and the phase-lead compensator & post-stage compensation element 136 continues the filter arithmetic operation by receiving the resultant addition signal during the track jump. Simultaneously with the end of the track jump signal (after the elapse of the continuation time T3 of the brake pulse A3), the selector 110 is again switched to the input terminal 110-1 side, the output of the phase-lead compensator & post-stage compensation element 136, namely, the output of the feedback control unit 80 is sent to the addition point 84 and multiplexed to the driving command signal, and the lead-in control is started. At this time, the selector 120 is simultaneously switched to the input terminal 120-1 side. The output from the selector 120 becomes zero. However, in this moment, the stop of the arithmetic operation of the low band emphasis calculating unit 146 is still continued. Subsequently, after the elapse of the waiting time T4, the low band emphasis calculating unit 146 also restarts the arithmetic operation as mentioned above and the output of the low band emphasis calculating unit 146 fluctuates in accordance with the fluctuation of the TES signal while the held output is used as an initial value. Thus, the low band compensation output is not largely fluctuated by the transient response of the lead-in control but is promptly converged to the low band disturbance to be compensated, and a steady-state error can be rapidly suppressed.

The operation in which the lead-in control is performed while the arithmetic operation stop of the low band compensating filter is continued as mentioned above will now be described as follows from another viewpoint. That is, since the arithmetic operation of the low band compensating filter is stopped during the transient response of the lead-in control, the phase margin near the band of the lead-in control system remarkably increases in correspondence to it and the more stable lead-in control in which a damping effect for the rushing speed at the time of lead-in is larger is performed, so that the stable and rapid lead-in control can be realized. In this case, although the low band compensation gain of the feedback control system temporarily decreases, there is no problem in the invention because the repetitive disturbance compensation signal obtained by the high precision learning control is fed-forward. Since the value just before the track jump of the output of the low band compensating filter 124 or the output of the low band emphasis calculating unit 146 is held and feed-forward outputted as well, to the low band compensation for the non-repetitive disturbance is also effectively done. Further, since the low band compensating filter is effective when the reading or writing operation is actually performed after completion of the lead-in, the steady-state error is suppressed and the high precision track-following control is realized.

In the track jump control of the invention as mentioned above, the final value of the low band compensating filter 124 or low band emphasis calculating unit 146 just before the track jump is held and continuously held during the track jump and for a predetermined time after the start of the lead-in control after the end of the track jump, and after that, the arithmetic operation of the low band compensating filer is restarted while the internal variables of the low band compensating filter which was held is used as an initial value, and the low band compensation feedback control is restarted. Therefore, the input to the low band compensating filter of the large error signal in the lead-in transient response just after the track jump is prevented, a situation that the output of the low band compensating filter is vainly fluctuated by the lead-in transient response is prevented, and the output of the low band compensating filter can be made almost coincident with the actual non-repetitive low band disturbance compensation component. Therefore, the error can be soon set to a state of almost zero by the lead-in control or track-following control, so that the access performance to the target track by the track jump control can be improved.

Figure 40A:
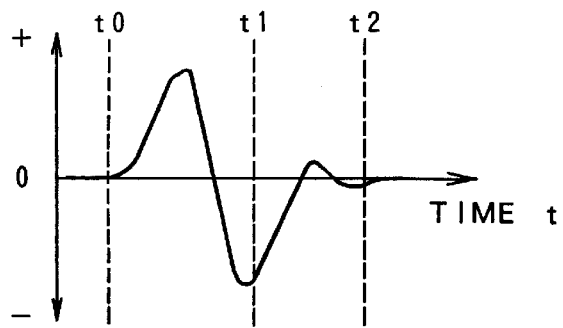
FIGS. 40A to 40E are time charts for a tracking error signal, a track jump signal, an FF signal for compensation of a repetitive disturbance, an output of the low band emphasizing filter, and a carriage driving signal in the track jump control of the invention.
Figure 40B:
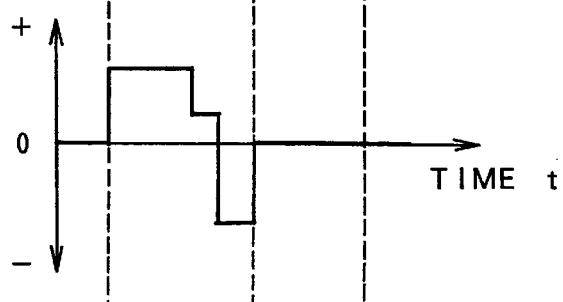
Figure 40C:
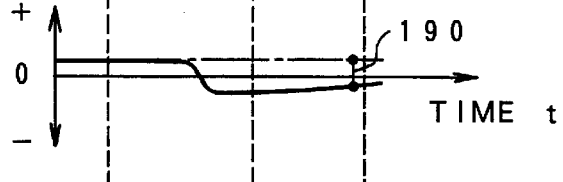
Figure 40D:
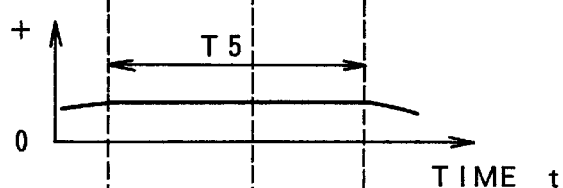
Figure 40E:
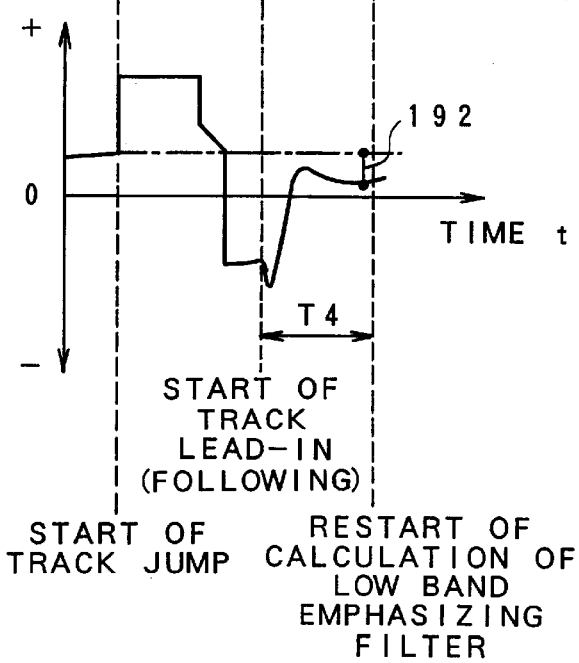

FIGS. 40A to 40E show signal waveforms during the track jump by the track jump control of the invention. The waveforms show the signal waveforms in the embodiment of FIGS. 25A and 25B, more specifically, the embodiment of FIGS. 18A and 18B. That is, FIG. 40A shows the tracking error signal TES, FIG. 40B shows the track jump signal, FIG. 40C shows the repetitive disturbance compensation signal for track-following control, FIG. 40D shows the output of the low band emphasis calculating unit, and FIG. 40E shows the final carriage driving signal of the positioner.

When the track jump is started at time t0, the carriage driving signal in FIG. 40E during the track jump becomes the sum signal of the track jump signal in FIG. 40B, the feed-forward signal for repetitive disturbance compensation in FIG. 40C, and the output of the low band emphasis calculating unit in FIG. 40D. After the track lead-in is started at time t1, the carriage driving signal becomes the sum signal of the feed-forward signal for repetitive disturbance compensation in FIG. 40C and the output signal from the feedback control unit 80 in FIGS. 25A and 25B (more specifically, FIGS. 18A and 18B) although not shown. The output of the low band emphasis calculating unit in FIG. 40D is held simultaneously with the start of the track jump at time t0. During the track jump until time t1, the held output of the low band emphasis calculating unit is added to the track jump signal and the feed-forward signal for repetitive disturbance compensation and becomes the carriage driving signal. After the track lead-in is started at time t1 as well, the output of the low band emphasis calculating unit is held for the predetermined time T4. For this period of time, the transient response by the lead-in control is settled as shown in the tracking error signal TES in FIG. 40A. At time t2 after the elapse of predetermined time T4, the arithmetic operation is restarted while the internal variable of the low band emphasis calculating unit held just before the start of the track jump is used as an initial value. Therefore, the arithmetic operation of the low band emphasis calculating unit is stopped for a continuation time T5 obtained by adding the predetermined time T4 during the lead-in control to the track jump time. The arithmetic operation of the low band emphasis calculating unit is restarted and the low band feedback is started at the timing of t2 when the transient response of the track lead-in is settled. Therefore, a situation that the output of the low band emphasis calculating unit is vainly fluctuated is prevented and the low band disturbance compensation value stably continues before and after the track jump. Like an FF signal for repetitive disturbance compensation in FIG. 40C, in the case where the track jump is performed over the rotational phase of the disk at which the Coulomb frictional disturbance occurs, the carriage driving current for track-following control after the track jump needs to have an offset which is caused due to the Coulomb frictional disturbance as compared with the carriage driving current before the track jump. However, since the FF signal in FIG. 40C is the feed-forward signal including an offset 190, a state where an offset 192 also occurs in the carriage driving signal in FIG. 40E and the signal is compensated is obtained. Therefore, when the arithmetic operation of the low band emphasis calculating unit is restarted after the signal is almost settled by the lead-in control at time t2, the output of the low band emphasizing filter does not need to follow this offset. The precision of the track-following control is also accurately held from the stage after the lead-in settlement.

Track Jump Signal Considering Time Error of TZC Detection

Figure 41A:
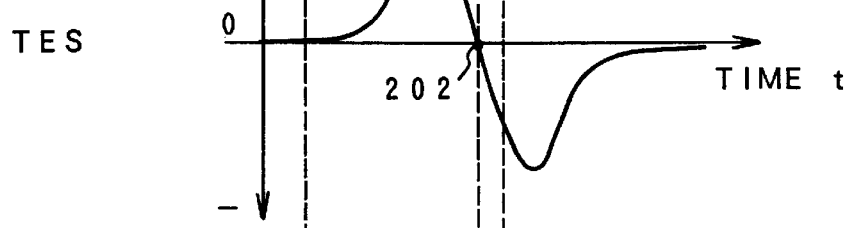
FIGS. 41A to 41C are explanatory diagrams of a conventional acceleration control by a kick pulse in which a predetermined acceleration is continued until the detection of a zero-cross point.
Figure 41B:
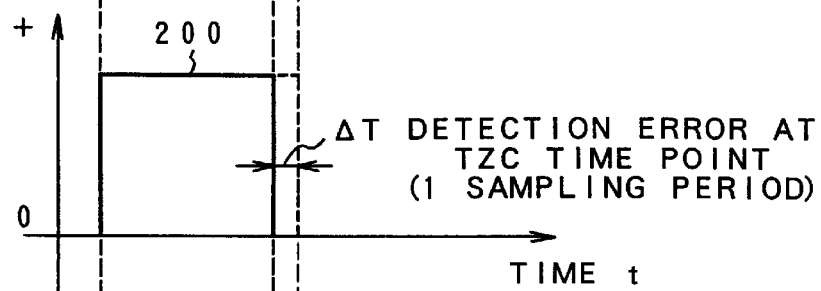
Figure 41C:
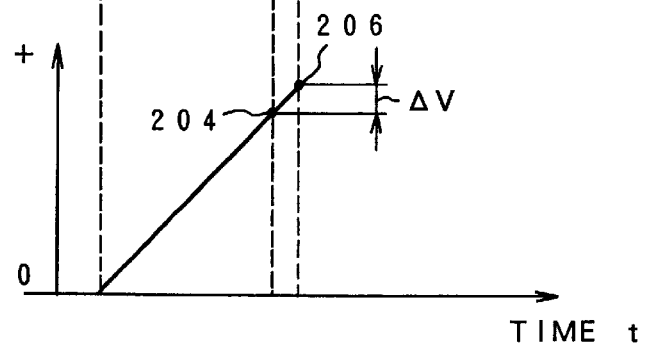

FIGS. 41A to 41C are explanatory diagrams of a kick pulse which is used in the ordinary track jump control. That is, FIG. 41A shows the tracking error signal TES, FIG. 41B shows the kick pulse to accelerate the track jump signal, and FIG. 41C shows the positioner speed as a track jump speed by the kick pulse. In this figure, this speed indicates a relative speed of the track and positioner. A conventional kick pulse 200 is set to a predetermined acceleration in a range from start time t0 of the track jump to time t1 serving as a zero-cross point 202 of the tracking error signal TES. As already described, according to the track jump control, the acceleration by the kick pulse and the deceleration by the brake pulse are performed from a state of the track-following control which can be regarded as a state of a zero relative speed in the seeking direction of the medium track and a pickup lens, the pickup is moved to a position near the target track, and after that, the control mode is changed to the track-following control or the like, thereby lead-in controlling the light spot to the target track. At this time, when considering from a viewpoint of the track jump speed, namely, the relative speed in the seeking direction of the medium track and the pickup lens of the carriage, the speed is accelerated by the kick pulse and decelerated by the next brake pulse. FIGS. 41A to 41C show only the kick pulse. The brake pulse having the deceleration is outputted subsequently to the kick pulse. It is preferable that the kick pulse in this instance usually has a value of acceleration which is large to a certain degree or more in order to reduce the track jump time and perform the track jump against the disturbance. However, as shown in the prior art in FIGS. 41A to 41C, if the kick pulse 200 having a high pulse is outputted continuously until a detection time point t1 of the zero-cross point 202 of the tracking error signal TES, there is such a problem that a variation in speed at the time point of the end of the acceleration increases due to a limitation of the detection precision of the zero-cross point of the tracking error signal TES.

In recent apparatuses including the apparatus of the invention, a series of processes in the track jump control is executed every predetermined sampling intervals by firmware of the DSP 16 shown in FIGS. 2A and 2B. The sampling period in this case is set to, for example, about 18 $\mu$sec. That is, by monitoring by sampling the tracking error signal once per 18 $\mu$sec, whether the TES signal transverses a threshold value or not is discriminated, thereby detecting the zero-cross point 202. In this case, when the tracking error signal TES in FIG. 41A transverses the threshold value of the zero-cross point 202 just after the present sampling, the zero-cross point 202 is detected by the next sampling for the first time. Therefore, the detection time error of the intersecting time point is set to time t1' that is delayed by 1-sampling period and the signal is delayed by 18 $\mu$sec. Since the output of the kick pulse and the brake pulse is also generally instructed by firmware of the DSP, the timing to output the pulse is also generally quantized by the sampling period. As mentioned above, it is difficult to at least perfectly make the time t1 when the tracking error signal actually intersects the zero-cross point coincide with the time t1' when the kick pulse 200 is actually switched to the brake pulse. Further, since the sampling period of the tracking error signal TES has been quantized by the sampling period of the control system, there is a case where the period is eventually deviated by approximately 1-sampling period. When such a delay occurs, the speed is further accelerated continuously by the kick pulse 200 by the delay time as shown in FIG. 41B, the speed at the acceleration end point t1' increases from a speed 204 at time t1 to a speed 206 at time t1' as shown in FIG. 41C and becomes high by such an increase amount. In the case where the pulse output is continued until the track zero-cross point is detected while the kick pulse 200 is held constant, when a speed error $\Delta V$ at the acceleration end time point which occurs due to a detection error by the delay of the sampling period is obtained, it is as shown in a table of FIG. 42. As will be obviously understood from this table, as the height of kick pulse 200 is raised, the speed error occurring since the acceleration end is delayed by the time of one sample increases. This means that a kind of disturbance occurs due to the detection delay of the track zero-cross point. That is, it can be regarded that the track jump control itself causes a disturbance in addition to the various disturbances such as eccentricity, friction, oscillatory disturbance, and the like occurring in and out of the apparatus. After that, such a speed error at the end of acceleration of the track jump needs to be absorbed by the deceleration by the brake pulse and the lead-in control. However, in the case where the margin for the disturbance is small as in the case where the maximum generating acceleration of the carriage is small or the case where the band of the lead-in control cannot be set to a high band like an apparatus using the single stage positioner according to the invention, it is difficult to absorb the speed error occurring due to the detection time deviation of the track zero-cross point if the other various kinds of disturbance are also included. There are problems in which the track jump fails or, even if the speed error can be absorbed, the response speed of the track jump is largely fluctuated and the settling time after the track jump becomes long.

Figure 43A:
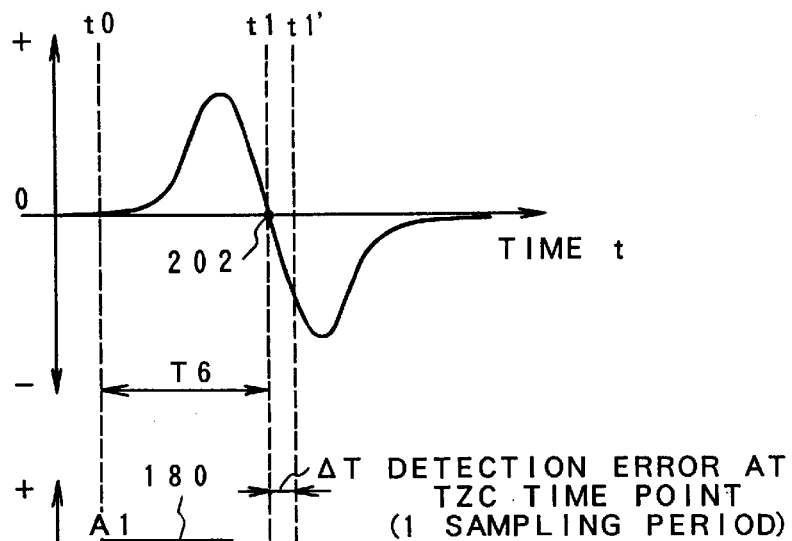
FIGS. 43A to 43C are explanatory diagrams of an acceleration control in the case where the kick pulse is divided into a first kick pulse and a second kick pulse and a height of second kick pulse is set to zero.
Figure 43B:
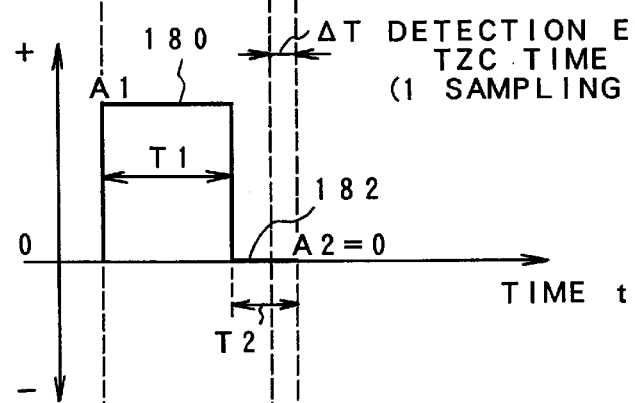
Figure 43C:
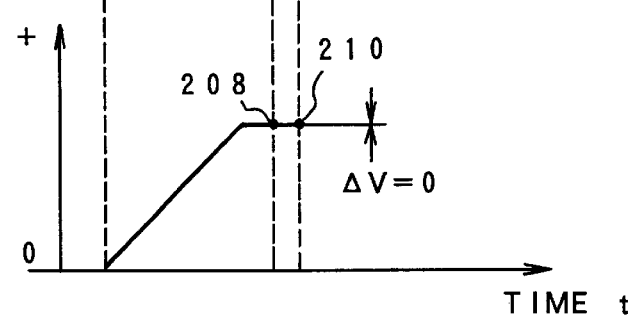
Figure 44A:
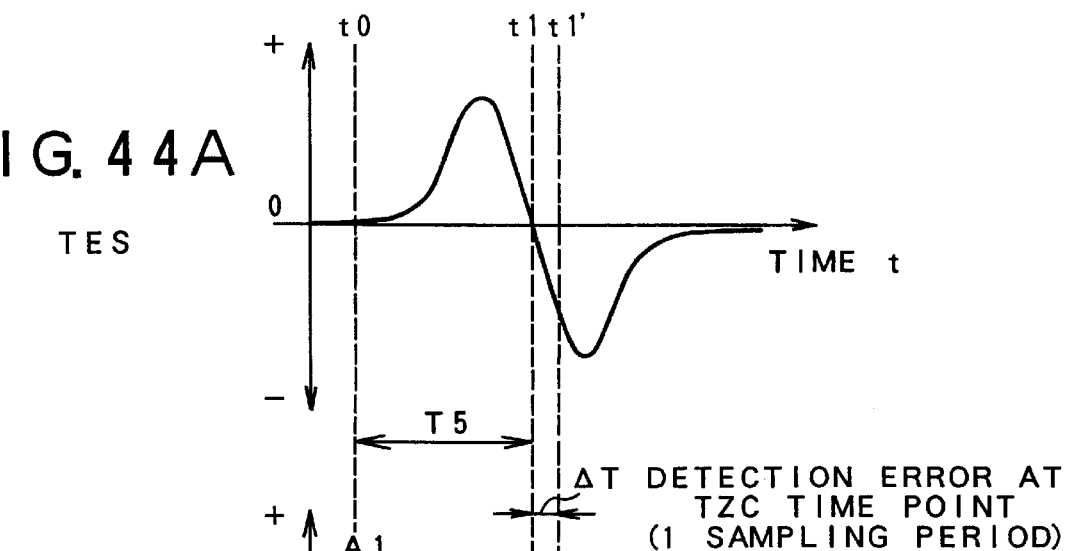
FIGS. 44A to 44C are explanatory diagrams of an acceleration control in the case where the height of second kick pulse is set to a height that is lower than that of the first kick pulse and is adapted to compensate the inadequate acceleration in FIGS. 43A to 43C.
Figure 44B:
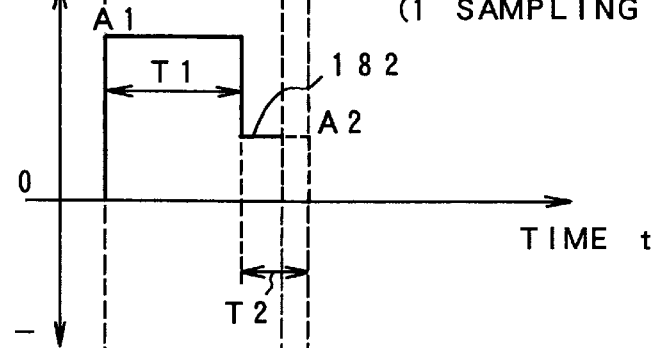
Figure 44C:
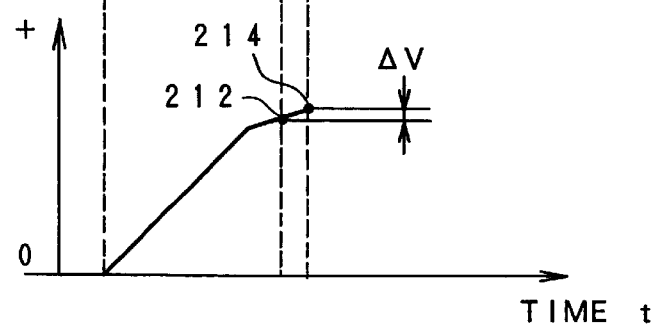

In the invention, therefore, the kick pulse to accelerate the carriage is set as shown in FIGS. 43A to 43C. FIG. 43A shows the tracking error signal TES, FIG. 43B shows the kick pulse of the track jump signal of the invention, and FIG. 43C shows the positioner speed serving as a track jump speed. The kick pulse which is used in the track jump control of the invention shown in FIG. 43B is divided into two portions of the first kick pulse 180 and second kick pulse 182. In the embodiment, the height A2 of the second kick pulse 182 is set to zero. It is desirable to set the height A1 of the first kick pulse 180 as high as possible within a range where the pickup can be preferably led in to the target track by the brake pulse, and further, the ability of the subsequent lead-in control, in order to reduce the track jump time. The continuation time T1 of the first kick pulse 180 is set to a predetermined time, for example, $$T1 = N \times (\text{sampling time})$$

while the sampling time of the track jump control system is used as a reference. The sampling time to decide the continuation time T1 of the first kick pulse is realized by a timer interruption or the like of the controller and has enough high precision, so that the continuation time T1 of the first kick pulse 180 can be also precisely managed. Since both the height A1 and continuation time T1 of the first kick pulse 180 are constant, the acceleration which is obtained by the first kick pulse 180, namely, the increase amount from the initial speed is held constant. A time T6 in a range from the track jump start time point t0 to the zero-cross point 202 of the tracking error signal TES depends on the amounts of eccentricity, friction, and oscillatory disturbance which are applied at the time of track jump. The continuation time T1 of the first kick pulse 180 is set to be shorter than the expected shortest time T6 considering the assumed amount of eccentricity, friction, oscillatory disturbance, and the like. Thus, the continuation time T1 of the first kick pulse 180 is always held constant and the acceleration amount of the first kick pulse is also held constant. As shown in FIG. 43B, when the height A2 of the second kick pulse 182 is set to A2=0, since the accelerating or decelerating operation by the second kick pulse 182 is eliminated, even if a variation occurs in the detection time of the track zero-cross point 202, the speed variation $\Delta V$ at the end of the acceleration due to the variation of the detection time is zero as shown between points 208 and 210 in FIG. 43C. However, if the height A2 of the second kick pulse 182 is set to A2=0, when a large disturbance is applied in the decelerating direction, there is a case where the positioner is moved backward due to the insufficient acceleration before it reaches the track zero-cross point 202. In such a case, as shown in FIGS. 44A to 44C, the height A2 of the second kick pulse 182 is set to an acceleration pulse with a height lower than the height A1 of the first kick pulse 180. In this case, although it is a main object of the first kick pulse 180 to obtain the speed for track jump, it is sufficient to set the second kick pulse 182 to the minimum height A2 larger than the sum of the disturbance in the decelerating direction which is presumed. By setting the height as mentioned above, the backward movement due to the disturbance can be prevented and a trade-off of reduction of the speed variation due to the variation in detection time of the track zero-cross point can be accomplished. The method of deciding the kick pulse in the track jump signal in FIGS. 44A to 44C is reflected substantially to the track jump signal in FIGS. 35A to 35C already described above.

According to the invention as mentioned above, by performing the feed-forward in which the repetitive disturbance compensation signal such as a medium eccentricity or the like obtained at high precision by the learning control for track-following control is added to the track jump signal during the track jump, the repetitive disturbance such as eccentricity disturbance, Coulomb frictional disturbance, or the like can be precisely compensated.

By performing the feed-forward in which the value just before the track jump of the low band compensation component of the track-following feedback control system is added to the track jump signal together with the repetitive disturbance compensation signal, the compensation can be performed at the highest possible precision even for the non-repetitive disturbance such as an oscillatory disturbance from the outside of the apparatus in addition to the repetitive disturbance.

For dealing with the insufficient acceleration due to the inaccuracy of the repetitive disturbance . compensation signal in the case where it's used during the track jump under the existence of Coulomb friction disturbance, the track jump signal having the first and second kick pulses designated by considering the feature of the insufficient acceleration is applied, thereby preventing the backward movement of the positioner during the track jump.

Further, the continuation time of the brake pulse subsequent to the kick pulse of the track jump signal is set so that the track jump signal is finished at a position that is ¼ track before the target track, accurately speaking, so that the track jump signal is finished at a position near a point where the tracking error signal indicates the peak value, thereby advancing the timing to shift the control mode to the lead-in control system which is started after the end of the track jump, raising the possibility of the compensation according to the feedback control, and performing the stable and high precision lead-in after the track jump.

Further, during the lead-in transient response when the control mode enters the lead-in control after the end of the track jump signal, the arithmetic operation of the low band emphasis calculating unit of the track-following feedback control system is kept stopped. The arithmetic operation of the low band emphasis calculating unit is restarted at a timing near the timing when the tracking error signal is converged, thereby preventing the low band compensation component from being oscillated due to the transient response of the lead-in control and preventing the deterioration of the low band compensation precision due to the low band compensating filter after the lead-in as much as possible. Therefore, the stable track jump can be performed even in the apparatus in which the Coulomb frictional disturbance cannot be ignored like a single stage apparatus.

A principle of the low band emphasizing filter (low band compensating filter) 124 in FIG. 15 will now be collectively explained.

Figure 45A:
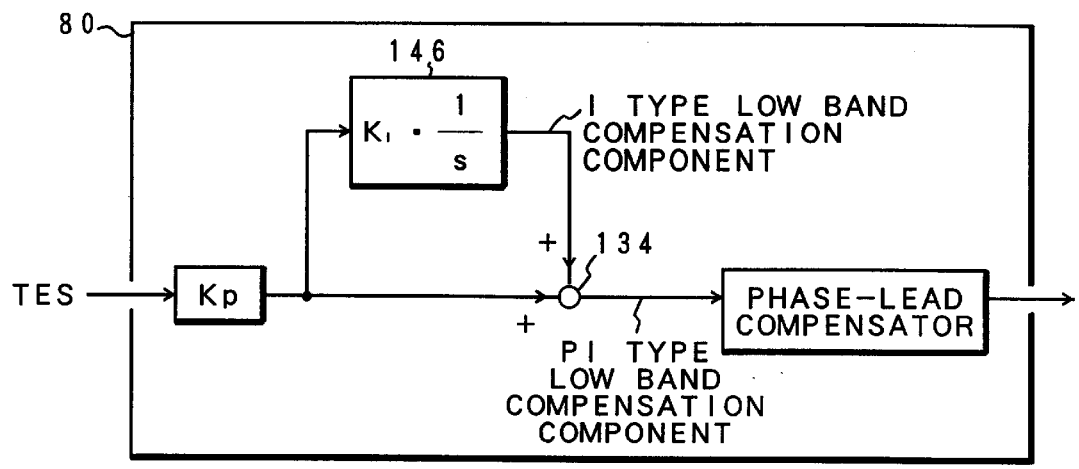
FIGS. 45A to 45C are explanatory diagrams of a principle of the low band emphasizing filter in FIG. 15.

The low band emphasizing filter (low band compensating filter) 124 in FIG. 15 is constructed by a PI compensating filter as shown in, for example, FIG. 45A. In the feedback control unit 80 shown in FIG. 45A, as a final value of the low band compensation component just before the track jump that is fed-forward during the track jump, a value obtained by multiplying the final value just before the track jump of the signal of either a "PI type low band compensation component" or an "I type low band compensation component" by a correction coefficient (corresponding to $K_{comp}$ in FIGS. 17A, 18A, 24A, and 25A) is used. Any of those values is held by the sample holder 114 and feed-forward added during the track jump. In case of using the feedback control unit 80 in FIG. 45A, a calculation of the integration compensation calculating unit (low band emphasis calculating unit 146 in the embodiment) is stopped simultaneously with the start of the track jump while holding and outputting an integration value just before the track jump. During the track jump and until the elapse of a predetermined time after the end of the track jump (end of the track jump signal), the integration compensation calculating unit continuously holds and outputs the integration value just before the track jump and, after that, restarts the integration compensating calculation by using the held integration value as an initial value. Since the selector 110 is switched to the track jump signal side simultaneously with the start of the track jump, an output of a phase-lead calculation is not reflected to a drive command signal. However, a phase-lead compensating unit continues the calculation even during the track jump. That is, during the track-following control until a timing just before the track jump, a phase-lead calculation is performed by using a PI compensation output (PI type low band compensation component) as an input. After the start of the track jump, an addition value (at the addition point 134) of the integration compensation output which was held to a constant value and outputted and a signal (this signal fluctuates in response to a TES change) obtained by multiplying the TES signal by Kp is used as an input, and the phase-lead calculation is continued. The selector 110 is again switched to the phase-lead compensation output side simultaneously with the end of the track jump signal and the lead-in control is started. Since the phase-lead compensating calculation is continued as mentioned above, the valid driving signal for the lead-in operation is outputted from the phase-lead compensating unit instantaneously with the switching of the selector 110. Since the low band compensation signal held by the integration compensation calculating unit is also included in such an output, the low band compensation signal which has been feed-forward outputted during the track jump by the selector 120 is invalidated because the selector 120 is switched to the 0 output side instantaneously with the start of the lead-in. After the elapse of a predetermined time from the start of the lead-in, the integration compensation calculating unit restarts the integrating calculation by using the held output as an initial value. From this time point, the feedback control unit 80 is recovered to a feedback control system of a perfect form for track-following control also including the low band compensating calculation.

The low band emphasizing filter can be also implemented with phase-lag compensation. The phase-lag compensation can be equivalently realized by an additional synthesis of a direct transfer component (DC transfer component) of a proportional component and a result of the low pass filter calculation (the low band emphasis calculating unit 146 in the embodiment). In the feedback control unit 80, as a value that is fed-forward during the track jump, there is used a value obtained by multiplying the final value just before the track jump of a signal of either the "I type low band compensation component" (actually, although it is an output of a low pass filter, it is called an I type low band compensation component for convenience in the invention) or the "PI type low band compensation component" (also referred to a PI type for convenience because of the same reason as that mentioned above) by the correction coefficient (corresponding to $K_{comp}$ in FIGS. 22A, 23A, 24A, and 25A). Any of those values is held by the sample holder and feed-forward added during the track jump.

In case of using the feedback control unit, a calculation of the low band emphasis calculating unit 146 is stopped while holding internal variables in the filter just before the track jump and holding the output just before the track jump simultaneously with the start of the track jump. During the track jump and until a predetermined time elapses after the end of the track jump (end of the track jump signal), the low band emphasis calculating unit 146 continuously holds and outputs the output value just before the track jump and, after that, restarts the low band emphasizing calculation by using the held filter internal variables and output value as initial values. Since the selector 110 is switched to the track jump signal side simultaneously with the start of the track jump, the output of the phase-lead calculation is not reflected to a drive command signal. However, the phase-lead compensating unit continues the calculation even during the track jump. That is, during the track-following control until a timing just before the track jump, a phase-lead calculation is performed by using a phase-lag compensation calculation output (PI type low band compensation component in FIG. 45B) as an input. After the start of the track jump, an addition value of the output of the low band emphasis calculating unit which was held to a constant value and outputted and a signal (this signal fluctuates in response to the TES change) obtained by multiplying the TES signal by Kp is used as an input, and the phase-lead calculation is continued. The selector 110 is again switched to the phase-lead compensation output side simultaneously with the end of the track jump signal and the lead-in control is started. Since the phase-lead compensating calculation is continued as mentioned above, the valid driving signal for the lead-in operation is outputted from the phase-lead compensating unit instantaneously with the, switching of the selector 110. Since the low band compensation signal held by the low band emphasis calculating unit is also included in such an output, the low band compensation signal which has been feed-forward outputted during the track jump by the selector 120 is invalidated because the selector 120 is switched to the 0 output side instantaneously with the start of the lead-in. After the elapse of a predetermined time from the start of the lead-in, the low band emphasis calculating unit restarts the low band emphasizing calculation by using the held filter internal variables and output value as initial values. From this time point, the feedback control unit is recovered to the feedback control system of a perfect form for track-following control also including the low band compensating calculation.

Figure 45B:
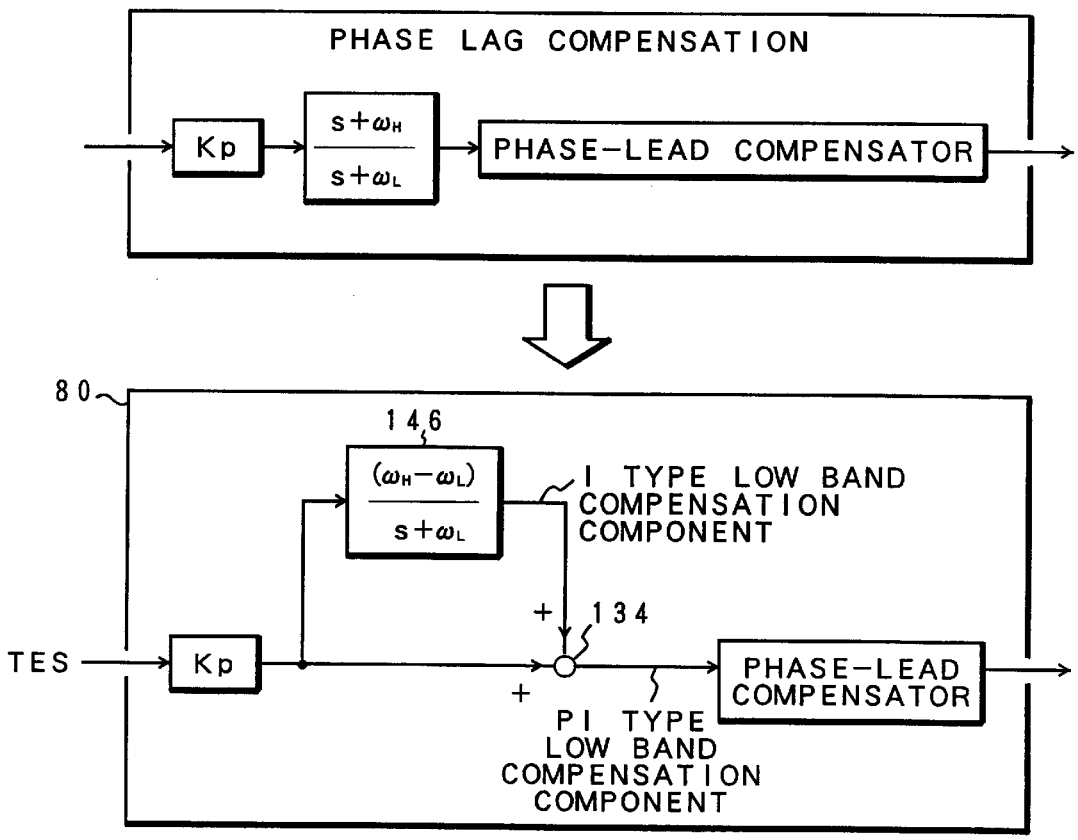
Figure 45C:
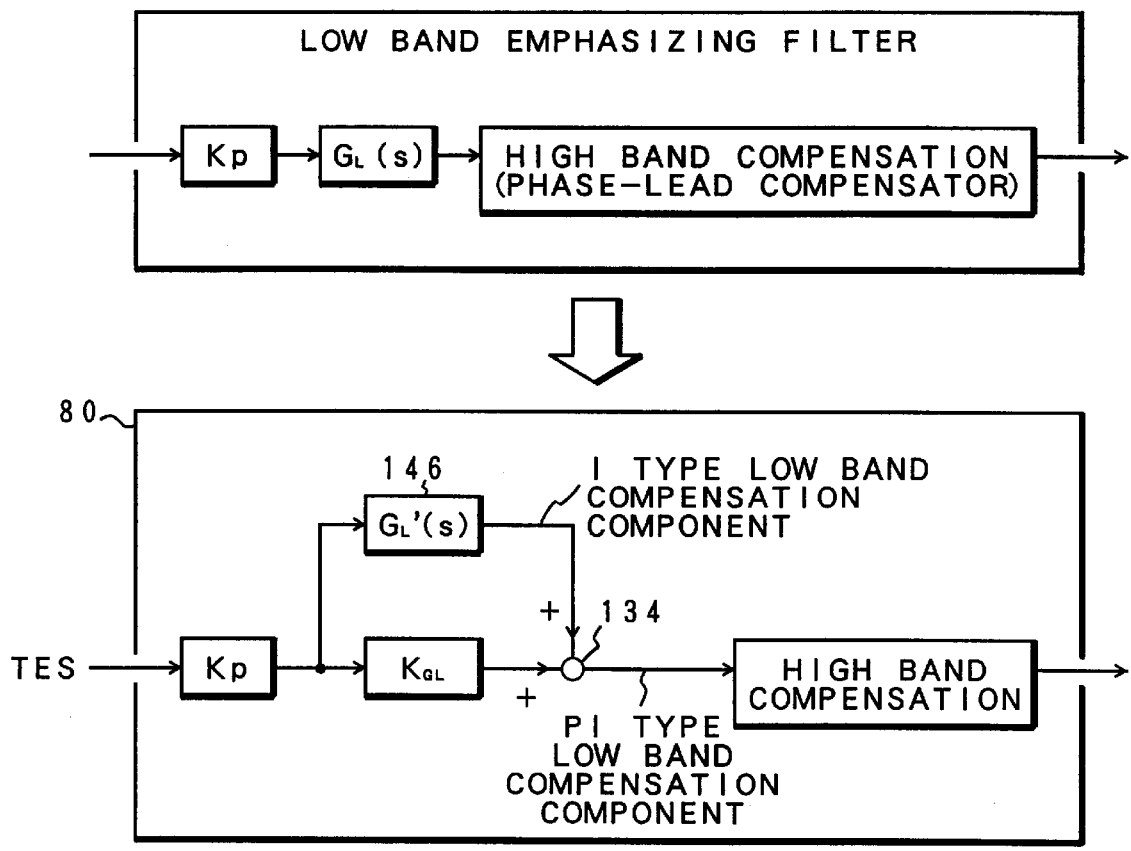

More generally, the phase-lag compensation as shown in FIG. 45B is constructed by a filter to emphasize a low band to improve a low band gain for low band compensation. However, in case of a compensation of the construction as shown in, for example, FIG. 45B in which filters are serially connected like (phase-lag compensation)+(phase-lead compensation)

the low band emphasis filter unit usually includes the DC transfer component of the proportional component as shown in FIG. 45C. That is, now assuming that a transfer function of the low band emphasizing filter is labelled as $G_L(s)$, it is expressed by $$G_L(s) = \frac{b_m s^m + \ldots + b_1 s + b_0}{a_n s^n + \ldots + a_1 s + a_0} \quad (19)$$

Generally, $m \leq n$. If the low band emphasizing filter includes the DC transfer component of the proportional component, the degrees of a numerator and a denominator are equal and $m=n$. When $m=n$, the transfer function of the equation (19) can be generally dissolved as shown by the following equation.

$$G_L(S) = G_L'(S) + K_{G_L} \quad (20)$$

$G_L'(s)$ is the transfer function that is strictly proper (namely, the degree of the numerator is smaller than the degree of the denominator). That is, when the numerator and the denominator of the transfer function $G_L(s)$ of the low band emphasizing filter are equal, as shown by the equation (20), it can be expressed by the sum of a direct transfer term (DC transfer term) ($K_{G_L}$) of the proportional component and the transfer function $G_L'(s)$ that is strictly proper. In the invention, $G_L'(s)$ is called a low band emphasis calculating unit.

In the feedback control unit 80 in FIG. 45C which generally expresses the low band emphasizing filter, as a final value of the low band compensation component just before the track jump which is fed-forward during the track jump, a value obtained by multiplying the final value just before the track jump of the signal of either an "I type low band compensation component" (although it is actually an output of a low pass filter, it is called an I type low band compensation component for convenience in the invention) or a "PI type low band compensation component" (also called a PI type for convenience in the invention) by the correction coefficient (corresponding to $K_{comp}$ in FIGS. 24A and 25A) is used. Any of those values is held by the sample holder 114 and feed-forward added during the track jump. In case of using the feedback control unit 80 in FIG. 45C, a calculation of the low band emphasis calculating unit 146 is stopped simultaneously with the start of the track jump while holding the filter internal variables just before the track jump and holding the output just before the track jump. During the track jump and until a predetermined time elapses after the end of the track jump (end of the track jump signal), the low band emphasis calculating unit continuously holds and outputs the output value just before the track jump and, after that, restarts the low band emphasizing calculation by using the held filter internal variables and output value as initial values. Since the selector 110 is switched to the track jump signal side simultaneously with the start of the track jump, an output of a high band compensating calculation is not reflected to the drive command signal. However, a high band compensating unit continues the calculation even during the track jump. That is, during the track-following control until a timing just before the track jump, the high band compensating calculation is performed by using an output of the low band compensating calculation (PI type low band compensation component) as an input. After the start of the track jump, the addition value (at the addition point 134) of the output of the low band emphasis calculating unit which was held to a constant value and outputted and a signal (this signal fluctuates in response to the TES change) obtained by multiplying the TES signal by ($Kp \times K_{GL}$) is used as an input, and the high band compensating calculation is continued. The selector 110 is again switched to the high band compensation output side simultaneously with the end of the track jump signal and the lead-in control is started. Since the high band compensating calculation is continued as mentioned above, the valid driving signal for the lead-in operation is outputted by the high band compensating unit instantaneously with the switching of the selector 110. Since the low band compensation signal held by the low band emphasis calculating unit is also included in such an output, the low band compensation signal which has been feed-forward outputted during the track jump by the selector 120 is invalidated because the selector 120 is switched to the 0 output side instantaneously with the start of the lead-in. After the elapse of a predetermined time from the start of the lead-in, the low band emphasis calculating unit 80 restarts the low band emphasizing calculation by using the held filter internal variables and output value as initial values. From this time point, the feedback control unit is recovered to the feedback control system of a perfect form for track-following control also including the low band compensating calculation.

Although the embodiment has been described with respect to the P type compensation and the PI type -compensation as examples, the apparatus can be constructed also in such a manner that the feedback control unit 80 is formed by a PID type compensation and during the track jump, an integration calculating unit of the PID type compensation holds an integration value just before the track jump from a point during the track jump until the elapse of a predetermined time after the end of the track jump, and thereafter, restarts the integration arithmetic operation while the held integration value is used as an initial value.

The final value of the low band component just before the track jump of the feedback control signal which is feed-forward added during the track jump is obtained by multiplying the final value just before the track jump of the output of the integration calculating unit of the PID type compensation by the correction coefficient.

As a final value of the low band component just before the track jump of the feedback control signal which is feed-forward added during the track jump, a value obtained by multiplying the final value just before the track jump of the PI output of the PID type compensation by the correction coefficient can be also used.

Although the above embodiments have been described with respect to the optical storage apparatus as an example, the invention also incorporates a magnetic storage apparatus or an apparatus of another proper storing system. The invention is not limited by the above embodiments but incorporates all modifications without departing from the objects and losing the advantages of the invention.

What is claimed is:

1. A storage apparatus comprising:
   a recording/reproducing unit for recording or reproducing information onto/from tracks by a light spot;
   a track-following control unit for driving a positioner to move a position of the light spot by a feedback control signal from a feedback control unit based on a tracking error signal showing a positional deviation of said track, thereby allowing said light spot to trace said track; and
   a track jump control unit for adding a feed-forward signal for repetitive disturbance compensation which is used for track-following control to a track jump signal to move the light spot to an adjacent track, thereby driving the positioner, said track jump control unit having a learning control unit for capturing and storing said feed-forward signal;

wherein as said feed-forward signal for repetitive disturbance compensation, said learning control unit is configured to capture an unknown function for one medium rotational period to set a positional deviation amount for a repetitive disturbance to zero as an approximated function which is approximately presumed by a learning algorithm and storing said function.

2. An apparatus according to claim 1, wherein said track jump control unit has a function to hold a final value just before the track jump of a low band component of the feedback control signal for the track-following control, adds the held value to said track jump signal and said feed-forward signal for repetitive disturbance compensation, and drives the positioner during the track jump.

3. An apparatus according to claim 2, wherein a low band emphasis calculating unit in said feedback control unit holds or continuously holds and outputs internal variables and an output value just before the track jump during the track jump and until the elapse of a predetermined time after the end of the track jump and, after that, restarts a low band emphasis arithmetic operation while the held internal variables and output value are used as initial values.

4. An apparatus according to claim 3, wherein said feedback control unit is constructed by a serial connection of a PI compensation and a phase-lead compensation, and during the track jump, an integration calculating unit of said PI compensation holds an integration value just before the track jump, for a time interval from a timing during the track jump to the elapse of a predetermined time after the end of the track jump and, after that, restarts the integration arithmetic operation while the held integration value is used as an initial value.

5. An apparatus according to claim 4, wherein the final value of the low band component just before the track jump of said feedback control signal which is feed-forward added during the track jump is obtained by multiplying a final value just before the track jump of an output of the integration calculating unit of said PI compensation by a correction coefficient.

6. An apparatus according to claim 4, wherein the final value of the low band component just before the track jump of said feedback control signal which is feed-forward added during the track jump is obtained by multiplying a final value just before the track jump of an output of said PI compensation by a correction coefficient.

7. An apparatus according to claim 3, wherein said feedback control unit is constructed by a serial connection of a phase-lag compensating unit and a phase-lead compensating unit, said phase-lag compensating unit is realized by an addition synthesis of a proportional DC transfer component of an input of said phase-lag compensating unit and an output result obtained by passing the input of said phase-lag compensating unit through a low band emphasis calculating unit as a low pass filter, and during the track jump, said low band emphasis calculating unit holds filter internal variables and an output value just before the track jump for a time interval from a timing during the track jump to the elapse of a predetermined time after the end of the track jump and, after that, restarts a low band emphasis arithmetic operation while the held filter internal variables and output value are used as initial values.

8. An apparatus according to claim 7, wherein the final value just before the track jump of the low band component of said feedback control signal which is feed-forward added during the track jump is obtained by multiplying a final value just before the track jump of an output of the low band emphasis calculating unit of said phase-lag compensation by a correction coefficient, or which is feed-forward added during the track jump is obtained by multiplying a final value just before the track jump of an output of said phase-lag compensation by a correction coefficient.

9. An apparatus according to claim 3, wherein said feedback control unit is constructed by a PID type compensation, and during the track jump, an integration calculating unit of said PID type compensation holds an integration value just before the track jump for a time interval from a timing during the track jump to the elapse of a predetermined time after the end of the track jump and, after that, restarts an integration arithmetic operation while the held integration value is used as an initial value.

10. An apparatus according to claim 9, wherein the final value of the low band component just before the track jump of said feedback control signal which is feed-forward added during the track jump is obtained by multiplying a final value just before the track jump of an output of the integration calculating unit of said PID type compensation by a correction coefficient, or which is feed-forward added during the track jump is obtained by multiplying a final value just before the track jump of a PI output of said PID type compensation by a correction coefficient.

11. An apparatus according to claim 1, wherein said track jump control unit outputs a first kick pulse command to output a first predetermined acceleration for a predetermined time, subsequently outputs a second kick pulse command to output a second acceleration smaller than said first acceleration until it is detected that the light spot has passed through ½ track, and then outputs a brake pulse command to output a third predetermined acceleration (deceleration) for a predetermined time after the detection of the passage of ½ track in such a manner that the track jump is finished at a position near a point that is ¼ track before the target track or at a position near a peak of the tracking error signal near a point that is ¼ track before the target track as command values of said track jump signal to move the light spot to the adjacent target track, and after that, the light spot is led into the adjacent target track by the track-following control by said feedback control unit.

12. An apparatus according to claim 1, wherein said learning control unit captures said unknown function by the learning algorithm as an approximated function which is approximately presumed by heights $C_0$ to $C_{N-1}$ of rectangular functions for intervals 0 to (n−1) obtained by dividing a time for one medium rotational period into N intervals and stores said function.

13. An apparatus according to claim 12, wherein said learning control unit is provided between said feedback control unit and a driving unit, and when the time for one medium rotational period is assumed to be $T_L$, said learning control unit captures an unknown driving current function Irepeat(t) (where, $0 \leq t < T_L$: $T_L$ denotes a time that is required for one medium rotation) which is repeated in a range from a start time t=0 of one medium rotation to an end time t=$T_L$ by the learning algorithm as an approximated function I'repeat(t) (where, $0 \leq t < T_L$: $T_L$ denotes the time that is required for one medium rotation) which is approximately presumed by a height $C_i$ (where, i denotes an interval number: $0 \leq i \leq (N-1)$) of each rectangular function of N intervals (where, a time width T of each interval is equal to $T=T_L/N$) indexed from i=0 to (N−1) obtained by dividing the time $T_L$ for one medium rotational period into N intervals and stores said function.

14. An apparatus according to claim 13, wherein said learning control unit comprises:

a memory having a plurality of memory cells for storing the height $C_i$ of each rectangular function of the intervals of said approximated function I^repeat(t);

a sampling unit for sampling a feedback control signal $I_{FB}$ which is outputted from said feedback control unit;

an approximated function calculating unit for obtaining the height $C_i$ of each rectangular function of the intervals of said approximated function I^repeat(t) stored in each memory cell of said memory by $$\bullet_i = K_{learn} \bullet I_{FB}(t)$$

on the basis of said control signal $I_{FB}$ sampled by said sampling unit and a predetermined learning gain $K_{learn}$ and updating said height $C_i$; and a feed-forward output unit for reading out the height $C_i$ of each rectangular function of the intervals of said approximated function I^repeat(t) stored in said memory cells as a learning control signal synchronously with the divided period T of said medium rotation, adding said height $C_i$ to the feedback control signal $I_{FB}$ from said feedback control unit, and supplying a driving signal $I_{VCM}$ to said driving unit, and upon learning, said learning control unit controls said memory, said sampling unit, said approximated function calculating unit, and said feed-forward output unit synchronously with said medium rotation.

15. An apparatus according to claim 14, wherein said sampling unit samples the control signal $I_{FB}$ at a predetermined period $T_{sample}$ shorter than said divided period T, said approximated function calculating unit obtains the height $C_i$ of each rectangular function of the intervals of said approximated function I^repeat(t) stored in each memory cell of said memory by $$\bullet_i = K_{learn} \bullet I_{FB}(t)$$

where, i: number of an interval that is determined by time t and $0 \leq i \leq (N-1)$; for example, $$i = \text{floor}(t/T)$$

T: time width per rectangular function;

$$T = T_L/N$$

every said sampling period $T_{sample}$ on the basis of said feedback control signal $I_{FB}$ sampled by said sampling unit and said predetermined learning gain $K_{learn}$ and updates said height $C_i$, and said feed-forward output unit reads out the height $C_i$ of each rectangular function of the intervals of said approximated function I^repeat(t) stored in said memory cells synchronously with the medium rotation every said sampling period $T_{sample}$, adds said height $C_i$ to the feedback control signal $I_{FB}$ from said feedback control unit, and supplies the driving signal $I_{VCM}$ to said driving unit.

16. An apparatus according to claim 14, wherein said feed-forward output unit reads out a value for the time that is advanced by a predetermined time Δtlead of said approximated function I^repeat(t) stored in each memory cell of said memory and outputs said value.

17. An apparatus according to claim 1, wherein said learning control unit performs the capturing operation of said approximated function by said learning algorithm at a specific timing only for a specified time and, after the learning, said learning control unit outputs said captured approximated function synchronously with the medium rotation and performs the feed-forward control.

18. An apparatus according to claim 17, wherein in the case where the approximated function already captured at another position exists with respect to the approximated function capturing operation at said plurality of positions, said learning control unit applies the learning algorithm while approximated function data which has already existed is used as an initial value.

19. An apparatus according to claim 1, wherein said positioner has such a single stage structure that an objective lens is focus-controllably mounted on a carriage which is movable in the direction that transverses the tracks on the medium, and both a tracking control for allowing the light beam to trace the track only by a movement of said carriage and a seek control for allowing the light beam to be moved to an arbitrary track position are performed.

20. A storage apparatus comprising:

a recording/reproducing unit for recording or reproducing information onto/from tracks by a light spot;

a track-following control unit for driving a positioner to move a position of the light spot by a feedback control signal from a feedback control unit based on a tracking error signal showing a positional deviation of said track, thereby allowing said light spot to trace said track; and a track jump control unit for adding a feed-forward signal for repetitive disturbance compensation which is used for track-following control to a track jump signal to move the light spot to an adjacent track, thereby driving the positioner;

wherein as said feed-forward signal for repetitive disturbance compensation, said track jump control unit has a learning control unit for capturing an unknown function for one medium rotational period to set a positional deviation amount for a repetitive disturbance to zero as an approximated function which is approximately presumed by a learning algorithm and storing said function.

* * * * *

UNITED STATES PATENT AND TRADEMARK OFFICE
CERTIFICATE OF CORRECTION

PATENT NO. : 6,628,576 B1
DATED : September 30, 2003
INVENTOR(S) : Ichiro Watanabe et al.

It is certified that error appears in the above-identified patent and that said Letters Patent is hereby corrected as shown below:

Column 53,
Line 13, delete "$•_i = K_{learn} • I_{FB} (t)$" and insert -- $\dot{C}_i = K_{learn} • I_{FB} (t)$ --.
Line 40, delete "$•_i = K_{learn} • I_{FB} (t)$" and insert -- $\dot{C}_i = K_{learn} • I_{FB} (t)$" --.

Signed and Sealed this

Eighteenth Day of May, 2004

JON W. DUDAS
*Acting Director of the United States Patent and Trademark Office*